US012661761B2

(12) United States Patent
Irwin et al.

(10) Patent No.: US 12,661,761 B2
(45) Date of Patent: Jun. 23, 2026

(54) MULTIPLE ENTRY ANGLE ADAPTOR WITH LOCATOR FOR FASTENER INSTALLATION TOOL

(71) Applicant: OMG Building Products LLC, Agawam, MA (US)

(72) Inventors: R. Timothy Irwin, Lenox, MA (US); Mark A. Dicaire, Boylston, MA (US); Christopher C. Will, Big Lake, MN (US); David L. Mathieu, Colchester, CT (US); Timothy F. Gillis, Florence, MA (US); Arun Srinivasan Venkatesan, Feeding Hills, MA (US); Jonathan W. Dezielle, Agawam, MA (US)

(73) Assignee: OMG Building Products LLC, Agawam, MA (US)

(*) Notice: Subject to any disclaimer, the term of this patent is extended or adjusted under 35 U.S.C. 154(b) by 212 days.

(21) Appl. No.: 18/637,658

(22) Filed: Apr. 17, 2024

(65) Prior Publication Data

US 2024/0261943 A1 Aug. 8, 2024

Related U.S. Application Data

(63) Continuation of application No. 16/738,523, filed on Jan. 9, 2020, now Pat. No. 11,975,424, which is a (Continued)

(51) Int. Cl.
*B25B 21/00* (2006.01)
*B25B 23/00* (2006.01)

(Continued)

(52) U.S. Cl.
CPC ........ *B25B 21/002* (2013.01); *B25B 23/0021* (2013.01); *B25B 23/005* (2013.01);

(Continued)

(58) Field of Classification Search
CPC . B25B 21/002; B25B 23/0021; B25B 23/005; B25B 23/0078; B25B 23/12; B25H 1/0021; B25H 1/0042; B25H 1/0078
See application file for complete search history.

(56) References Cited

U.S. PATENT DOCUMENTS

| | | | |
|---|---|---|---|
| 975,285 | A | 11/1910 | Robertson |
| 1,631,501 | A | 6/1927 | Payzant |

(Continued)

FOREIGN PATENT DOCUMENTS

| | | | |
|---|---|---|---|
| CN | 203553488 | U | 4/2014 |
| DE | 3104460 | A1 | 6/1982 |
| DE | 4132504 | A | 4/1992 |
| EP | 0195851 | B1 | 1/1992 |
| GB | 2250559 | B | 3/1995 |

OTHER PUBLICATIONS

"Acutrak Headless Compression Screw System," Acumed, Jun. 2014, retrieved from www.acumed.net/products/screw-pin/acutrak-headless-compression-screw-system/.

(Continued)

*Primary Examiner* — David B. Thomas
(74) *Attorney, Agent, or Firm* — Alix, Yale & Ristas, LLP

(57) ABSTRACT

A fastener installation assembly has a head with a fastener opening and a connector for connecting the head to a driving tool so that a fastener can be driven through the hole. A guide assembly with a locator is pivotally mounted to the head. The locator may be removable from the guide assembly and movable so that its locator surface is movable relative to a guide surface of the guide assembly. The locator may include a locator guide that is movable relative to the locator so that a position of an end of the locator guide relative to the locator surface is adjustable. The locator guide may be removable from the locator. The guide assembly is pivotable between multiple angular positions to vary the angle at (Continued)

which a fastener is driven into building materials which the guide assembly and locator engage.

20 Claims, 85 Drawing Sheets

Related U.S. Application Data continuation-in-part of application No. 16/168,090, filed on Oct. 23, 2018, now Pat. No. 11,433,511, which is a continuation-in-part of application No. 15/239,047, filed on Aug. 17, 2016, now Pat. No. 10,124,470, which is a continuation-in-part of application No. 14/211,685, filed on Mar. 14, 2014, now Pat. No. 9,452,514.

(60) Provisional application No. 61/890,905, filed on Oct. 15, 2013, provisional application No. 61/787,170, filed on Mar. 15, 2013.

(51) Int. Cl.
*B25B 23/12* (2006.01)
*B25H 1/00* (2006.01)

(52) U.S. Cl.
CPC ........... *B25B 23/12* (2013.01); *B25H 1/0078* (2013.01); *B25B 23/0078* (2013.01)

(56) References Cited

U.S. PATENT DOCUMENTS

| | | | | | |
|---|---|---|---|---|---|
| 1,651,796 | A | | 12/1927 | Arenz | |
| 1,764,053 | A | | 6/1930 | Reed et al. | |
| 3,207,023 | A | | 9/1965 | Knohl | |
| 3,357,295 | A | | 12/1967 | Smith | |
| 3,670,941 | A | | 6/1972 | Grinnell et al. | |
| 3,890,058 | A | * | 6/1975 | Self | B25H 1/0078 408/112 |
| 3,960,191 | A | | 6/1976 | Murray | |
| 3,965,950 | A | | 6/1976 | MacDonald | |
| 4,242,016 | A | * | 12/1980 | Faris | B25H 1/0064 408/112 |
| 4,295,394 | A | | 10/1981 | DeCaro | |
| 4,391,558 | A | * | 7/1983 | Perry | B25H 1/0078 408/110 |
| 4,510,826 | A | | 4/1985 | Marks | |
| 4,572,715 | A | * | 2/1986 | Wolff | B23B 47/287 408/112 |
| 4,689,881 | A | | 9/1987 | Fall | |
| 4,890,968 | A | | 1/1990 | Beach et al. | |
| 4,900,208 | A | | 2/1990 | Kaiser et al. | |
| 5,100,274 | A | | 3/1992 | Hasan et al. | |
| 5,150,993 | A | * | 9/1992 | Miller | B25H 1/0078 408/110 |
| 5,447,401 | A | | 9/1995 | Jones et al. | |
| 5,540,531 | A | | 7/1996 | Choiniere | |
| 5,584,221 | A | | 12/1996 | Petrantoni | |
| 5,667,126 | A | | 9/1997 | Boucek | |
| 5,740,705 | A | | 4/1998 | Graham | |
| 5,791,207 | A | | 8/1998 | Ahdoot | |
| 5,797,708 | A | * | 8/1998 | Bencic | B23B 47/281 408/112 |
| 5,827,031 | A | | 10/1998 | Swallow | |
| 5,865,584 | A | | 2/1999 | Onofrio | |
| 5,921,454 | A | | 7/1999 | Larson et al. | |
| 5,947,670 | A | | 9/1999 | Larson | |
| 6,050,765 | A | | 4/2000 | McGovern et al. | |
| 6,074,149 | A | | 6/2000 | Habermehl et al. | |
| 6,109,145 | A | | 8/2000 | Habermehl | |
| 6,296,064 | B1 | | 10/2001 | Janusz et al. | |
| 6,322,307 | B1 | | 11/2001 | Glover | |
| 6,363,818 | B1 | | 4/2002 | Habermehl | |
| 6,425,306 | B1 | | 7/2002 | Habermehl | |
| 6,439,085 | B1 | | 8/2002 | Habermehl et al. | |
| 6,481,613 | B1 | | 11/2002 | Tebo | |
| 6,494,322 | B1 | | 12/2002 | Habermehl et al. | |
| D474,093 | S | * | 5/2003 | Chang | D8/71 |
| 6,647,836 | B1 | | 11/2003 | Habermehl | |
| 6,729,522 | B2 | | 5/2004 | Hempfling et al. | |
| 6,789,991 | B2 | | 9/2004 | Hsu | |
| 6,862,963 | B2 | | 3/2005 | Habermehl et al. | |
| 6,915,724 | B2 | | 7/2005 | Kigel et al. | |
| 6,945,140 | B2 | | 9/2005 | Gibbons et al. | |
| 6,990,731 | B2 | | 1/2006 | Haytayan | |
| 7,029,220 | B2 | | 4/2006 | Fujiyama et al. | |
| 7,134,367 | B2 | | 11/2006 | Gehring et al. | |
| 7,287,681 | B1 | | 10/2007 | Wen | |
| 7,341,146 | B2 | | 3/2008 | Habermehl | |
| 7,743,683 | B2 | | 6/2010 | Dayton et al. | |
| 7,874,232 | B2 | | 1/2011 | Gauthreaux et al. | |
| 7,900,420 | B2 | | 3/2011 | Pope | |
| 7,967,534 | B2 | * | 6/2011 | McDaniel | B23B 47/287 408/97 |
| 7,976,252 | B2 | * | 7/2011 | McDaniel | B23B 47/287 408/97 |
| 8,202,032 | B2 | | 6/2012 | Gillis et al. | |
| 8,220,367 | B2 | | 7/2012 | Hsu | |
| 8,375,541 | B1 | * | 2/2013 | Beachy | B23B 47/287 408/110 |
| 8,376,203 | B2 | | 2/2013 | Martel et al. | |
| 8,403,194 | B2 | | 3/2013 | Tebo | |
| 8,430,611 | B2 | * | 4/2013 | Vidal Carres | B25H 1/0078 409/138 |
| 8,733,609 | B2 | | 5/2014 | Weigmann et al. | |
| 8,955,210 | B2 | | 2/2015 | Vandenberg | |
| 9,144,896 | B2 | | 9/2015 | Vandenberg | |
| 9,452,514 | B2 | | 9/2016 | Guthrie et al. | |
| 9,587,662 | B2 | | 3/2017 | Glass | |
| 9,751,197 | B2 | | 9/2017 | Vandenberg | |
| 9,802,300 | B2 | | 10/2017 | Vandenberg | |
| 9,969,068 | B2 | | 5/2018 | Walters et al. | |
| 10,018,215 | B2 | | 7/2018 | Walters et al. | |
| 10,124,470 | B2 | * | 11/2018 | Dicaire | A45F 5/021 |
| 10,406,659 | B2 | * | 9/2019 | Dicaire | B25B 21/002 |
| 10,603,768 | B2 | | 3/2020 | Irwin et al. | |
| 11,268,561 | B2 | * | 3/2022 | Walters | B25F 3/00 |
| 11,975,424 | B2 | * | 5/2024 | Irwin | B25B 23/12 |
| 2003/0024962 | A1 | | 2/2003 | Sims et al. | |
| 2003/0031528 | A1 | | 2/2003 | Kram et al. | |
| 2004/0081535 | A1 | | 4/2004 | Birkelbach et al. | |
| 2004/0093997 | A1 | | 5/2004 | Huang | |
| 2006/0207204 | A1 | | 9/2006 | Wasitis et al. | |
| 2006/0269380 | A1 | | 11/2006 | Yin-Feng | |
| 2007/0065255 | A1 | | 3/2007 | Liu | |
| 2007/0258794 | A1 | | 11/2007 | Litzinger | |
| 2007/0271761 | A1 | | 11/2007 | Haytayan | |
| 2008/0260495 | A1 | | 10/2008 | Gong et al. | |
| 2009/0014495 | A1 | | 1/2009 | Lin et al. | |
| 2009/0194954 | A1 | | 8/2009 | Hsu | |
| 2010/0270352 | A1 | | 10/2010 | Popovich et al. | |
| 2011/0089218 | A1 | | 4/2011 | Santamarina et al. | |
| 2011/0110745 | A1 | | 5/2011 | Shih | |
| 2012/0096701 | A1 | | 4/2012 | Schachner | |
| 2012/0183371 | A1 | | 7/2012 | Druschel et al. | |
| 2013/0175314 | A1 | | 7/2013 | Francis et al. | |
| 2014/0013558 | A1 | * | 1/2014 | Beachy | B23B 51/00 29/26 A |
| 2014/0161561 | A1 | | 6/2014 | Tebo | |
| 2014/0304973 | A1 | | 10/2014 | Guthrie et al. | |
| 2016/0354904 | A1 | | 12/2016 | Dicaire et al. | |
| 2017/0320197 | A1 | | 11/2017 | Dicaire et al. | |
| 2019/0366518 | A1 | | 12/2019 | Tillinghast et al. | |

OTHER PUBLICATIONS

"Plywood Design and Application Guide," TECO, p. 5, Jul. 20, 2006.

International Search Report and Written Opinion mailed Jul. 29, 2014 for International Patent Application No. PCT/US2014/027645.

(56) References Cited

OTHER PUBLICATIONS

International Search Report and Written Opinion mailed Nov. 9, 2017 for International Patent Application No. PCT/US2017/046528.

International Search Report and Written Opinion mailed Oct. 18, 2018 for International Patent Application No. PCT/US2018/043660.

* cited by examiner

TRUSS TO TOP PLATE

STUD TO TOP PLATE

STUD TO BOTTOM PLATE

BOTTOM PLATE TO RIM

TOP PLATE TO RIM

MULTIPLE ENTRY ANGLE ADAPTOR WITH LOCATOR FOR FASTENER INSTALLATION TOOL

CROSS-REFERENCE TO RELATED APPLICATIONS

This application is a continuation of U.S. patent application Ser. No. 16/738,523, filed on Jan. 9, 2020, which is a continuation-in-part of U.S. patent application Ser. No. 16/168,090 filed on Oct. 23, 2018, which is a continuation-in-part of U.S. patent application Ser. No. 15/239,047 filed on Aug. 17, 2016, which is a continuation-in-part of U.S. patent application Ser. No. 14/211,685 filed on Mar. 14, 2014, which application claims the priority of U.S. Provisional Patent Application No. 61/787,170 filed on Mar. 15, 2013 and U.S. Provisional Patent Application No. 61/890,905 filed on Oct. 15, 2013, the disclosures of which applications are incorporated herein in their entirety.

BACKGROUND

The present disclosure relates to generally fastening systems employed to connect wood structural members to comply with construction codes. The present disclosure relates generally to tools and methods for installing a fastener to secure wood framing components. More particularly, this disclosure relates to tools and techniques to precisely install fasteners to secure the top plate to roof trusses or rafters.

Local and state building codes, which are typically based on universal codes such as the International Residential Code and the International Building Code, set forth various requirements for securing wooden framing components. Provisions are made in such codes to require that the top plate and the rafters, or roof trusses, must be connected to comply with pre-established connection force standards calculated to resist substantial uplift forces that may be experienced throughout the lifetime of the structure. For locations which are susceptible to high wind uplift and/or seismic activity, typically, a stronger force-resistant connection between the top plate and rafters or trusses is required.

To satisfy building code requirements, the use of metal brackets and a large number of nails are commonly installed using pneumatic nail guns. Many of the structural locations requiring these robust connections are at the top corners of walls and where walls meet roof trusses and the like. These locations typically require workers to stand on ladders and employ a hammer or pneumatic nail guns to nail brackets to roof rafters, roof trusses and the like. A common complaint is that the ladders are not a stable platform and maneuvering bulky nail guns into cramped locations while standing on a ladder is both difficult and dangerous.

The concept of a continuous load path (CLP) from the peak of the roof to the foundation is one that is gaining some popularity in the construction industry. Various devices of straps, brackets, cables, threaded rods and bolts are currently employed to tie various building components together and create an integrated unit where stress on any one structural component is transferred to other components for additional durability.

There are a number of techniques, fasteners and hardware items that are conventionally employed to provide the required connection between the top plate and the rafters or roof trusses. Hurricane clips or other forms of metal straps or clips are traditionally used and secured by multiple nails or threaded fasteners. There is commonly a trade-off between connection integrity and construction efficiency. For example, hurricane clips, which are effective and widely used in many locations, may require eight or more nails or threaded fasteners to meet the requisite code connection standard.

It is possible to employ threaded fasteners such as elongated screws to replace some of the metal brackets and nails currently employed to meet building codes. However, such screws need to be installed at a particular angle and position to ensure penetration through several wood members to engage, for example, a roof truss or rafter. There is a need for a construction system that would facilitate the use of threaded fasteners to connect building components in a manner that meets building codes and allows building inspectors to visually confirm correct installation of such threaded fasteners.

A highly secure and efficient connection between the top plate and rafters or roof trusses can be implemented by employing multiple specialty six-inch threaded fasteners, such as TimberLOK® wood screws manufactured and marketed by OMG, Inc., of Agawam, Massachusetts. To secure the framing components with the sufficient retentive force, each threaded fastener is driven through the top plate and into the rafters or roof trusses at a 22.5±5° optimum angle with respect to the vertical. Although securing multiple threaded fasteners is typically more efficient than attaching a hurricane clip or other strap-type connector, it is difficult to consistently implement a 22.5° angle within a reasonable range of precision. The usage of protractors, levels and other similar-type tools to obtain the optimum angle for the threaded fastener has proven to be clumsy, difficult, time consuming and, at best, only marginally advantageous over more conventional securement methods.

The present disclosure addresses the need for a tool and method for complementing various structural connections by efficiently installing multiple threaded fasteners having a consistently precise optimum connection angle.

SUMMARY

Briefly stated, a multiple entry angle adaptor with a variably positionable locator for a fastener installation tool mounts to a driver assembly to precisely provide a location and entry angle for driving a fastener to achieve an optimum connection for various wood structural components.

In one embodiment, a fastener installation assembly most generally includes a head, connector and guide assembly. The head has an entry surface and defines a fastener opening in said entry surface. The connector is configured to mount the head to a fastener driving tool at a fixed angular position in a position such that a fastener is drivable through said opening by the driving tool. The guide assembly is pivotally mounted to the head and has a guide surface. A locator is removably mounted to the guide assembly and has first locator surface that is movable relative to the guide surface. A locator guide with an abutment end is attached to the locator and is movable relative to the locator such that a position of the abutment end relative to the first locator surface is adjustable.

In another embodiment, a fastener installation assembly has a head, a connector, a guide assembly, a locator and a locator guide. The head has an entry surface and defines a fastener opening in said entry surface. The connector is configured to mount the head to a fastener driving tool at a fixed angular position thereto in a position such that a fastener is drivable through said opening by the driving tool. The guide assembly is pivotally mounted to the head and has a planar guide surface extending from a front end to a rear end. The guide surface and entry surface can be shifted between a first angle and a second angle relative to each other. At the first angle, the guide surface and entry surface are substantially coplanar and at the second angle, they are oblique to one another. The locator is mounted to the guide assembly and has a first locator surface substantially perpendicular to the guide surface. The locator surface is movable in a front-to-rear direction relative to the guide assembly and positioned rear of the front end of the guide assembly. The locator guide has an abutment end and is attached to the locator. The locator guide is also movable in the front-to-rear direction relative to the locator such that a position of the abutment end relative to the first locator surface is adjustable.

In yet another embodiment, a fastener installation assembly has a head with an entry surface that defines a fastener opening. The head is connectable to a fastener driving tool to initiate driving of a fastener through the fastener opening. A guide assembly is pivotally mounted to the head and defines a guide surface. A locator is mounted to the guide assembly via at least one arm and has a first locator surface extending at a non-parallel angle relative to the guide surface. A locator guide is engaged with the locator and including a front abutment end. The at least one arm is reciprocable relative to the guide assembly in a front-to-rear direction to adjust a positioning of the locator surface relative to the front end. The locator guide is reciprocable in a front-to-rear direction relative to the locator and independently from the at least one arm to adjust a positioning of the abutment end relative to the first locator surface.

In some embodiments, when the guide assembly is at a first angular position and each reference edge or surface engages an upper horizontal member and the reference surface engages a vertical member, a fastener is drivable by the fastener drive assembly through the fastener opening at a first oblique entry angle into the horizontal member. When the guide assembly is at a second angular position and each reference edge engages a horizontal member, a fastener is drivable through the fastener opening at a normal or 90° entry angle into the horizontal member.

In some embodiments, the first entry angle relative to a vertical member is preferably approximately 12°. In one application, the vertical member is a stud, the horizontal member is a top plate, header, a multi-ply beam or a bottom plate. The guide/head assembly has an indicator indicating a flush position of the reference surface.

The angle guide assembly may be securably positionable at one of two angularly spaced positions. A fastener receiver assembly of the adaptor further forms a fastener channel leading to the fastener opening and further comprises a magnet assembly for retaining the fastener in the channel.

The fastener installation tool may comprise a fastener driver assembly with a distal tube.

In one embodiment, the guide module mounts a variably positionable locator securable in a fixed position. The locator comprises a pair of laterally spaced arms which extend from the guide module and mount a variably positionable elongated position detector. A knob secures the locator in a fixed position. Each of the arms is parallel to the reference engagement structure.

In some embodiments, the tool may include one or more flush indicators for indicate a flush position of the reference engagement structure. The flush indicator may comprise a spring biased lever having a flag which is withdrawable into an enclosure.

In some embodiments, the guide assembly is securable at one of two pivotal positions by a depressible spring-loaded member having a pawl.

In some embodiments, the locator includes a pair of elongated arms mounting a platform defining a locator reference surface. The platform may define an elongated slot receiving the locator guide. The guide assembly may have a pair of bores for slidably receiving the locator arms. Each locator arm is fixedly secured by a knob threadably engaging the guide assembly. The locator guide may include a variably positionable graduated scale.

The locator arms may have a rounded end. The panels of the guide assembly may form a ledge which defines a cam track for the rounded ends of the arms so that the rounded ends ride along the cam track when the position of the locator is changed from a frontal to a rearward position. The arms may also have a serrated surface which engages a serrated surface at the end of the cam track of the panels to further prevent transverse movement of the locator when it is disposed in a rearward position. A knob is tightenable against one of the arms to secure the locator in a selected fixed position.

A fastener receiver assembly may be mounted to the guide head and define a fastener channel leading to the opening wherein a fastener is retainable in the channel by means of a magnet assembly. The connector can connect the adaptor with an end portion of a distal tube of the driver assembly.

DETAILED DESCRIPTION

With reference to the drawings wherein like numerals represent like parts throughout the several figures, a fastener installation tool is generally designated by the numeral 10. The fastener installation tool 10 is a heavy-duty hand tool adapted for installing threaded fasteners 12 at a consistent angle of approximately 22½° (to the vertical) into a top plate for connection with a roof support member.

Figures 4, 4A, 4B:
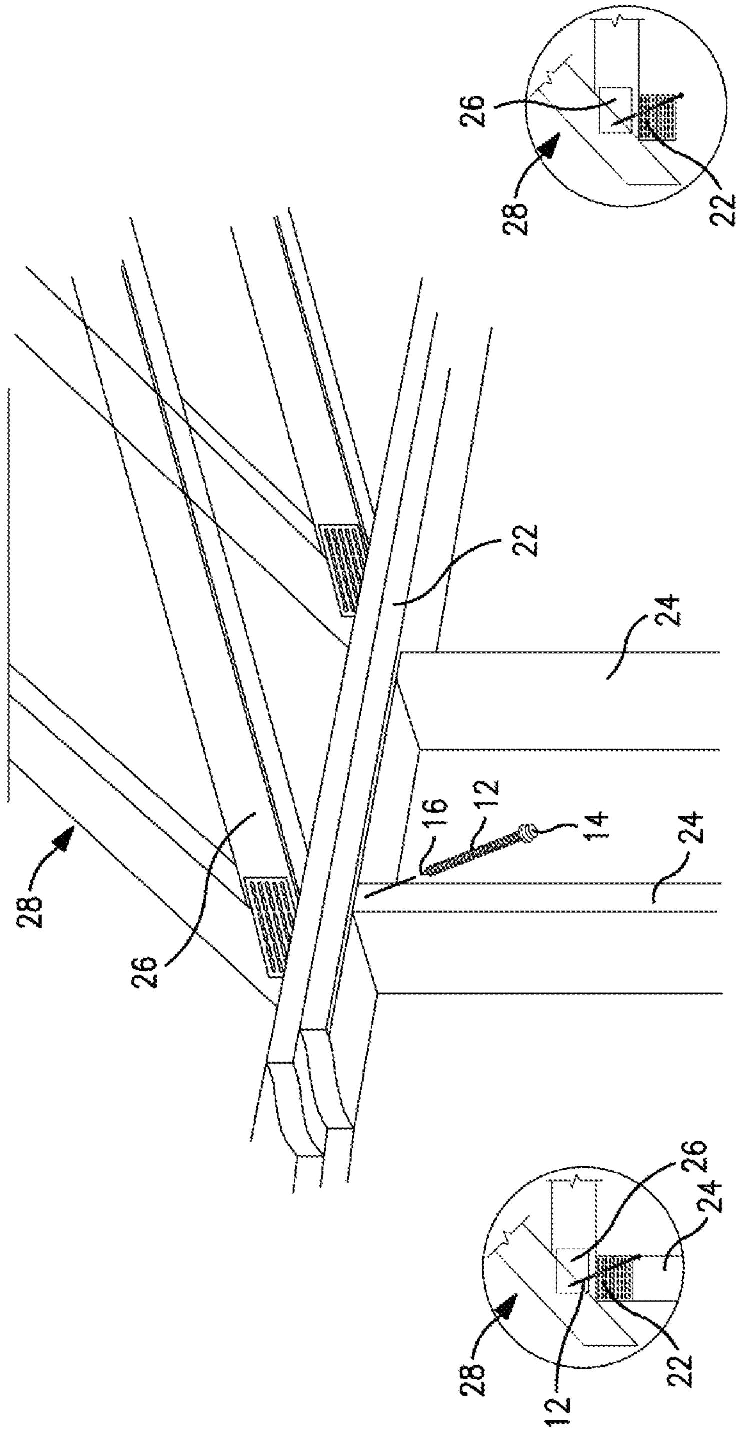
FIG. 4 is a representative perspective view, partly in schematic, of a structure during its construction phase and illustrating the usage of a fastener to connect a top plate to a roof support member.
FIG. 4A is a fragmentary side sectional view of the structure of FIG. 4, illustrating a fastener connecting a top plate to a roof support member at a location adjacent a vertical stud.
FIG. 4B is a fragmentary side sectional view of the structure of FIG. 4, illustrating a fastener connecting a top plate to a roof support member at a location between vertical studs.

As best illustrated in FIGS. 4, 4A and 4B, for a representative structure 20 for which the installation tool 10 is particularly adapted, a top plate 22, which may include a single 2×4 or a double 2×4, is mounted at the top of spaced vertical studs 24. Roof support members 26 of roof trusses 28 are mounted and supported on the top plate 22. Threaded fasteners 12 are driven into the top plate at a 22½° angle for engagement with the roof support member 26. Multiple spaced threaded fasteners 12 are sequentially driven at pre-established spacings to provide the proper uplift resistance.

FIG. 4A illustrates the fastener driven at the upper location of the stud 24. FIG. 4B illustrates the fastener as driven at the location along the top plate between the vertical studs 24. The fasteners 12 are each preferably a six-inch fastener having a continuous threaded portion with a pointed tip and a head defining a socket or a six-inch TimberLOK® fastener manufactured and marketed by OMG, Inc., of Agawam, Massachusetts. The TimberLOK® fastener 12 has a hex head 14 and a drill tip 16. Alternative configurations for head 14 are also possible.

As will be further described below, the installation tool 10 is preferably dimensioned, principally by means of the length of a telescopic tube assembly 30, to provide an installation tool which may be effectively used by installers having a wide range of height and reach for a wide range of commonly vertically dimensioned structures. The principal function of the telescopic tube assembly 30 is to exert positive forward or upward pressure against the top plate/roof support interface.

Figure 5:
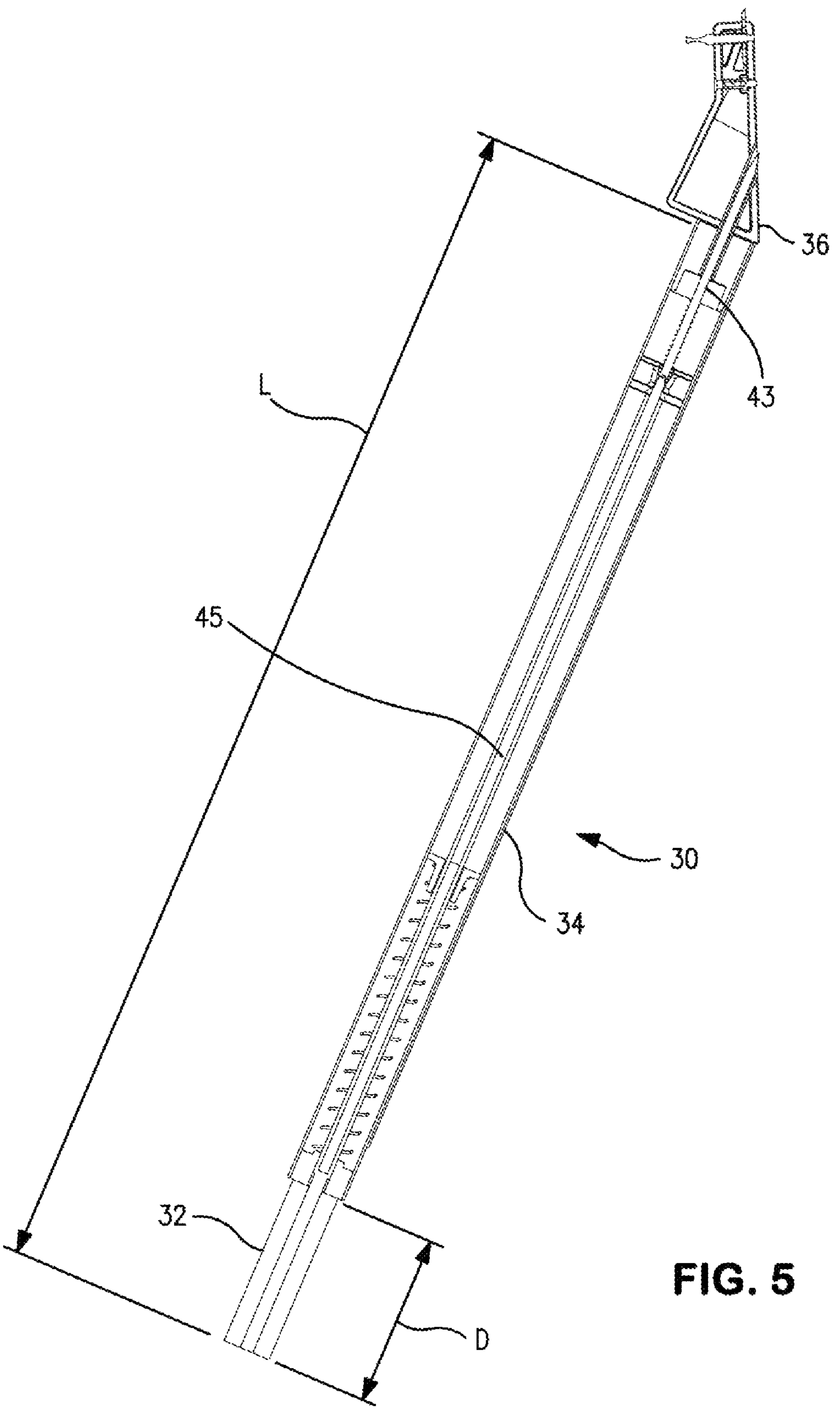
FIG. 5 is a side elevational view, portions broken away to show detail and partly in diagram form, of the installation tool of FIG. 1.
Figure 6:
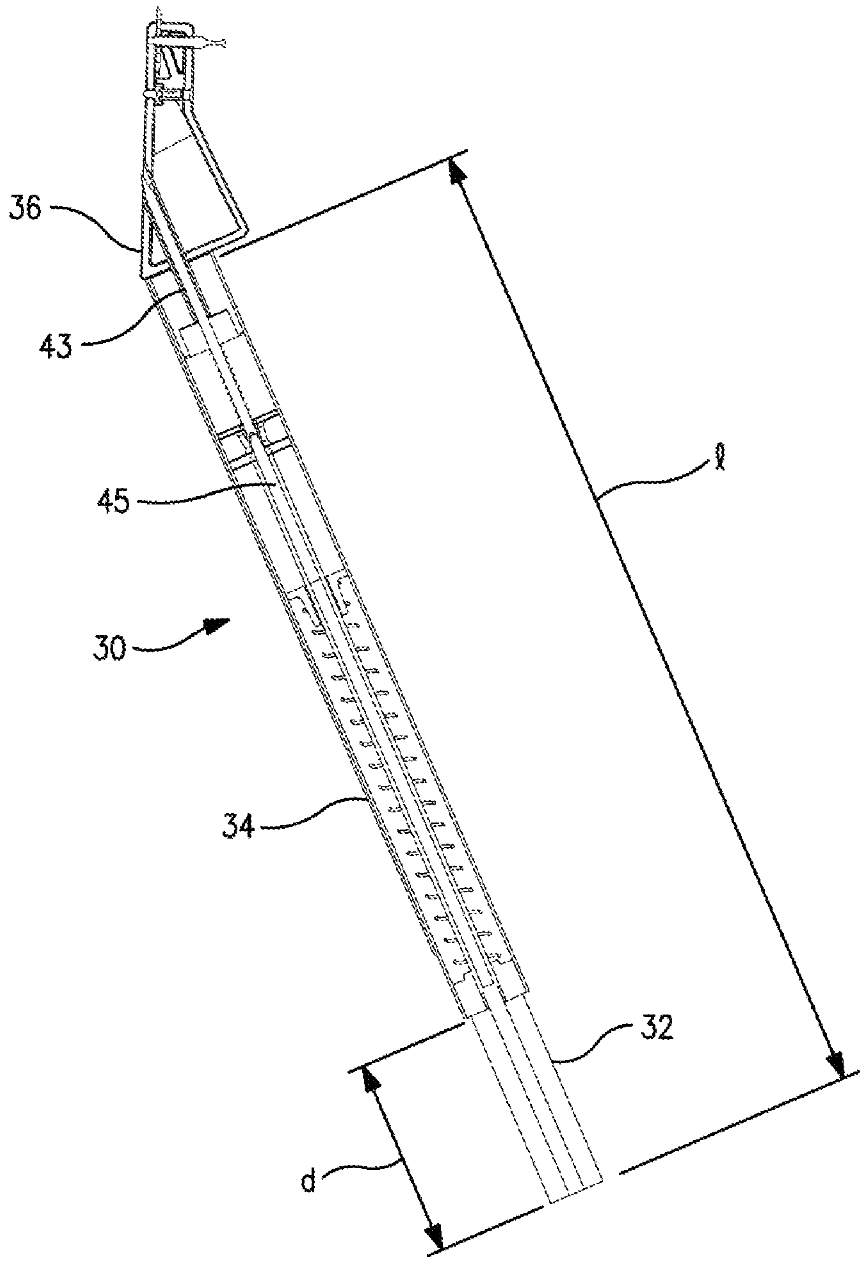
FIG. 6 is a side elevational view, portions broken away to show detail and partly in diagram form, of a modified embodiment of the fastener installation tool of FIG. 1.

With reference to FIGS. 5 and 6, representative tube assembly lengths are designated by L and l and representative fastener lengths are designated by D and d which also represents the travel distance to drive the screws. For one example in FIG. 5, L=36.14" and D=8". In FIG. 6, l=27.4" and d=6". The telescopic tube assembly 30 preferably has a maximum length of between 27.4 inches and 36.14 inches to accommodate the height and reach of the installer. For a six-inch fastener 12, the telescopic assembly 30 must retract 6 inches to drive the fastener, as will be described below.

The installation tool 10 dimensions allow for the tool to be effectively and efficiently used for connecting the top plates 22 to the roof support members 26 without requiring the use of a ladder, platforms or other means for providing the proper effective height relationship for driving the fasteners 12. Moreover, the proper fastener angle may be sequentially implemented from location to location along the top plate 22 to ensure a proper consistent angle for each of the multiple fasteners and to provide an integrated composite connection having an uplift resistance of high integrity.

The installation tool 10 preferably comprises a driver assembly 40 which includes a power driver 42. The driver 42 may be a conventional drill gun such as DeWalt™ model or an impact driver. The elongated telescopic tube assembly 30, which may have a rounded, rectangular or other profile, is mounted over and attaches to the forward torque end 44 of the driver 42. The telescopic tube assembly 30 comprises a proximal tube 32 which receives and mounts the driver 42 and a longer tube 34 secured to the tube 32. During fastener driving, tube 32 slides relative to tube 34 which essentially remains stationary in relation to the components to be connected by the fastener. Tube 34 terminates in a distal end 36.

A fastener guide assembly 50 is mounted at the distal tip 36 of the tube assembly. The guide assembly 50 provides the proper alignment structure for implementing the preferred 22½° entry angle for the fastener. The assembly 50 also engages the support member for stabilizing the installation tool during the driving process. The guide assembly 50 is dimensioned in accordance with the dimensions of a given fastener. The guide assembly has a fastener channel 52 which functions to receive and load the fastener in a muzzle-loading fashion. The fastener drill tip 16 is positioned proximate the channel opening 53. The fastener is inserted head 14 first into the fastener channel 52 of the guide assembly. The fastener head 14 is engaged by a complementary torque coupler 43, such as a socket, for a hex thread fastener or a projecting coupler for a fastening head socket at the applicator end of the torque drive assembly train 45. The drive train 45, which may include multiple components, extends through and is housed within the tube assembly 30 and is driven by the torque driver 42.

Figure 8:
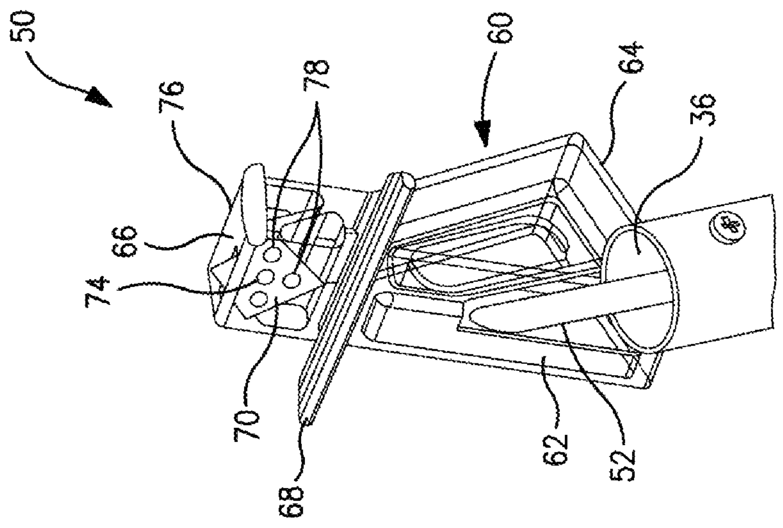
FIG. 8 is a perspective view of the guide portion of FIG. 7, portions being shown in phantom and portions being shown to reveal internal detail.
Figure 7:
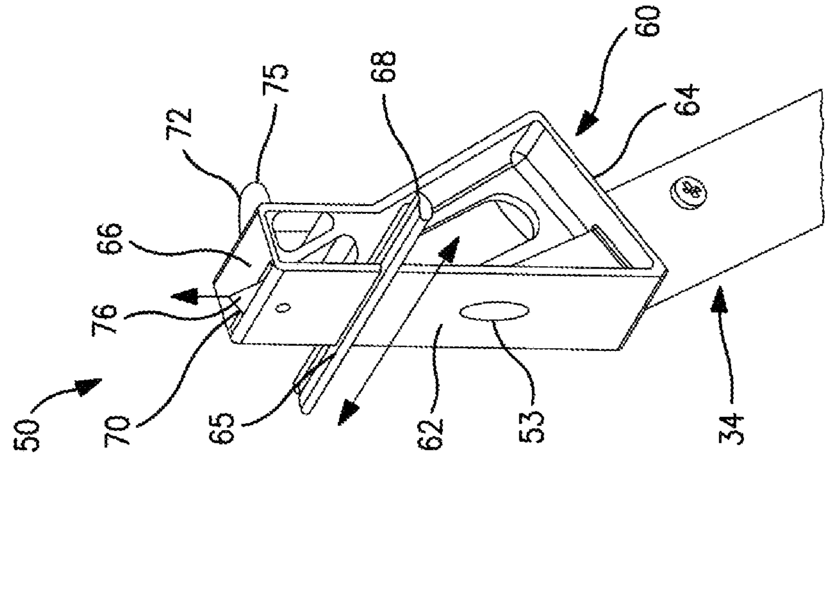
FIG. 7 is a perspective view, partly in diagram form, of a guide portion of the installation tool of FIG. 1.

With reference to FIGS. 7 and 8, guide assembly 50 is preferably a cast or molded member of a lightweight rigid form which is mounted at the distal end 36 of the tube assembly. The guide assembly 50 has a frame 60 with a planar locating or engagement surface 62 disposed at an acute angle with respect to lower planar mounting surface 64. Mounting surface 64 preferably engages against the end of the tube assembly and transversely extends across the end of the tube 34. A planar end plate 66 is preferably perpendicular to surface 62 and is positioned and configured to closely approach or even contact the underside of the roof support member 26 (as will be explained below). The acute angle is preferably 22½°, although other angles may be provided depending on the intended application of the installation tool 10.

The fastener channel 52, which may be formed by a cylinder, has a central axis which is perpendicular to the surface 64. The fastener channel axis is disposed at an acute angle of preferably 22½° to the surface 62. Surface 62 defines the channel opening 53. The channel 52 receives the fastener 12 so that the head 14 is proximate and readily engageable with the torque coupler 43.

A transverse slot 65 receives an alignment bracket 68 having a T-shaped section which protrudes transversely at opposed sides of the engagement surface 62 and also projects outwardly from the surface 62. The alignment bracket 68 is positioned and configured to fit or ride below the 2×4 of the top plate 22 to ensure proper perpendicular alignment with the top plate 22. The alignment bracket 68 may be secured in the frame by a friction or interference fit or may be secured by a fastener (not illustrated) to the frame and can be transversely moved. In one embodiment, the bracket 68 is located approximately 1⅝ inches below the end plate 66.

The upper portion of the frame is traversed by a slot 69 which receives a metal stabilizer plate 70. The stabilizer plate is secured in place by a threaded adjustment knob 72. The knob 72 connects with a threaded rod 74. The rod extends through an opening in the plate 70 and threads into a central threaded opening 75. The stabilizer plate 70 preferably has a square configuration with four vertices which form edges 76. The edges 76 are sharpened. When the plate 70 is mounted in position, one edge 76 or vertex projects upwardly from the end surface 66 of the frame. Openings 78 are provided in the plate to provide a height adjustment for vaulted ceilings and other configurations. Alternatively, the projecting structure is in the form of a barb.

The function of the stabilizer plate 70 is to provide a stabbing point to engage into the wood proximate the interface of the top plate 22 and the roof support member 26 to thereby stabilize the tool and prevent movement while the fastener is being torqued by the installation tool. The stabilization is especially important at the initial stages of driving the fastener.

In addition, the stabilizer plate functions to present a stabbing point so that upon inspection, an inspector will readily perceive that the fastener is at the proper angle.

The guide assembly 50 is positioned by the installer at the intersection of the top plate 22 and the roof support member 26 with the projecting stabilizer plate edge 76 engaging into the wood and the engagement surface 62 engaging in surface-to-surface relationship against the vertical side of the top plate 22. The end surface 66 is typically positioned proximate the underside of the roof support member 26, but is slightly offset due to the less than complete penetration of the stabilizer edge, and the alignment bracket 68 engages the lower edge portion of the top plate 22.

Prior to engagement of the guide assembly with the top plate/roof support structure (as previously described), a fastener 12 is dropped into the fastener channel 52 with the fastener head 14 proximate to or engaging with the complementary coupler 43. A portion of the fastener 12 is typically initially received in a chamber of tube 34 adjacent the distal end 36. The fastener drill tip 16 is proximate the channel opening 53 in the engagement plate 62. It will be appreciated that the guide assembly 50 as properly positioned provides the proper entry point and entry angle for the fastener 12 as the fastener is driven through the top plate 22 into the roof support member 26.

Figure 42:
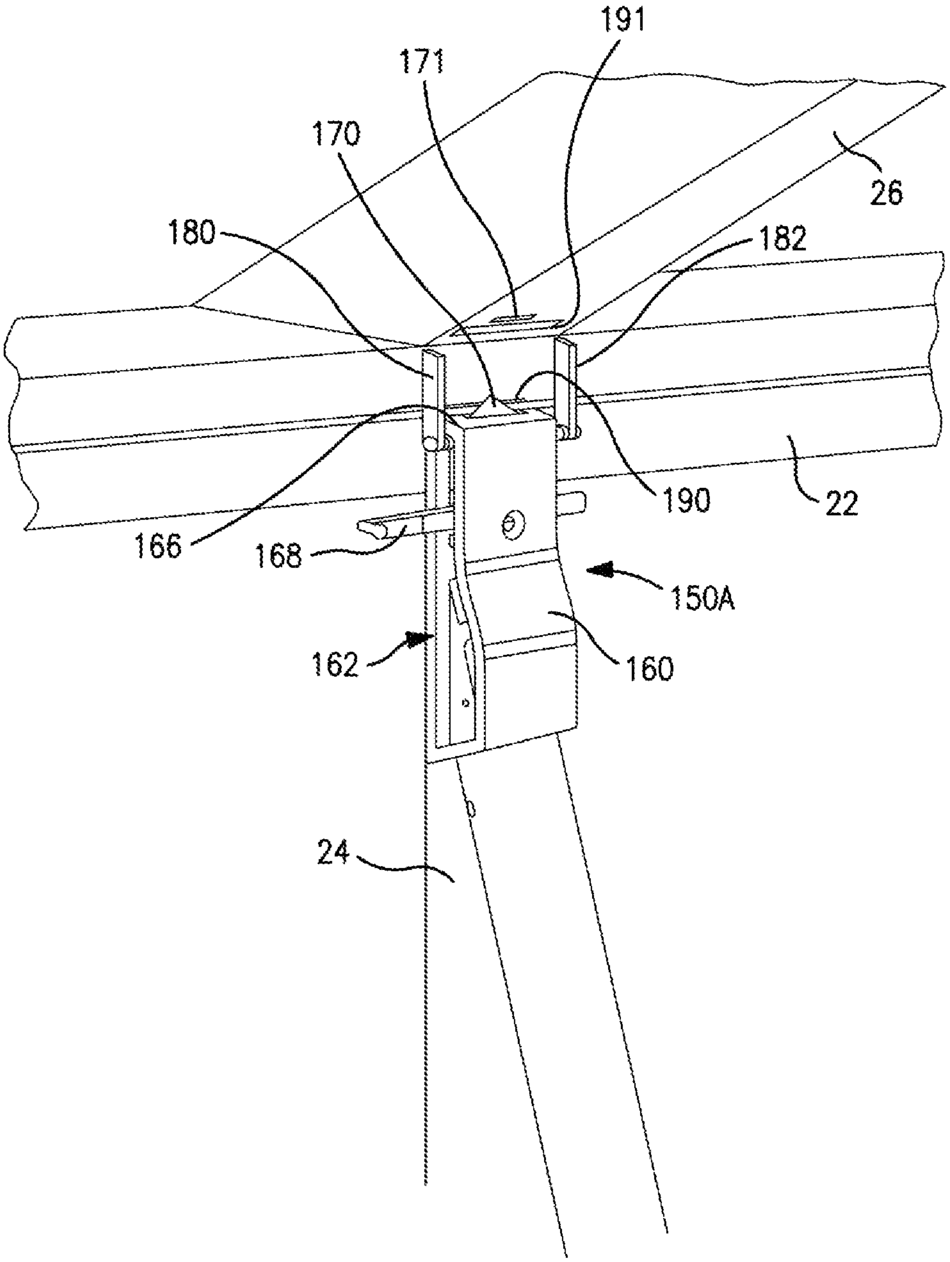
FIG. 42 is a representative perspective view of a structure during its constructive phase and illustrating another embodiment of an installation tool guide head.
Figure 43:
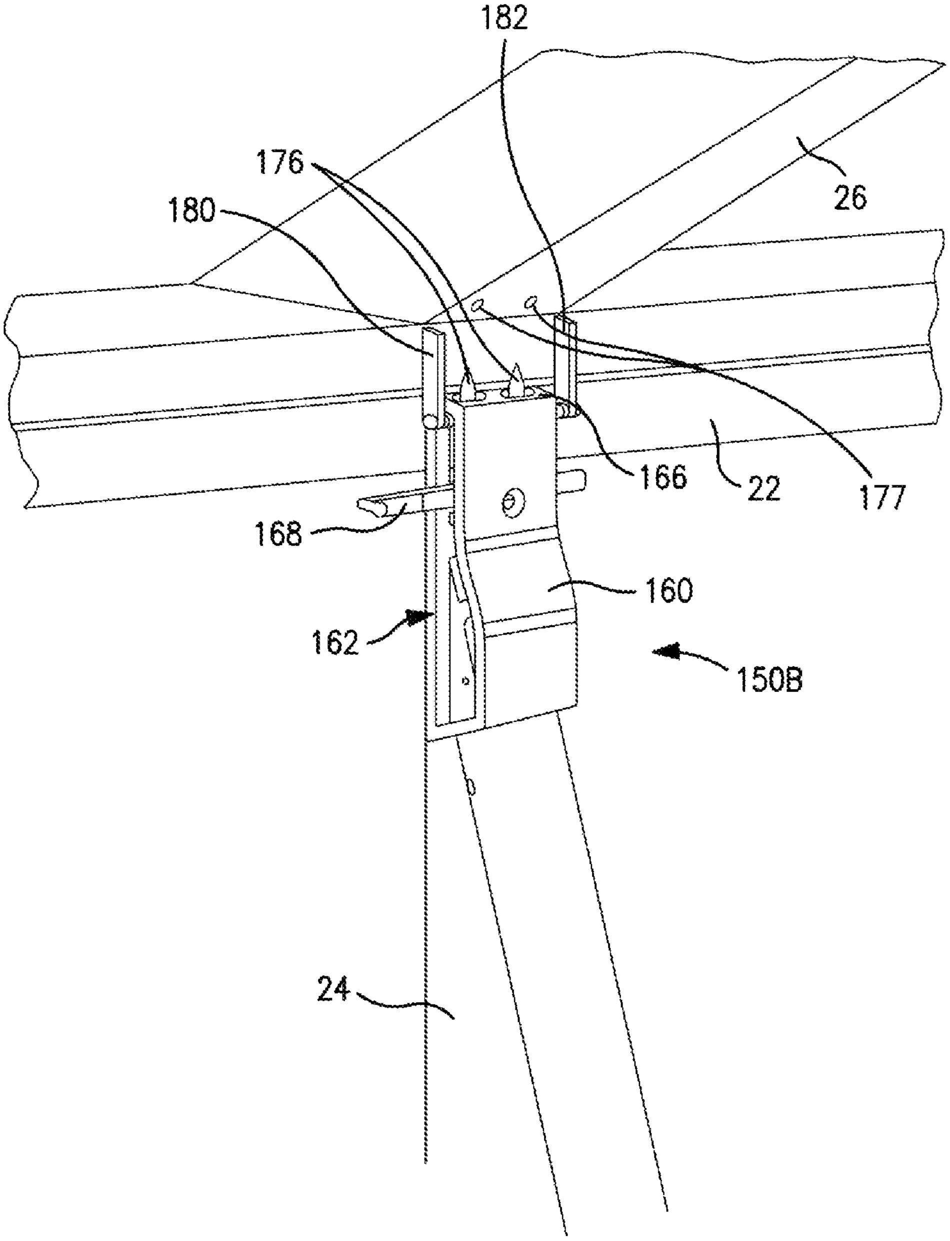
FIG. 43 is a representative perspective view, partly in schematic, of a structure during its construction phase and illustrating a further embodiment of an installation tool guide head.

With reference to FIGS. 42 and 43, alternative embodiments of the guide assembly that mount to the end of the telescopic tube assembly of an installation tool are generally designated as guide head 150A and guide head 150B, respectively. These guide heads include additional features both for providing the proper alignment and positioning for the screw and for enhancing the ability of the operator and/or an inspector to verify that a proper connection has been made. Each of the guide heads has a frame 160 with a planar locating surface 162 disposed at an acute angle with respect to a tube assembly. Locating surface 162 defines a channel opening for the fastener channel access of the tube assembly. A planar end plate 166 is configured to engage or closely approach the underside of the roof support member 26.

An L-shaped bracket preferably extends transversely at opposed sides of the engagement surface and projects outwardly from the surface to provide an alignment bracket 168 to engage the vertical support 24. Bracket 168 may be adjustable. A pair of arms 180 and 182 is pivotally mounted at the top of the frame. One or more of the arms 180 and 182 may be pivoted upwardly to engage a vertical side of member 26 and provide a proper positioning relative to the roof support member 26.

A stabber point 170 projects through the end plate 166. In addition, the upper portion of the frame mounts a linear ink pad 190. In the embodiment position illustrated in FIGS. 42 and 43, the guide heads 160A and 160B have not been positioned against the roof support member 26. Upon proper positioning, the pivotal arms 180 and 182 would engage against the sides of the support member 26, and the ink pad would make a linear mark indicated at 191 on the bottom of the roof support member 26. In addition, the stabber 170 would stab into the wood and leave a mark 171 as indicated. It should be appreciated that either the ink mark 191 or the stab mark 171 could be used to identify both the proper fastener as well as the proper entry angle of the fastener and accordingly indicate that a proper connection has been completed.

The guide head 150B illustrated in FIG. 43 has a pair of barbs 176 projecting from the end plate 166. When properly engaged under the roof support member 26, the pair of barbs would provide two marks 177 which would again provide a unique marking for indicating the proper connection. Of course, the barbs 176 also enhance the stability of the installation tool and the fastener during the installation process.

The installation tool preferably includes an auxiliary handle (in addition to the handle on the driver 40) to facilitate two-handed positioning and stability during the driving process. Various auxiliary handle configurations can be employed.

Figure 1:
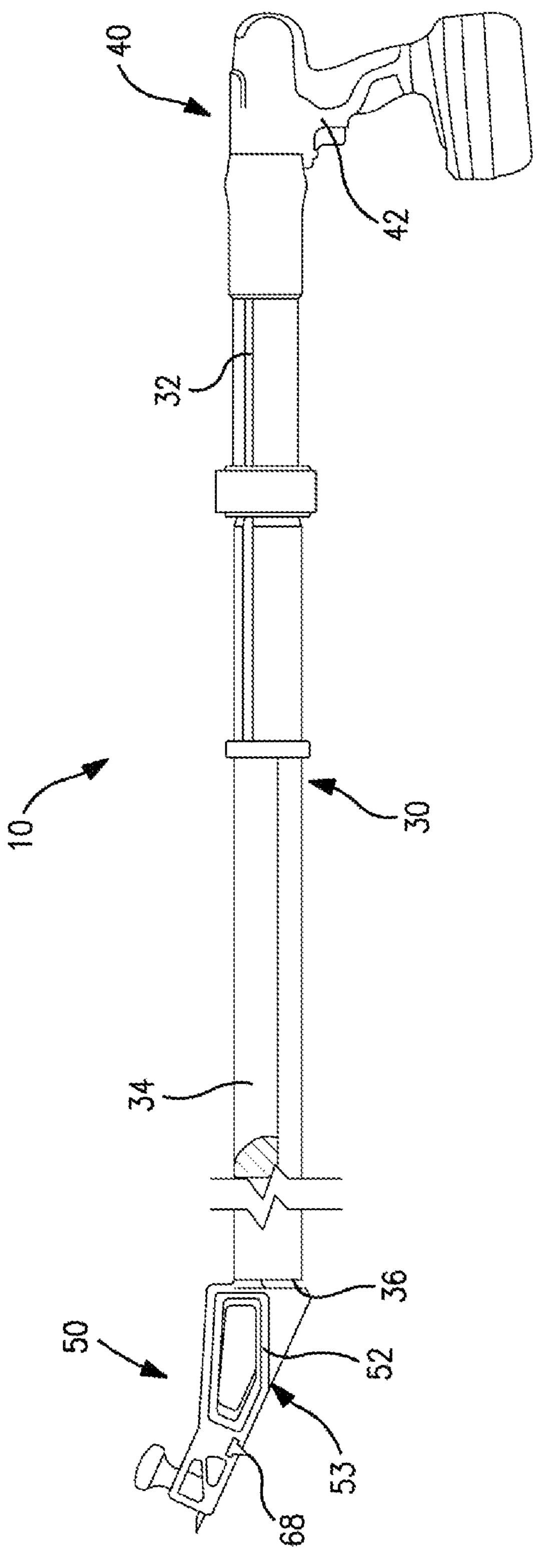
FIG. 1 is a side view, partly broken away, of a fastener installation tool for securing a top plate to a roof support member.
Figure 2:
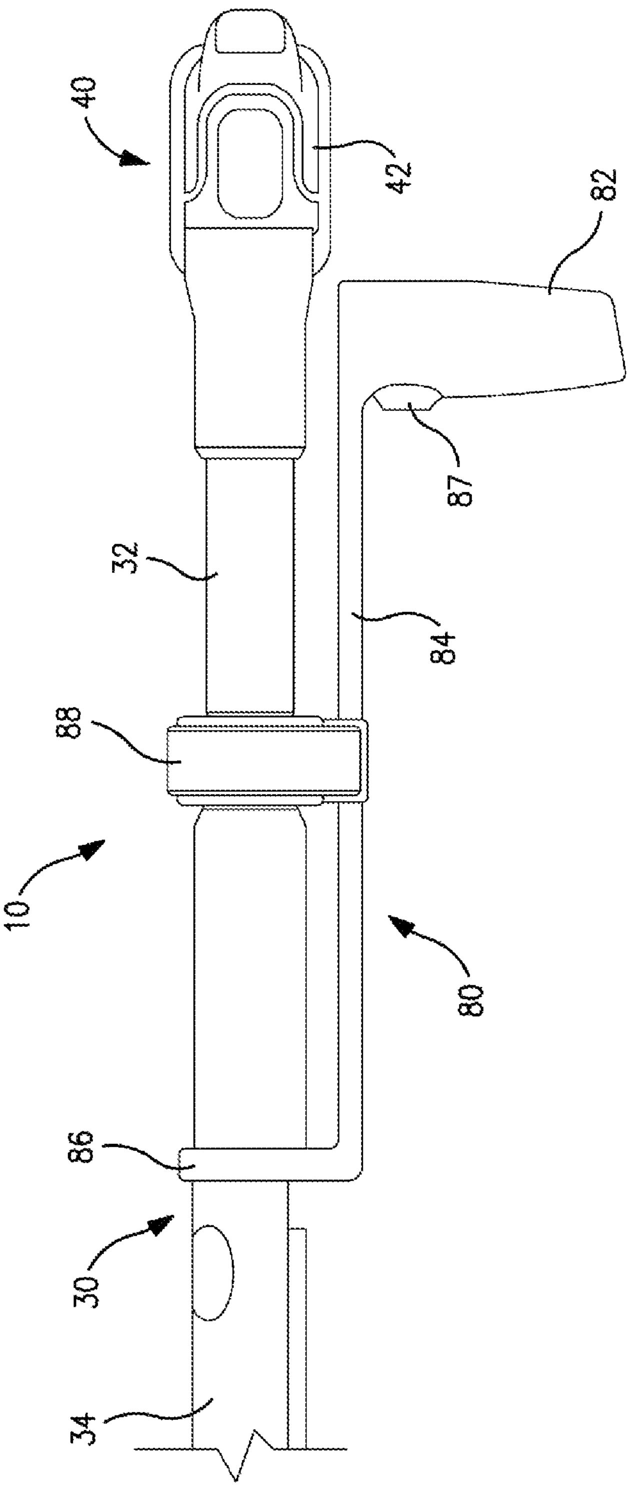
FIG. 2 is a fragmentary top plan view of the installation tool of FIG. 1.
Figure 3:
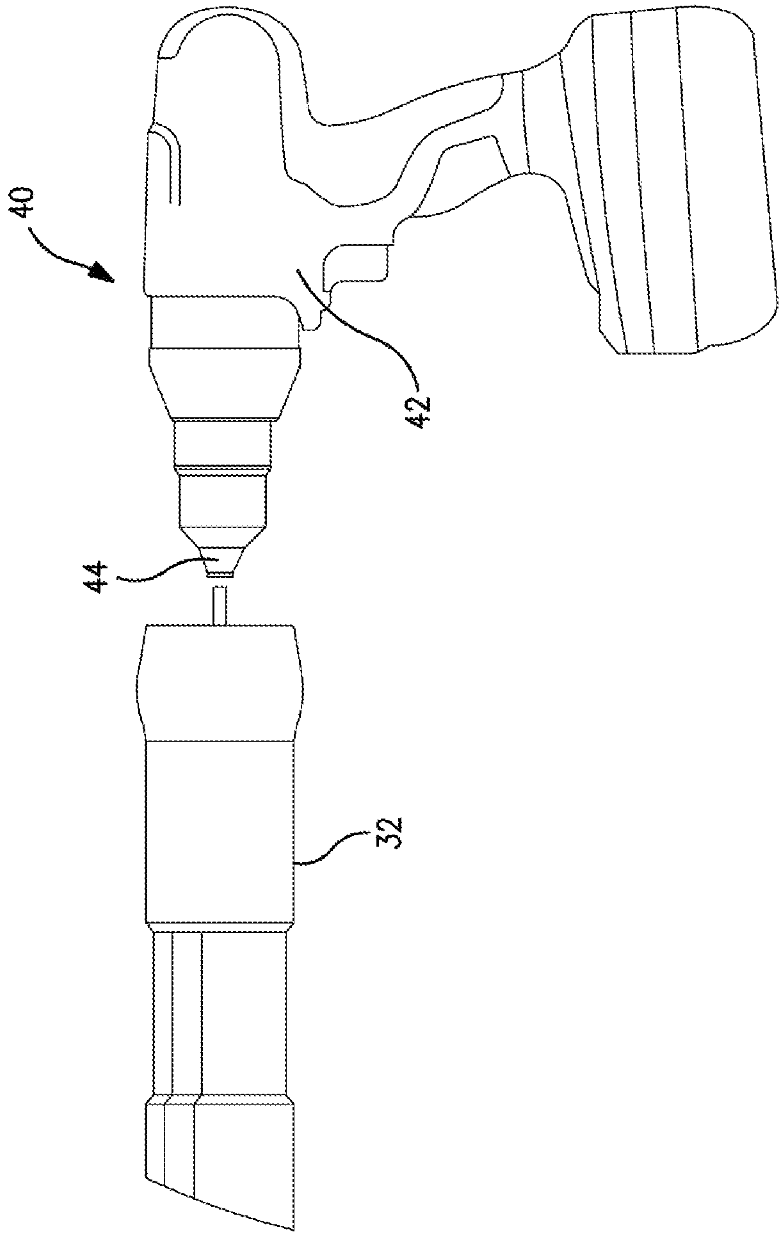
FIG. 3 is a fragmentary partially disassembled side view of the installation tool of FIG. 1.
Figure 9:
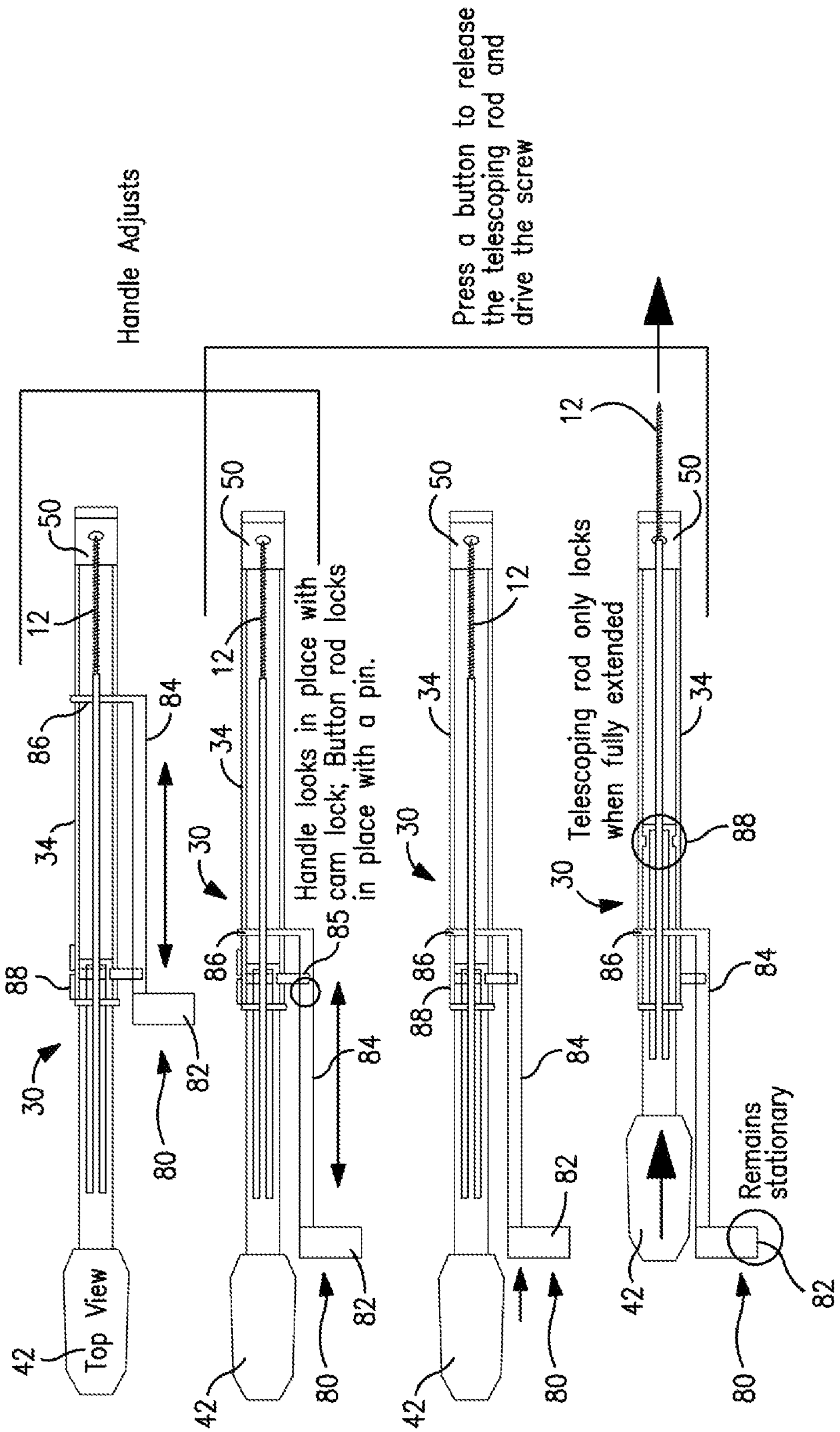
FIG. 9 is an annotated composite schematic view illustrating the sequential operation of the installation tool of FIG. 1.
Figure 10:
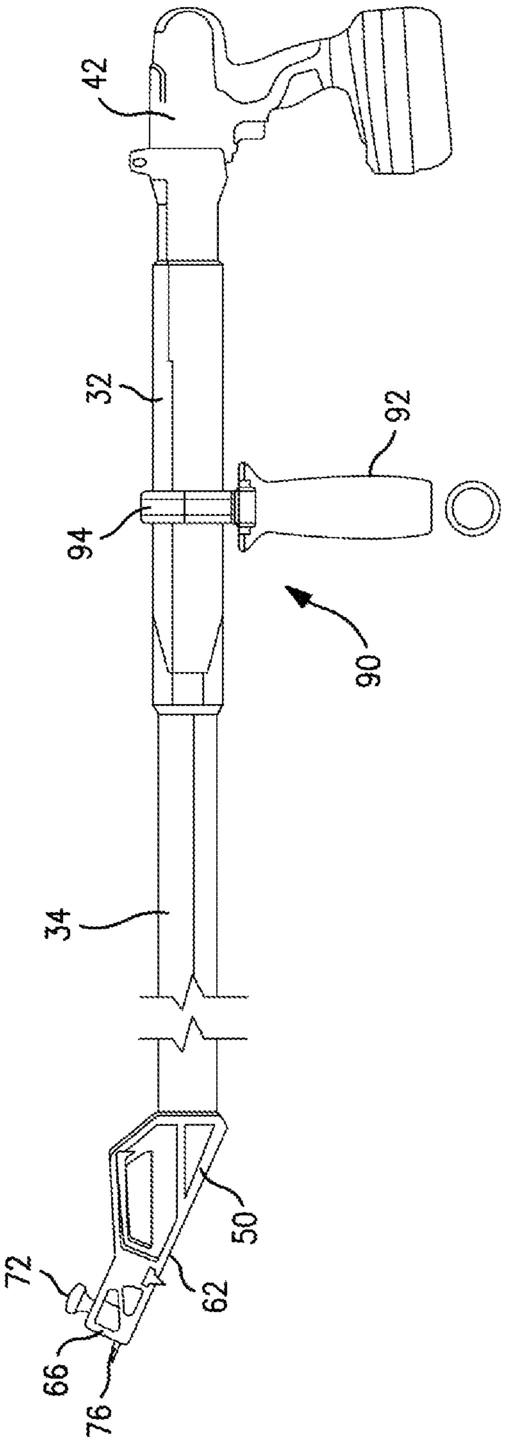
FIG. 10 is a side elevational view, partly broken away, of a second embodiment of a fastener installation tool for connecting a top plate with a roof support member.
Figure 11:
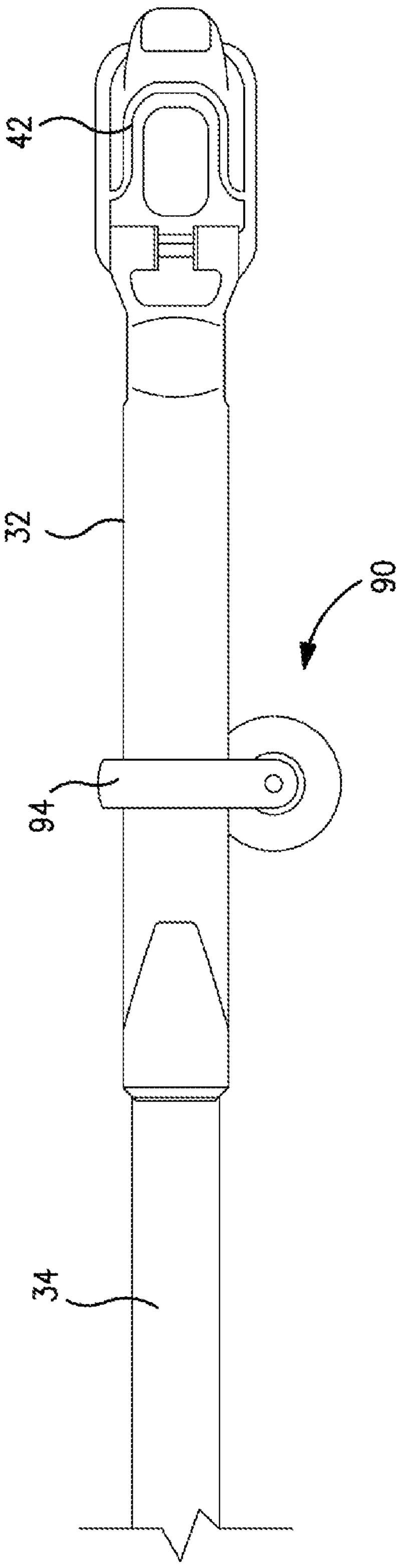
FIG. 11 is a fragmentary top plan view of the installation tool of FIG. 10.

With reference to FIGS. 2 and 9, an auxiliary handle 80 is slidably mounted to the tube and is longitudinally adjustable to provide an auxiliary handle for the installer. The handle 80 includes a rear grip 82 which radially projects radially or quasi-radially relative to the longitudinal axis of the tube assembly. A forward rod 84 extends from the grip generally parallel to the tube assembly. The rod 84 connects to a forward yoke 86 which envelopes the outer surface of the tube assembly and is slidable along the tube assembly. The intermediate portion of the rod is received in a cam lock 88 carried by the fixed proximal tube 32 that mounts to the forward portion of the driver 42. The rod locks in place with the cam lock 88.

The tube 34 telescopes with the proximal tube 32 and is slidably receivable throughout the driving of the fastener 12 in the installation process as the fastener is driven to complete the connection. The changing dynamic relationships of the fastener 12, the guide assembly 50, the telescopic tube assembly 30 and the handle 80 at the various stages of installation are illustrated in FIG. 9.

The auxiliary handle 80 is selectively adjustable by the installer to provide maximum stability and comfort to the installer. The handle locks in place with a pin 85. The handle 80 is initially adjustable. A button 87 is pressed to release the telescoping tube 34 from its fixed relationship with the proximal tube 32 and drive the threaded fastener. The handle 80 essentially remains stationary as the driver moves during the installation progress, as best illustrated in FIG. 9. The tube 32 retracts relative to tube 34 to accommodate the progressive expelling of the fastener 12 from the fastener chamber 52. The telescoping tubes 32 and 34 only lock when in the fully driven position, at which point, the fastener 12 is fully driven.

It should be appreciated that approximately six-inch driving link is required for driving a six-inch fastener.

With reference to FIGS. 10, 11 and 12A-C, an automatic locking handle is generally designated by the numeral 90. The handle 90 is generally configured to radially extend from the proximal tube 32 and slide along the tube 32 during the driving process until it automatically locks at the full drive position. The handle has an orthogonally projecting grip 92 which connects with a yoke 94. The yoke 94 wraps around the tube 32 and is exteriorly slidable therealong.

Figure 12A:
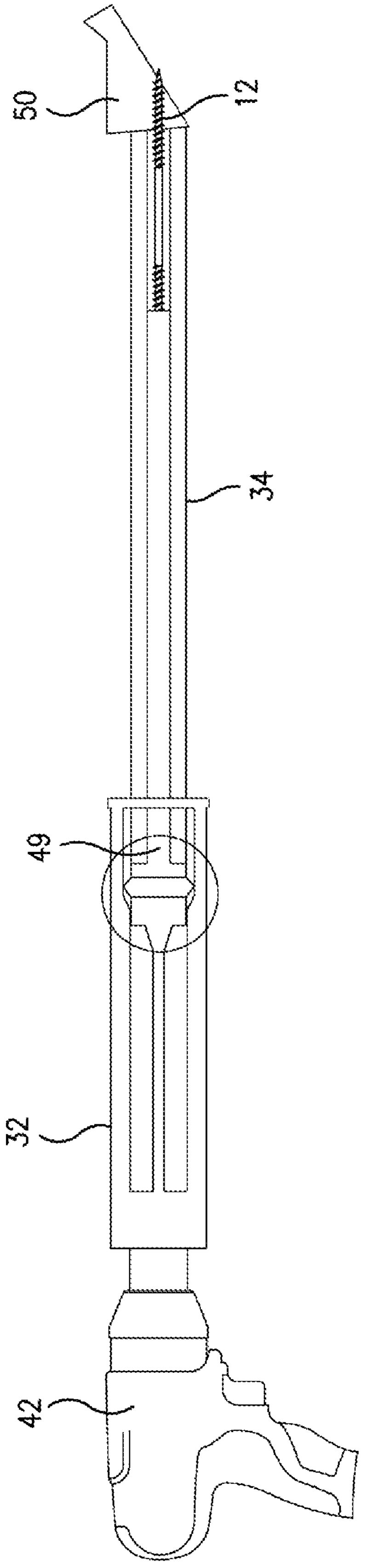
FIGS. 12A-12C are side elevational views, partly in schematic, illustrating the sequential operation of the installation tool of FIG. 10.
Figure 12B:
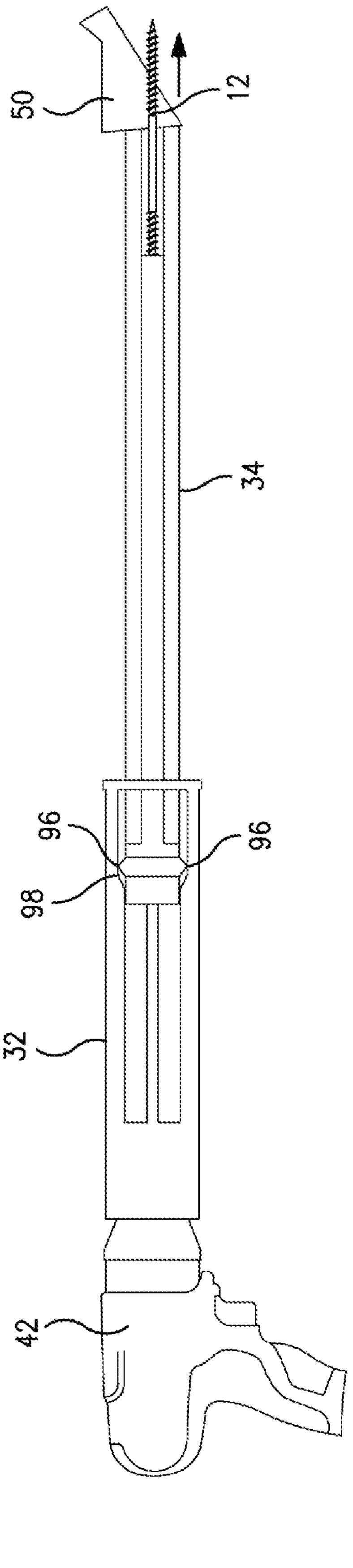
Figure 12C:
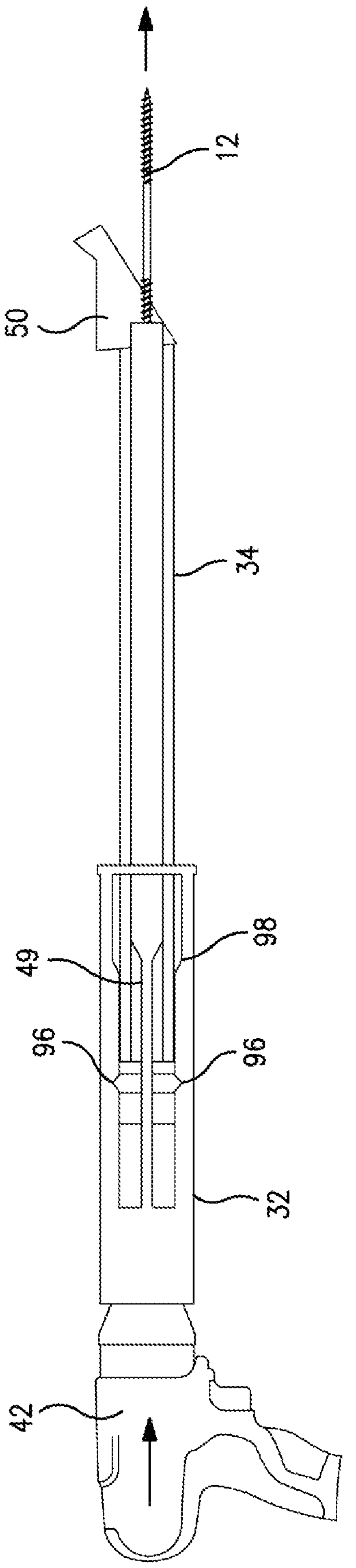
Figure 13:
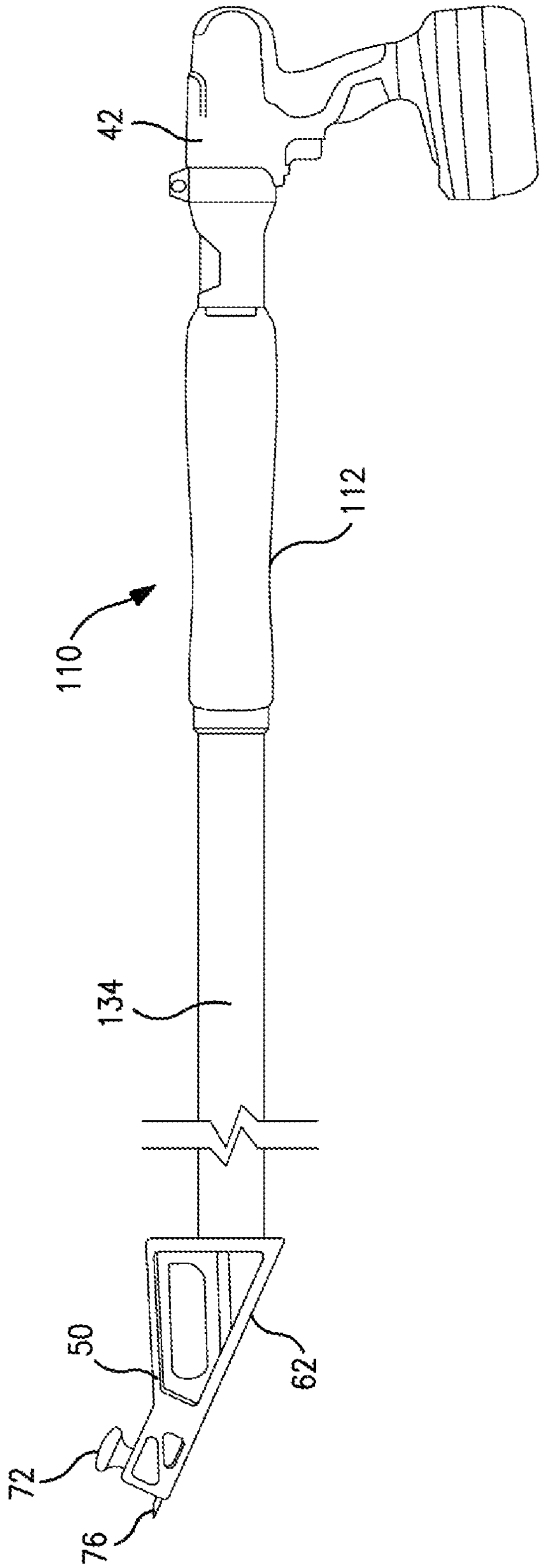
FIG. 13 is a side elevational view, partly broken away, of a third embodiment of a fastener installation tool for connecting a top plate with a roof support member.
Figure 14:
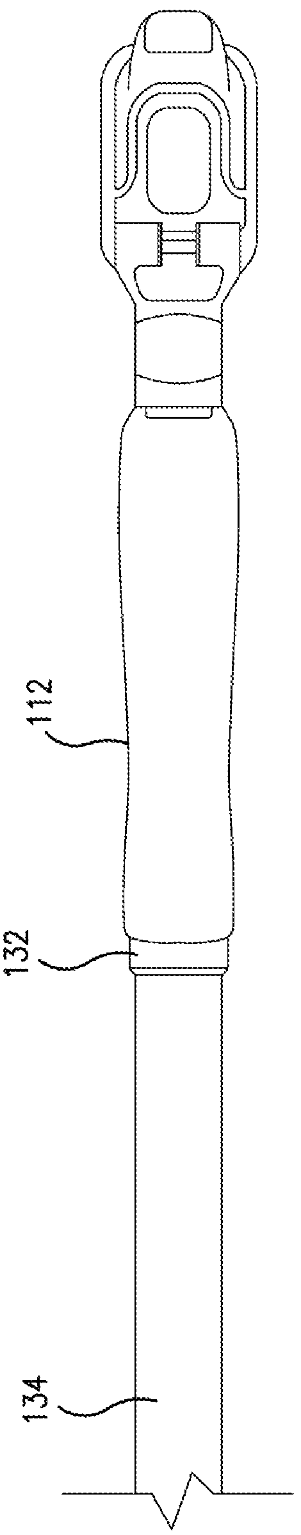
FIG. 14 is a fragmentary top plan view of the installation tool of FIG. 13.

The automatic locking handle 90 is automatically locked by the use of balls 96 which are entrapped in a bearing 98. The driving rod 49 has a varying diameter along a longitudinal portion. As best illustrated in the sequence of FIGS. 12A-C, as the fastener 12 is driven, the geometry of the driving rod has reduced diametric surfaces allowing the balls to slip by and the outer distal tube 34 to fully telescope. The external handle can be placed anywhere along the proximal tube 32. It will be appreciated that as the fastener 12 is driven, the handle is rearwardly displaced toward the driver 42 until a fully locked position is obtained and the telescoping tube 34 is retracted.

With reference to FIGS. 13, 14 and 15A-D, another handle which may be employed for a third embodiment of a fastener installation tool is generally designated by the numeral 110. The handle 110 includes a circumferential grip 112 which extends around the proximal tube 132. The grip 112 may be easily moved along the base tube 32 and tightened in position or loosened by means of a twisting motion on the grip about the longitudinal axis of the tube assembly 30.

Figure 15A:
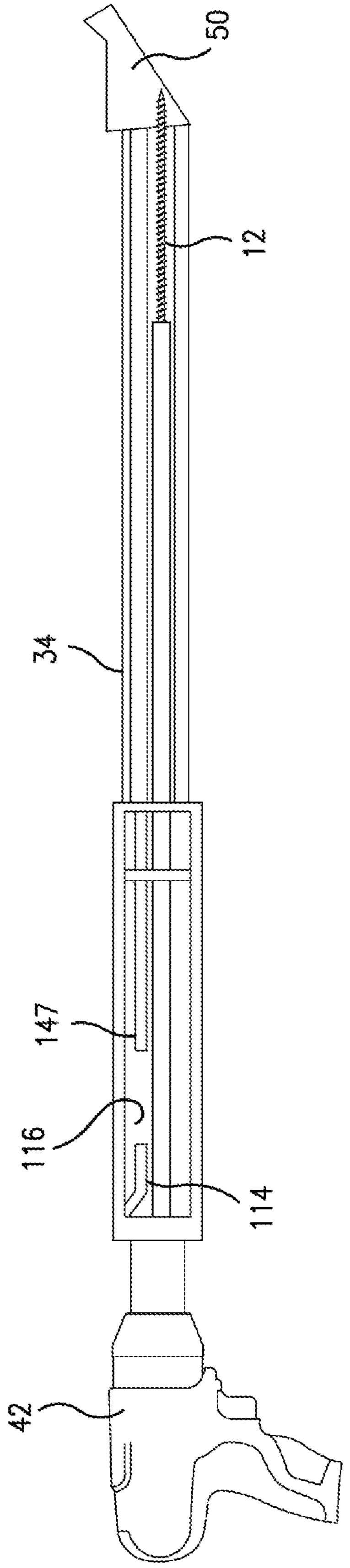
FIGS. 15A-15D are annotated representative side elevational views, partly in schematic, illustrating the sequential operation of the installation tool of FIG. 13.
Figure 15B:
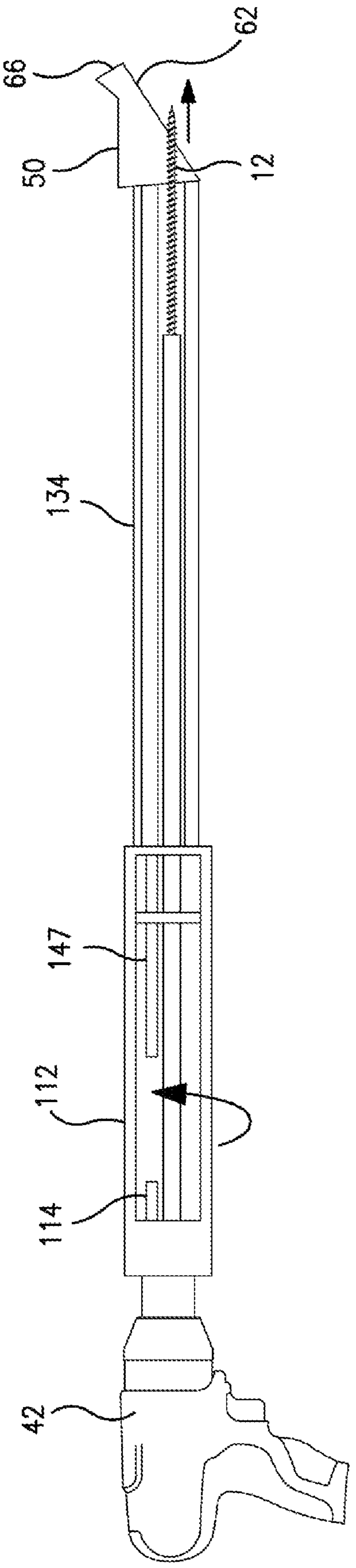
Figure 15C:
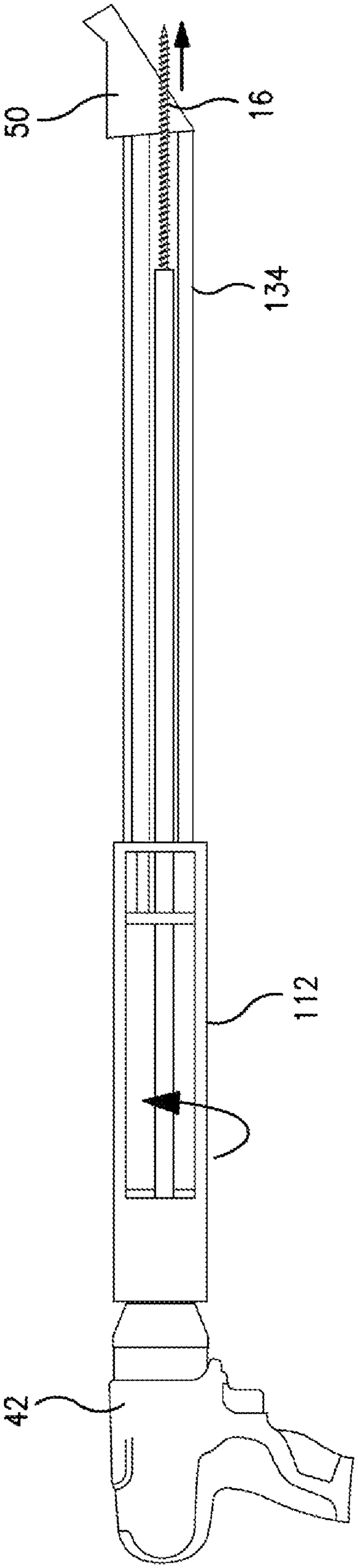
Figure 15D:
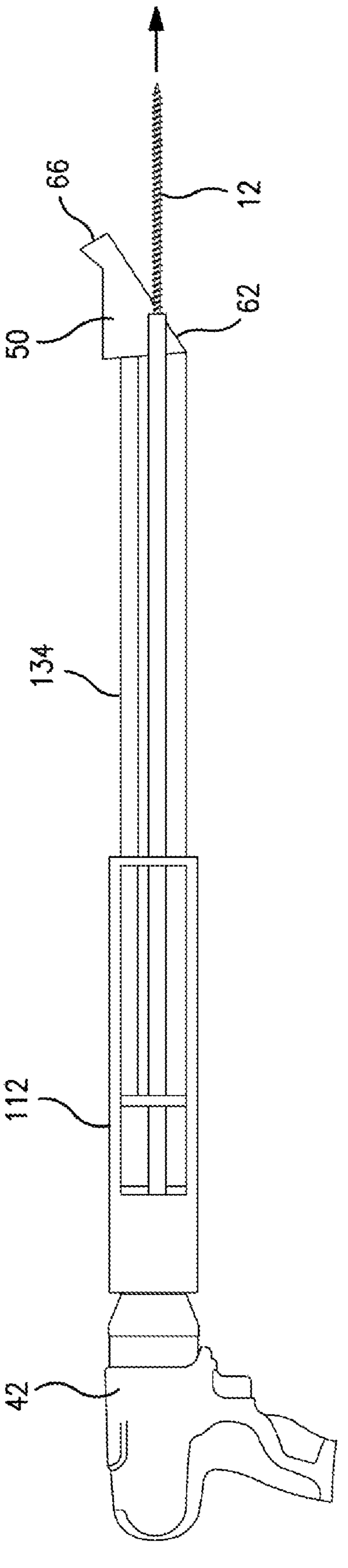

A protrusion 114 rides within an internal slot 116 which is attached in fixed relationship to the driver 42. The proximal tube 132 forms the internal slot 116, and the sliding tube 134 includes an external rib 147. The internal slot 116 is not aligned with the rib 147 in the dormant/non-drive state (FIG. 15A). As the driver starts to drive, the protrusion 114 starts to ride in the internal slot 116 until it changes geometry and twists, thereby causing the handle to twist (FIGS. 15B-C). The foregoing continues until the second slot is aligned with the external rib, thereby allowing the tube 134 to fully telescope inwardly (FIG. 15D). When the installer feels the handle 110 rotate slightly, the installer knows that the fastener 12 has been sufficiently initially driven, and the installer can release the grip 112 on the handle and place both hands on the driver 42.

Naturally, other handles are possible. In some embodiments, an auxiliary handle as such is not required. In such embodiments, the installer merely grips along the tube assembly at a location that appears to be most advantageous.

The installation tool 10 is preferably battery powered and includes a chargeable battery power pack. However, in some embodiments, the power driver (not illustrated) may be directly electrically powered and include a cord which connects with the power line.

Figure 16A:
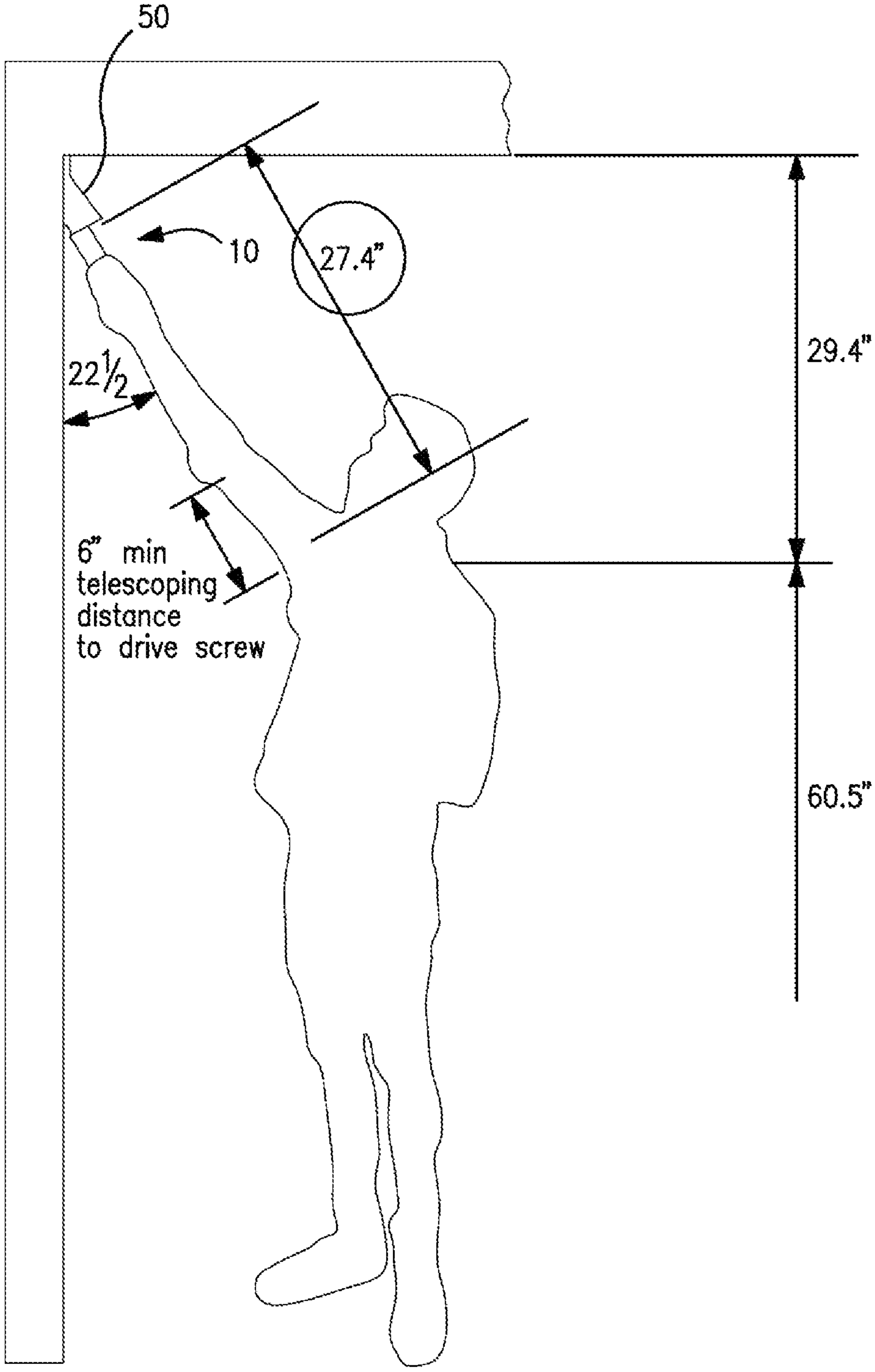
FIGS. 16A-16B are schematic diagrams illustrating the usage and versatility of a representative fastener installation tool for different structural heights and wherein the installers have different heights.
Figure 16B:
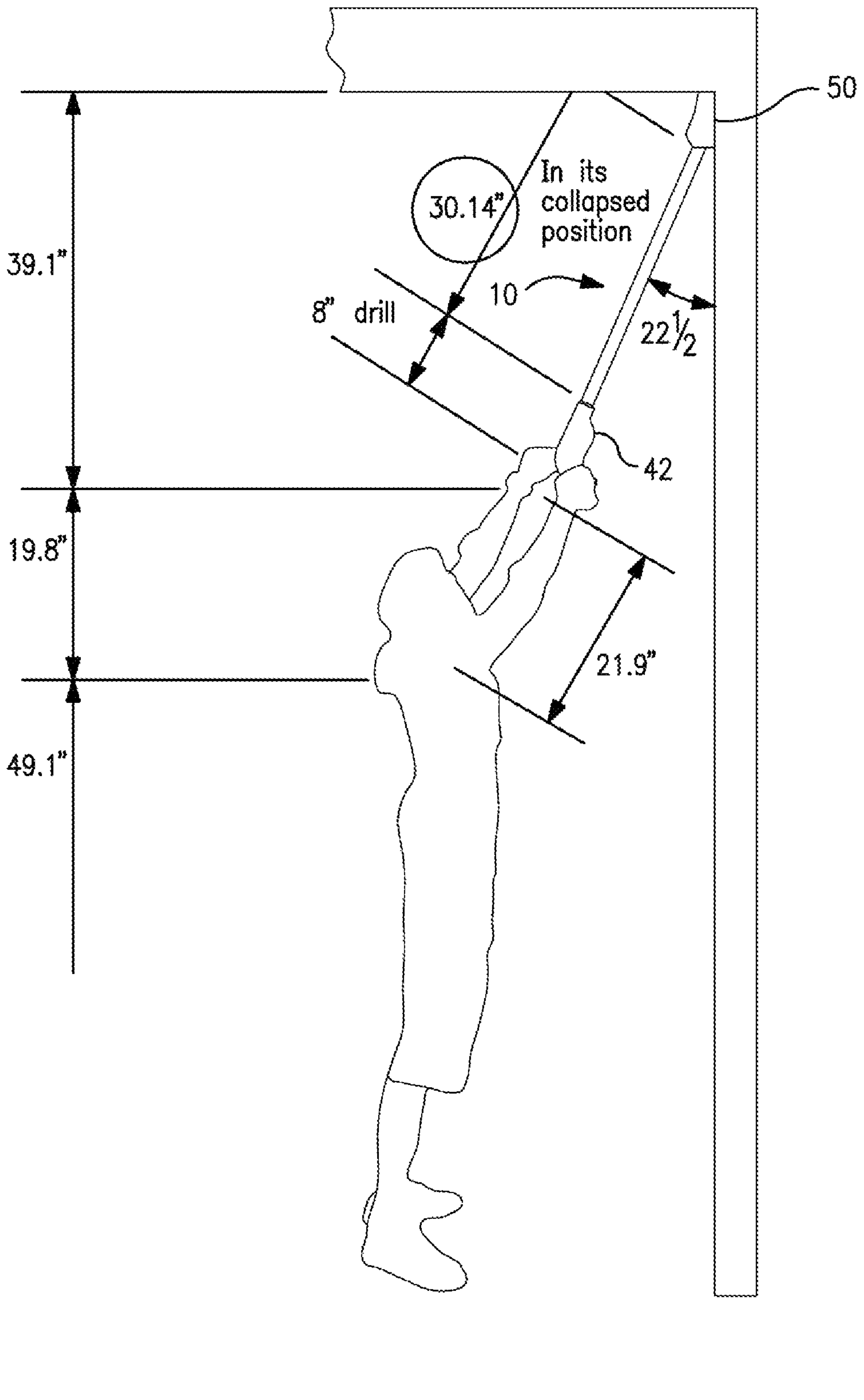

With reference to FIGS. 16A and 16B, two different structural heights of the top plane 22 and two appropriately dimensioned installation tools for relatively tall and short installers (shown in silhouette) are illustrated, it should be appreciated that the dimensioning of the telescopic tube assembly 30, in terms of longitudinal length, is established to accommodate the preferred application in connection with connecting a top plate 22 to a roof support member 26 without the installer needing a ladder or a platform to obtain the correct reach for driving the fastener. In addition, because the height and reach of an installer may significantly vary, the length of the telescopic tube assembly 30 is preferably selected to accommodate a wide range of installers' physical dimensions.

For applications wherein a fastener greater than 6 inches or even less than 6 inches may be applicable, an alternative guide assembly may be employed. For such a guide assembly, the effective depth of the fastener channel is altered. In addition, the telescopic extremes of the telescopic tubes 32 and 34 are adjusted to accommodate for the driving length for the fastener. Naturally, the coupler of the installation tool is adapted to complement the head of the fastener.

It should also be appreciated that for applications in which an angle other than 22½° is desired, the guide assembly may also be configured so that the fastener channel is at an acute angle relative to the engagement surface at the prescribed optimum angle. Naturally, the position of the alignment bracket 68 may also be varied in accordance with a specific project. Multiple guide assemblies for various installation angles may be provided and attached to the telescopic tube assembly as desired.

For some embodiments, the power driver 40 is easily dismounted from the telescopic tube assembly 30. The telescopic tube assembly may employ a receiver configured to receive and functionally attach to a wide range of dismountable drill guns without the torque driver being fully integrated with the telescopic tube assembly.

Figure 17:
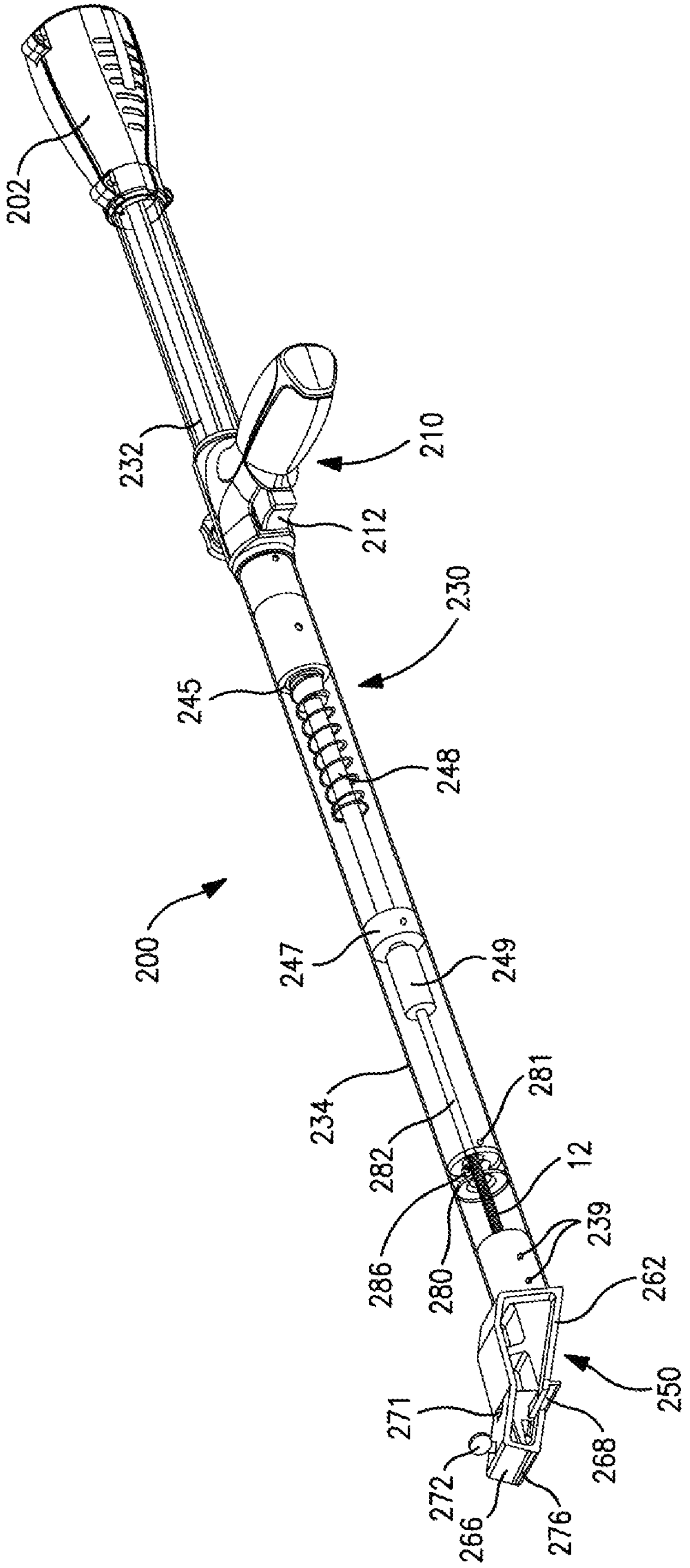
FIG. 17 is a perspective view of a fourth embodiment of an installation tool without the power driver assembly wherein certain external portions are shown as transparent to reveal internal components.
Figure 18:
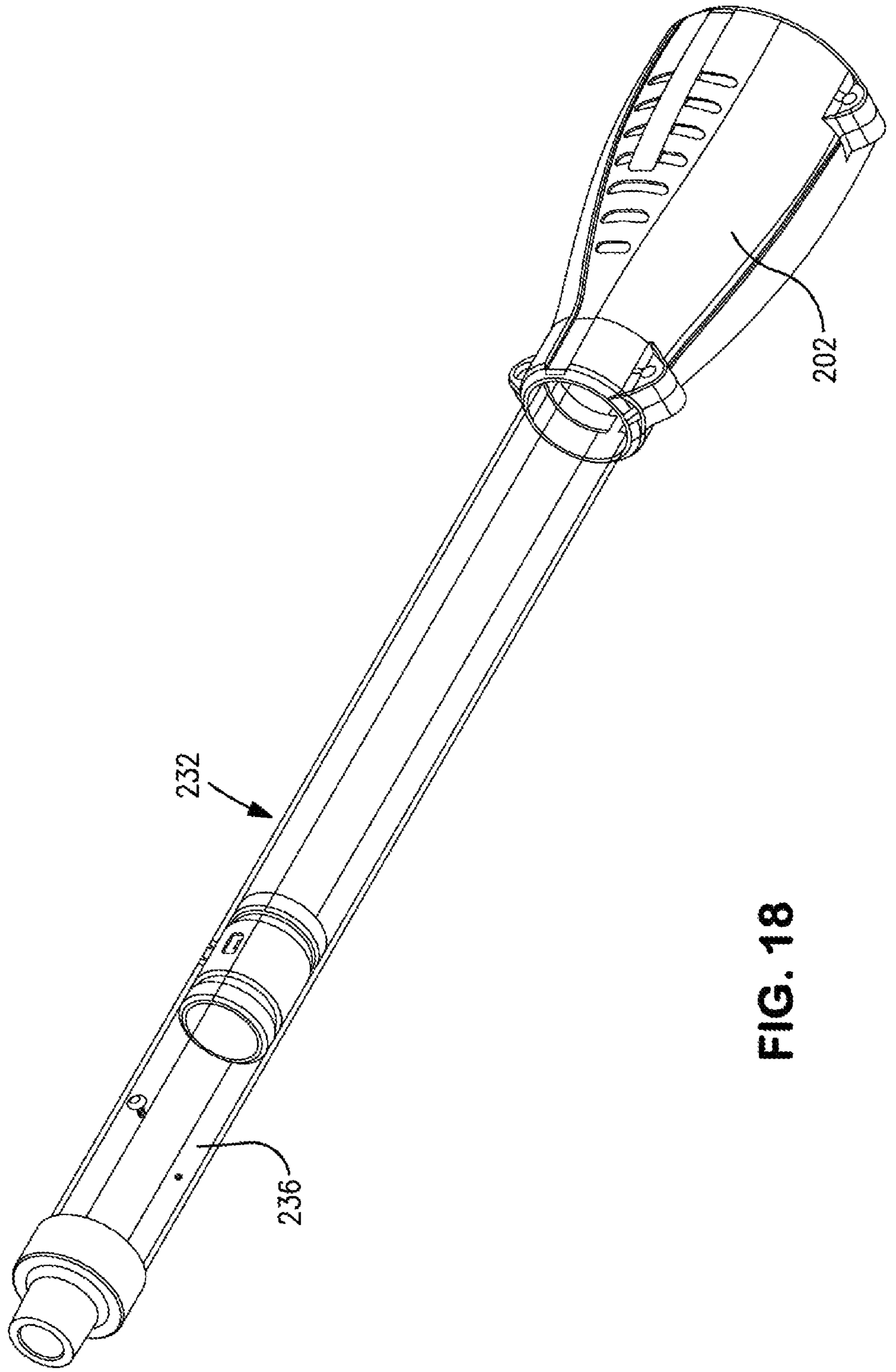
FIG. 18 is an enlarged perspective view of a portion of the installation tool of FIG. 17 wherein certain external components are shown as transparent to reveal internal components.
Figure 19A:
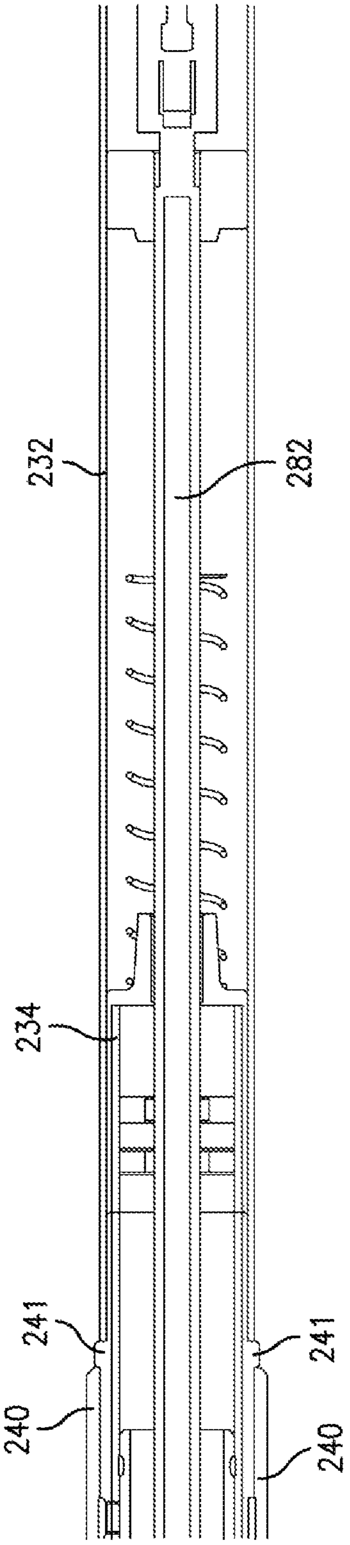
FIGS. 19A and 19B are top sectional views of portions of the installation tool of FIG. 17.
Figure 19B:
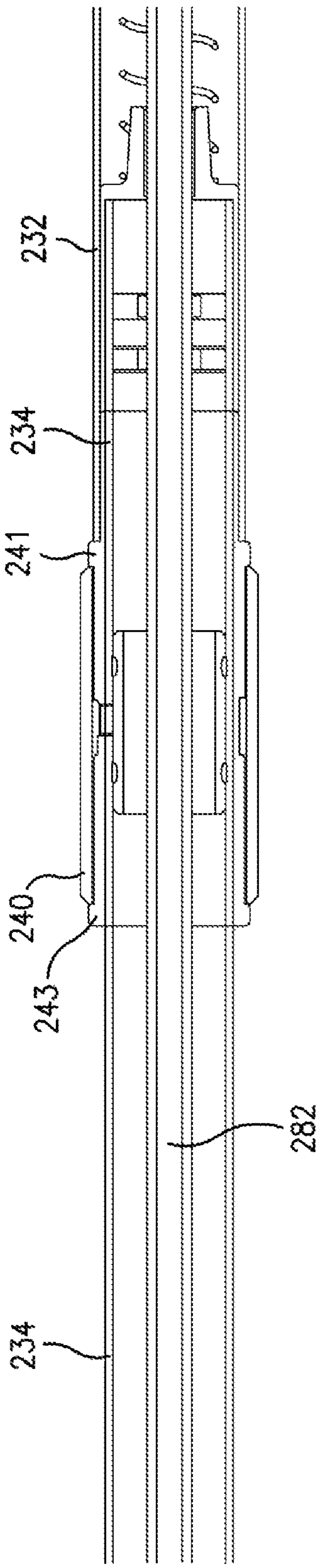
Figure 20:
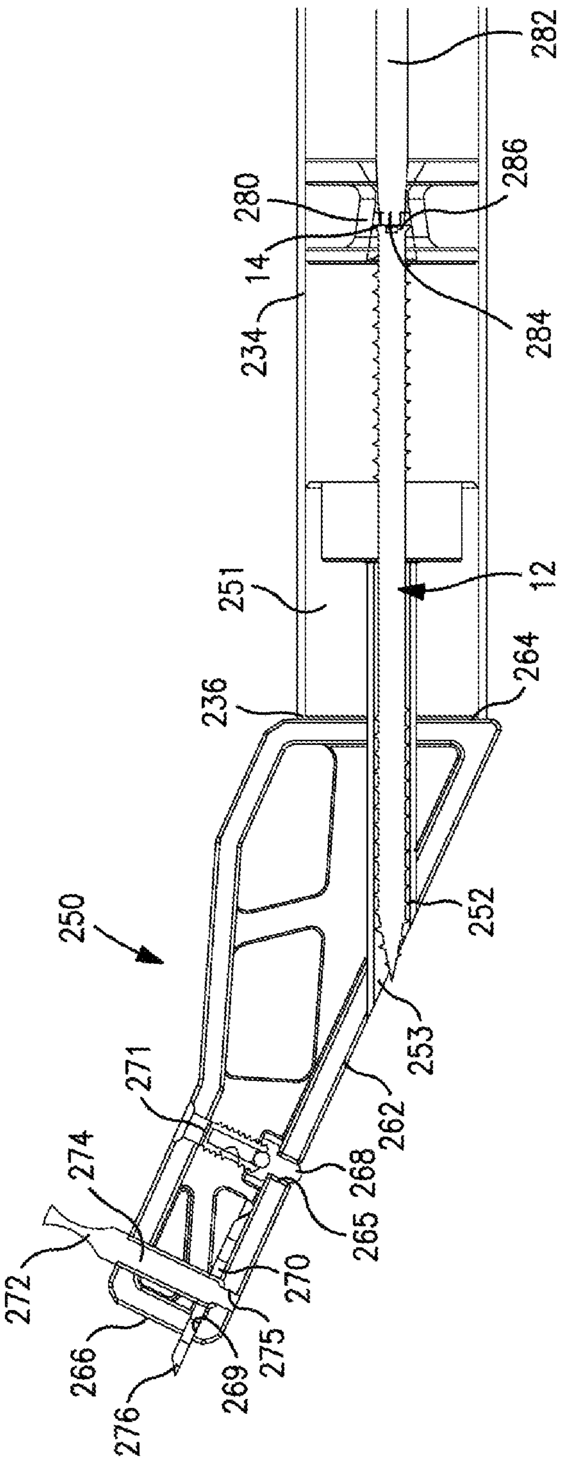
FIG. 20 is an enlarged end sectional view of the installation tool of FIG. 17 and further illustrating a fastener received in the installation tool.

With reference to FIGS. 17-25, another embodiment of an installation tool (which does not show the power driver assembly) is generally designated by the numeral 200 (FIG. 17). Installation tool 200 includes a receiver 202 for the power driver assembly (not illustrated), a telescopic tube assembly 230 comprising telescopic tubes 232 and 234, and a fastener guide head assembly 250 which is mounted at the end 236 of tube 234.

A handle assembly 210 is disposed in longitudinally fixed relationship to tube 234 and includes a trigger 212 which is depressible into one of essentially two positions. One partially depressed position of the trigger 212 allows for the handle assembly to be angularly adjusted about the longitudinal axis of the distal tube 234 at a preset defined angular position. The full depressed position of the trigger 212 allows for the proximal tube 232 to be retracted relative to the distal tube 234 when the fastener 12 is driven. The handle assembly 210 also provides for two-handed support of the tool so that the stabilizing edge 276 can be effectively stabbed into the support member. It should be appreciated that the tubes 232 and 234 do not rotate relative to each other with the non-rotatable position being ensured by a longitudinal flat 236 which engages through the handle assembly.

With reference to FIGS. 19A-B and 23-25, the handle 210 has a grip portion 214 which carries the trigger 212. The handle assembly 210 is attached to the distal tube 234 by a yoke 240 which is longitudinally fixed between a pair of collars 241 and 243. The trigger 212 moves a ramp 216 which engages complementary ramp 218 of a plunger 220. The plunger 220 has a radially acting detent 222 which is biased inwardly into the tube 234.

A plurality of (preferably five) recesses 225 are angularly spaced in fixed relationship to the outer tube 234. The projectable detent 222 is longitudinally aligned with the recesses 225 and receivable in a selected recess for retention under the plunger bias. Upon depressing the trigger 212, the detent 222 is retracted from a recess 225. Angularly rotating the grip 214 relative to the distal tube 234 allows detent 222 to be angularly engageable into a selected recess 225 to fix the angular position of the handle assembly 210 as desired by the installer. That angular position is further secured by a thumb screw 246 at the top which is tightened to secure the desired angular position.

A pair of internal collar mounts 245 and 247 are respectively fixedly mounted interiorly of the tubes 232 and 234. The mounts allow rotational and axial movement of the drive train. A spring 248 bears against the mounts and essentially biases the tubes 232 and 234 to a maximum extended position which is limited by a stop 249. The spring 248 may be optional. Stop 249 allows for replacement of the driver bit 282 to complement the fastener head. The plunger detent 222 also extends through an opening 223 to prevent movement between the distal tube 234 and the proximal tube 232 and thus fix the effective tool length. When the trigger 212 is fully depressed, the plunger is retracted from the opening 223 to allow the proximal tube to move relative to the distal tube against the bias of the spring 248 until the fastener is fully driven.

With additional reference to FIGS. 5, 17 and 20-22, a dual floating alignment bushing or receiver guide 280 is mounted at the interior of the distal tube 234 and has a central opening which receives the output coupler 284 of the drive train 282. The guide 280 ensures a concentric alignment between the fastener and the driver. The dual receiver guide 280 has a double conical or funnel-like constriction 286 which receives the head 14 of the fastener 12 and centers it for engagement by the coupler 284 as illustrated.

A fastener guide head assembly 250 is mounted at the distal tip 236 of the tube assembly. The guide head assembly 250 has a generally cylindrical base 251 which is retained to the distal tube 234 by means of one or more set screws 239 (FIG. 17). A sleeve 252 extends through the base 251 to form a channel which receives and guides the fastener 12. Surface 262 defines the sleeve input opening 253 to sleeve 252 for the fastener as correspondingly described with respect to guide assembly 50. The sleeve 252 receives the fastener so that the head 14 is properly positioned to be readily engageable by the torque coupler 282. The major thread diameters of the fastener 12 and the interior diameter of the sleeve 252 are configured so that the interior diameter of the sleeve is only slightly larger than the major thread diameters of the fastener. Preferably, the maximum diameter of the head 14 is approximately equal to the major diameter of the threads. It will be appreciated that as the fastener 12 is loaded into the guide head assembly 250, the head 14 moves through the sleeve or channel 252 and is convergently directed via the funnel-like constriction 286 (FIG. 20) toward engagement with the torque coupler 284 of the drive train. The coupler 284 is also axially centered by the dual receiver guide 280. The dual receiver guide 280 can axially move or float within the tube. The movement is inwardly limited by a dimple 281.

The guide head assembly 250 is preferably a cast or molded member of lightweight rigid form which includes a frame extending from the base with a planar engagement surface 262 disposed at an acute angle with respect to the lower planar mounting surface 264. Mounting surface 264 preferably engages against the end of the tube assembly and transversely extends across the distal end 236 of the tube 234. A planar end plate 266 is parallel to surface 264 and positioned to engage the underside of the roof support member 26. The acute angle is preferably 22½°, although other angles may be provided depending on the intended application of the installation tool. The specific angle can be provided with a guide head assembly having the required angle of the sleeve or guide channel relative to the engagement surface 262.

Figure 21:
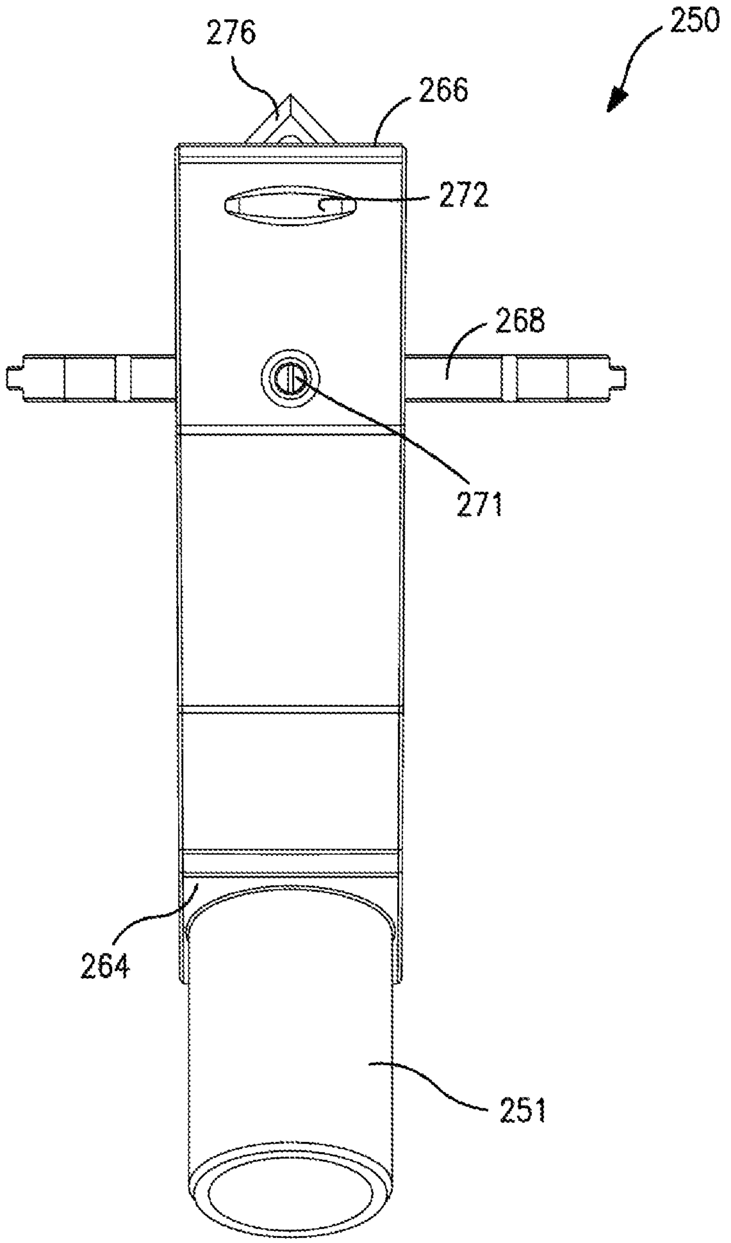
FIG. 21 is an enlarged generally top plan view of the guide head portion of the installation tool of FIG. 17.
Figure 22:
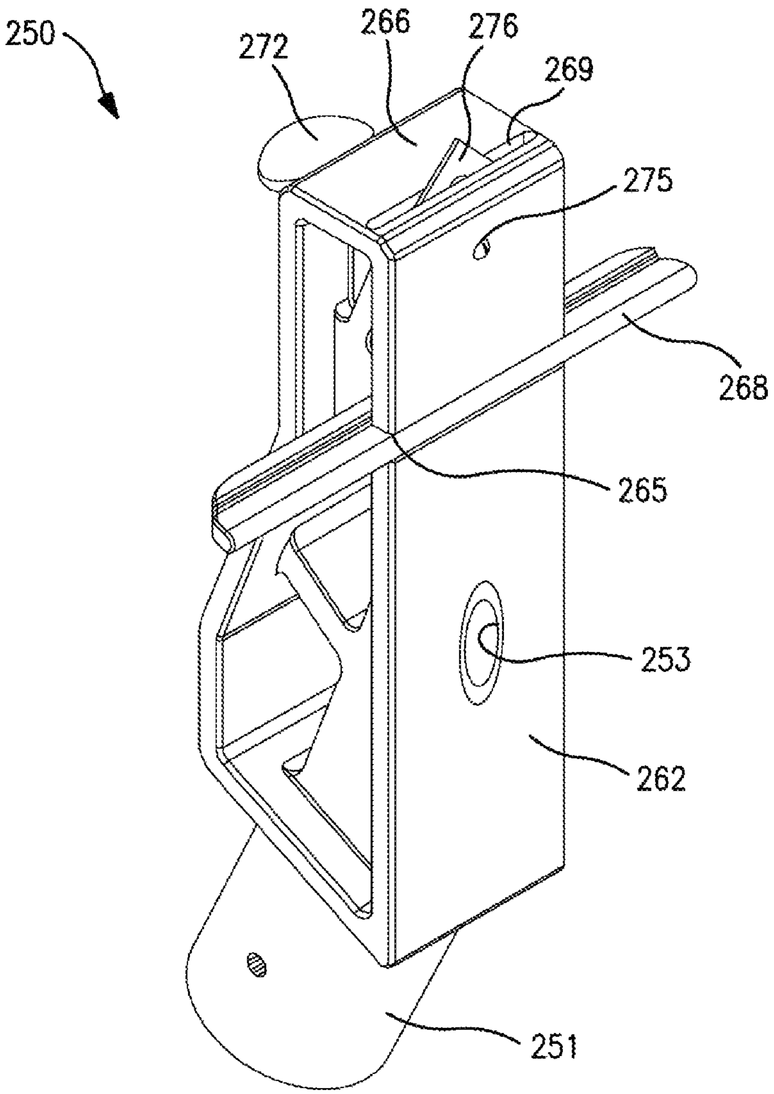
FIG. 22 is an enlarged generally bottom perspective view of a guide head portion of FIG. 21.
Figure 23:
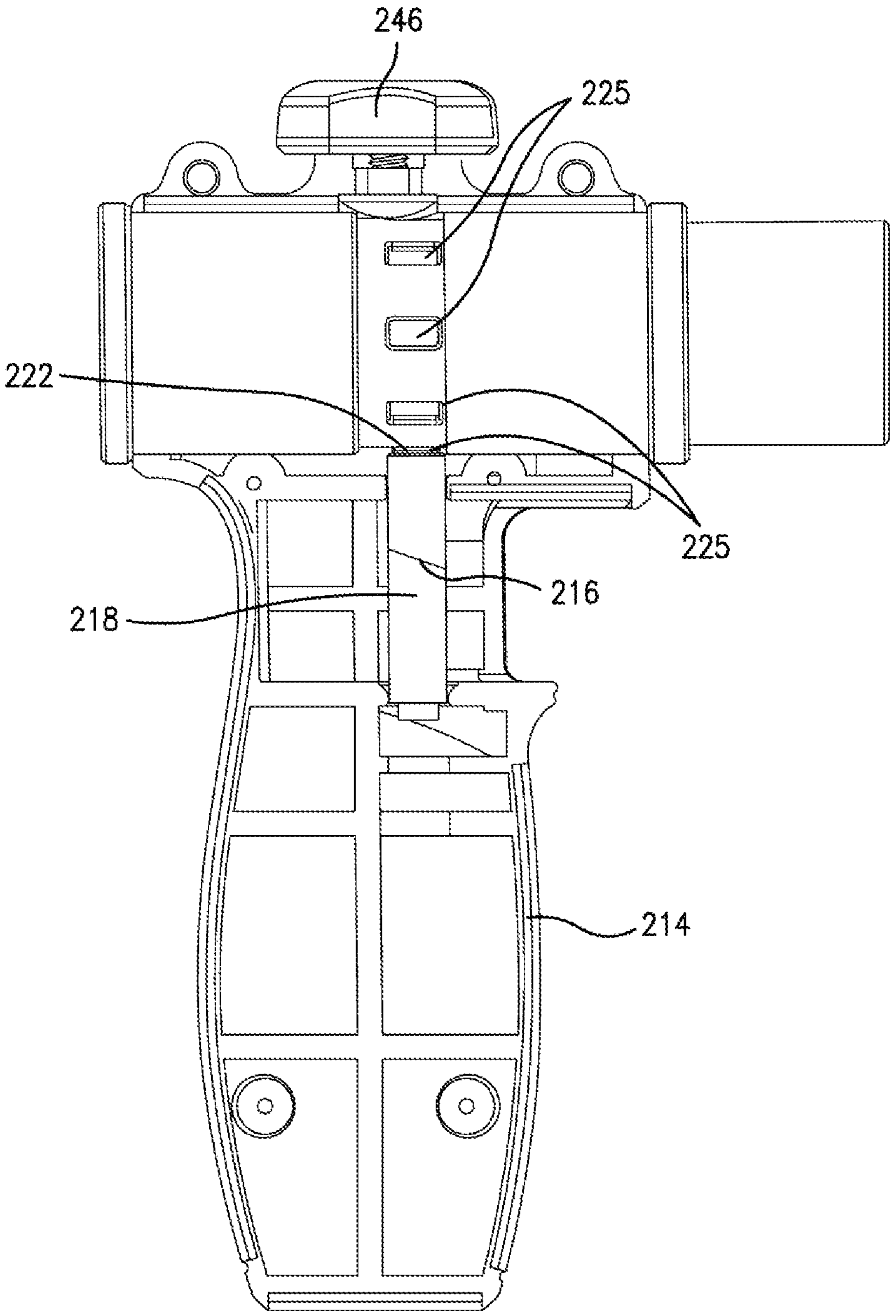
FIG. 23 is an enlarged generally opposite side elevational view, portions removed, of a handle assembly for the installation tool of FIG. 17.
Figure 24:
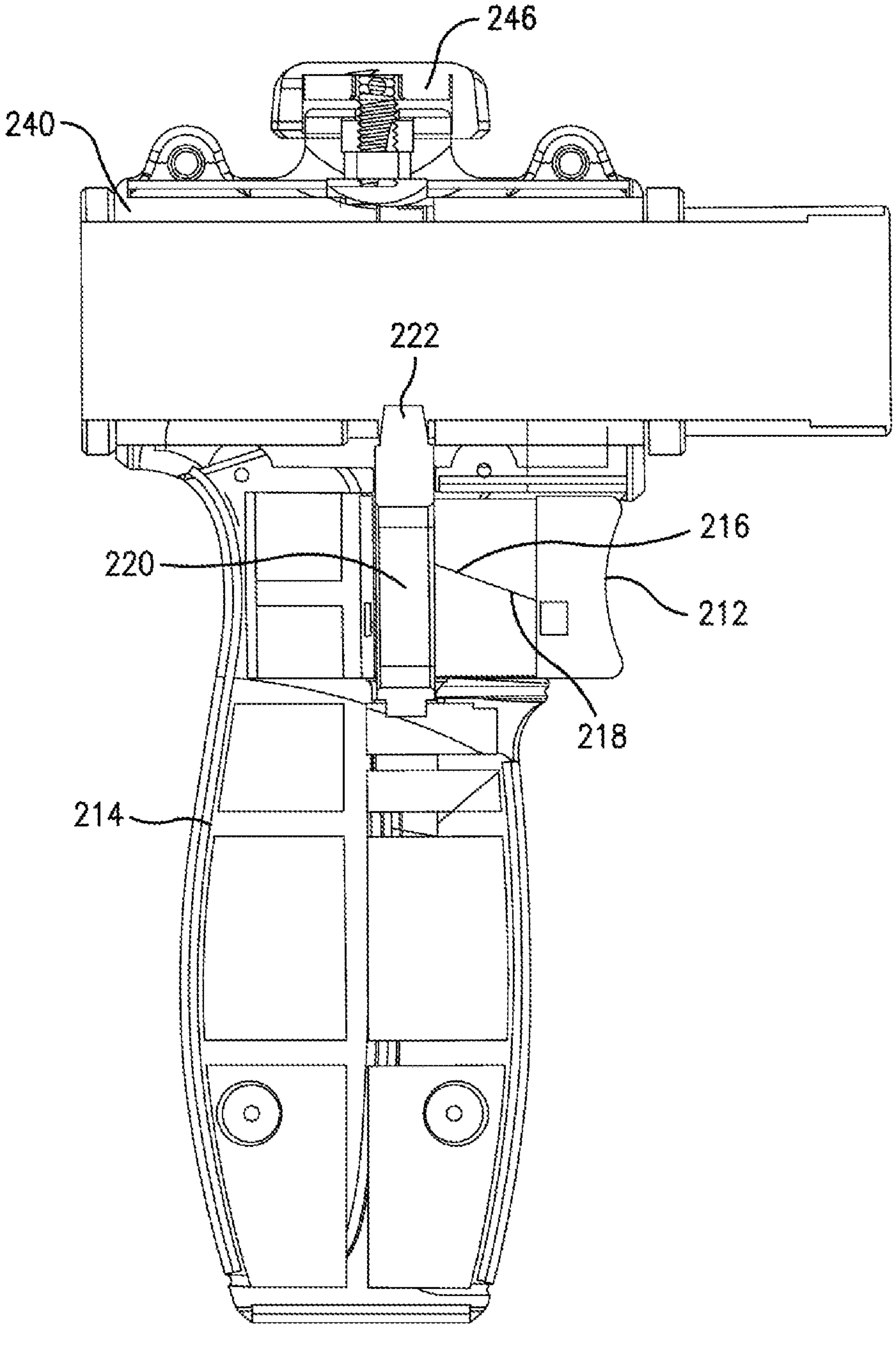
FIG. 24 is an enlarged side elevational view, portions in section and portions removed, of the handle assembly of FIG. 23.
Figure 25:
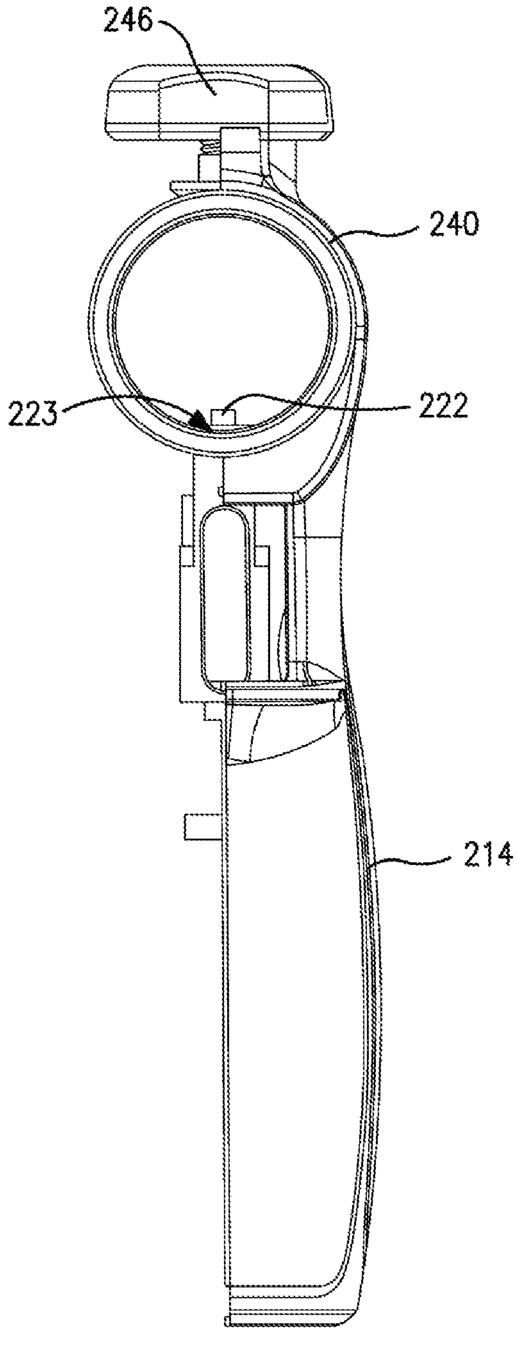
FIG. 25 is an enlarged generally right side view of a portion of the handle portion of FIG. 24, taken from the right thereof and partially broken away to show detail

A transverse slot 265 receives an L-shaped alignment bracket 268 which protrudes transversely at opposed sides of the engagement surface 262 and also projects outwardly from the surface 262. A set screw 271 secures the bracket 268 and allows the bracket 268 to be adjusted laterally, for example, when required at corners. The alignment bracket 268 is positioned and configured to fit below the 2×4 at the top plate 22 to ensure proper perpendicular alignment with the top plate. For corner configurations, the alignment bracket 268 may be moved to an extreme lateral position, either left or right of the position as shown in FIG. 21.

The upper portion of the frame is traversed by a slot 269 which receives a metal stabilizer plate 270. The stabilizer plate is secured by an adjustment knob 272 which connects with a threaded rod 274. The rod extends through an opening in the plate and threads into separate threaded opening 275. The stabilizer plate 270 preferably has a square configuration with four vertices which form edges 276. The edges 276 are sharpened. When the guide head assembly 250 is properly positioned a sharp edge 276 projects upwardly from the edge surface 266 of the frame. The function of the stabilizer plate 270 with edge 276 is to provide a stabbing structure to engage into the wood proximate the interface of the top plate 22 and the roof support member 26 to thereby stabilize the tool 200 and prevent movement or walking while the fastener 12 is being torqued by the installation tool. The stabilization is important at the initial stages of driving the fastener.

FIGS. 26-29 illustrate installation tools 300, 400, 500 and 600 which incorporate various adaptors for coupling with the conventional rotary driver tools.

Figure 26:
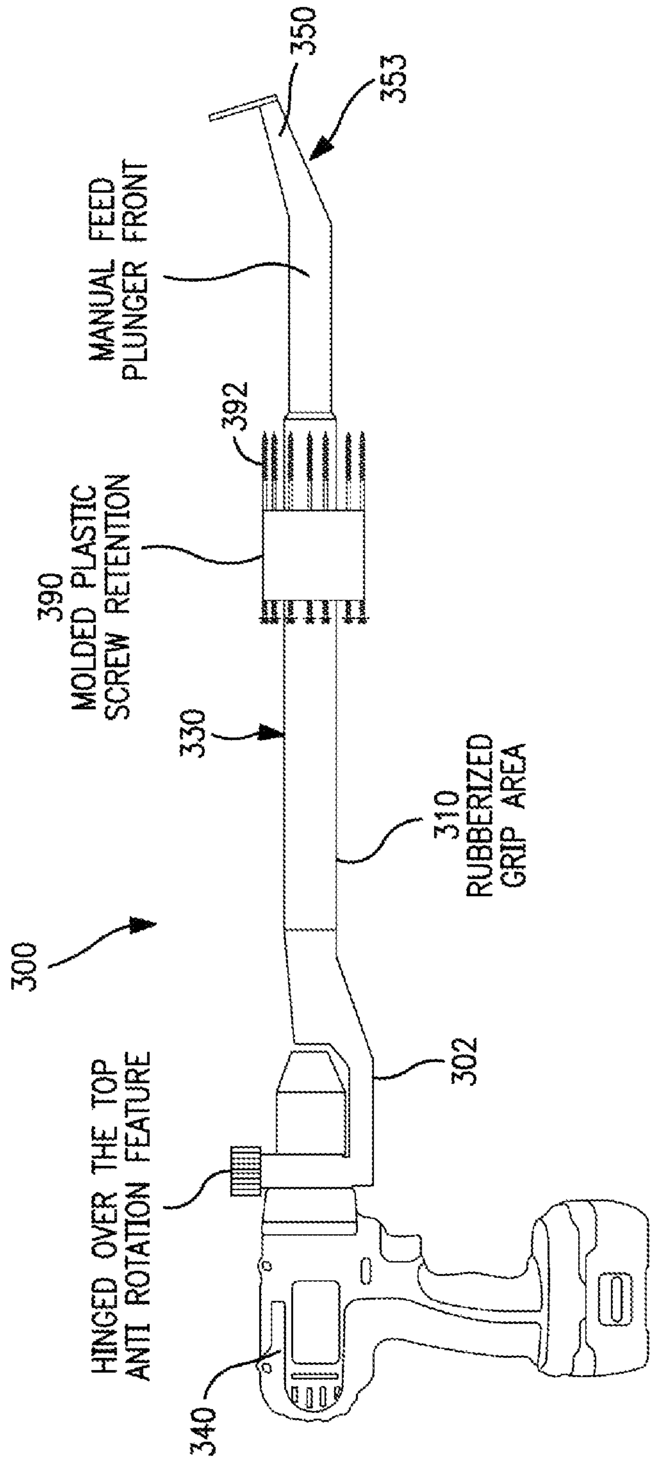
FIG. 26 is an annotated side elevational view, partly in schematic, of an installation tool.

FIG. 26 illustrates an installation tool 300 which an adaptor 302 for attachment to the type of rotary driver tool which includes a collar mounted auxiliary handle. Such handles are frequently found on hammer type drills to provide additional leverage for the user. In this case, the disclosed adaptor 302 replaces the auxiliary handle of the driver tool 340 with a collar attachment to secure the adaptor to the rotary driver behind the chuck. The chuck is used to secure the extended length drive shaft to the rotary driver and a grip 310 permits the user to securely grasp and maneuver the tool 300 and adaptor 302. The grip 310 of the tube assembly 330 receives a manually fed plunger front portion. The plunger front portion is configured to telescope inside the grip of the adaptor during screw installation. The manual feed plunger incorporates a screw guide 353 which surrounds and guides the screw during installation. The guide head 350 is configured to permit the user to accurately place the screw in the center of a wood structural member so that the screw will be installed centered on the truss and parallel to truss orientation, and preferably at a 22.5° angle with respect to a vertical direction. This 22.5° angle is selected to ensure that the installed screw passes through the lower building components and accurately penetrates an upper building component, for example a roof truss. It will be apparent to those skilled in the art that other angles may be suitable for other applications and that alternative plunger tip configurations will be desirable for other screw installations.

The rotary tool adaptor illustrated in FIG. 26 includes a cylindrical screw magazine 390 disposed about the grip 310 of the tube assembly 330. In this embodiment, screws 392 are removed from the magazine 390 and manually inserted into the screw guide 353 located in the plunger front end of the tube assembly 330. The screw guide is configured to closely receive a screw without excess radial space around the screw. The screw guide is configured to accurately start and deliver the screw 392 through the wood structural members. The length of the screw and the intended structural purpose of the installation require precise guidance and delivery of the screw through the associated wood members.

Figure 27:
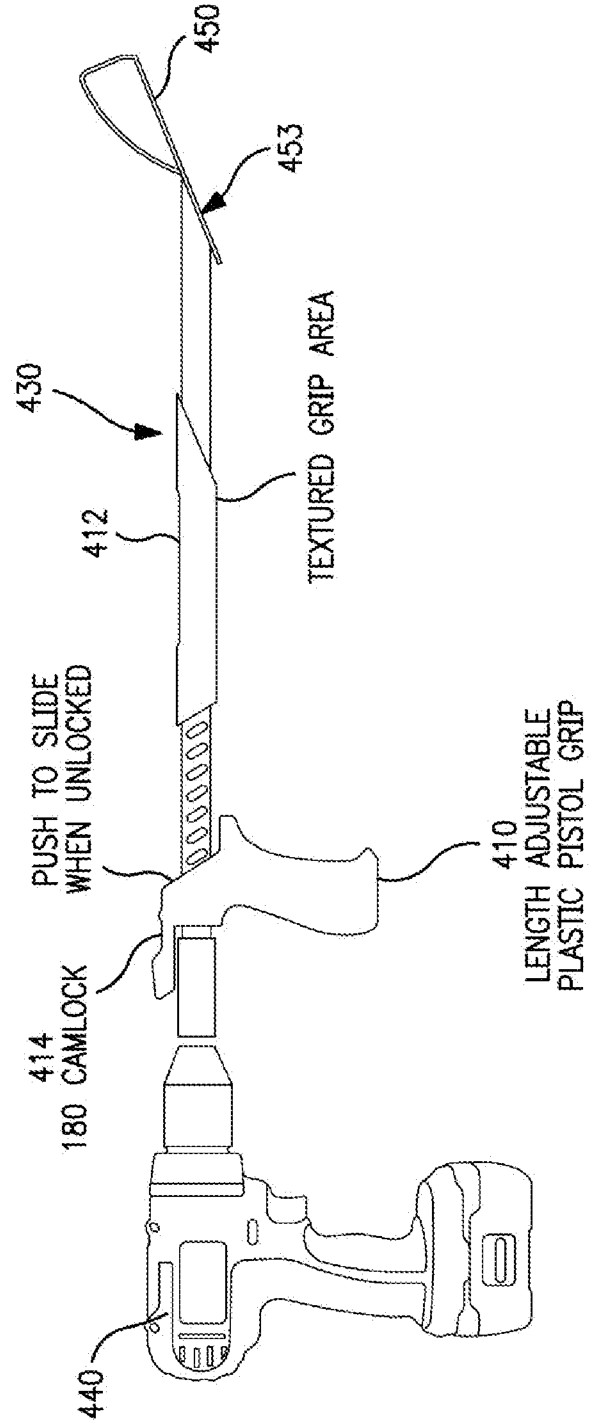
FIG. 27 is a side elevational view, partly in schematic and partly annotated, of an installation tool.

FIG. 27 illustrates an installation tool 400 with a second embodiment of a tool adaptor for use with the disclosed construction system. The embodiment of FIG. 27 illustrates a pistol grip adaptor 402 configured to engage a rotary driver tool 440. The pistol grip permits the user to maintain control over the adaptor and rotary tool during screw installation. This embodiment also includes a grip 412 forward of the pistol grip 410 and a plunger/screw guide 453 at the forward end of the tube assembly 430. The tip of the plunger/screw guide is configured to assist the operator to drive screws at the 22.5° angle (FIG. 27, lower right), though other tip configurations and angles are compatible with the disclosed construction system. The embodiment of FIG. 27 shows an arrangement where the position of the pistol grip 410 is adjustable on the rear portion of the tube assembly 430. This arrangement permits the user to customize the ergonomics of the adaptor to the task and an operator. A lever actuated cam lock system 414 allows the user to disengage the pistol grip 410 from a tubular rear portion and to fix the pistol grip in a selected alternative position. FIG. 27 illustrates a view of a guide head 450 for the screw guide plunger which includes a sight line enhancing an operator's ability to center the screw on a structural member during installation.

Figure 28A:
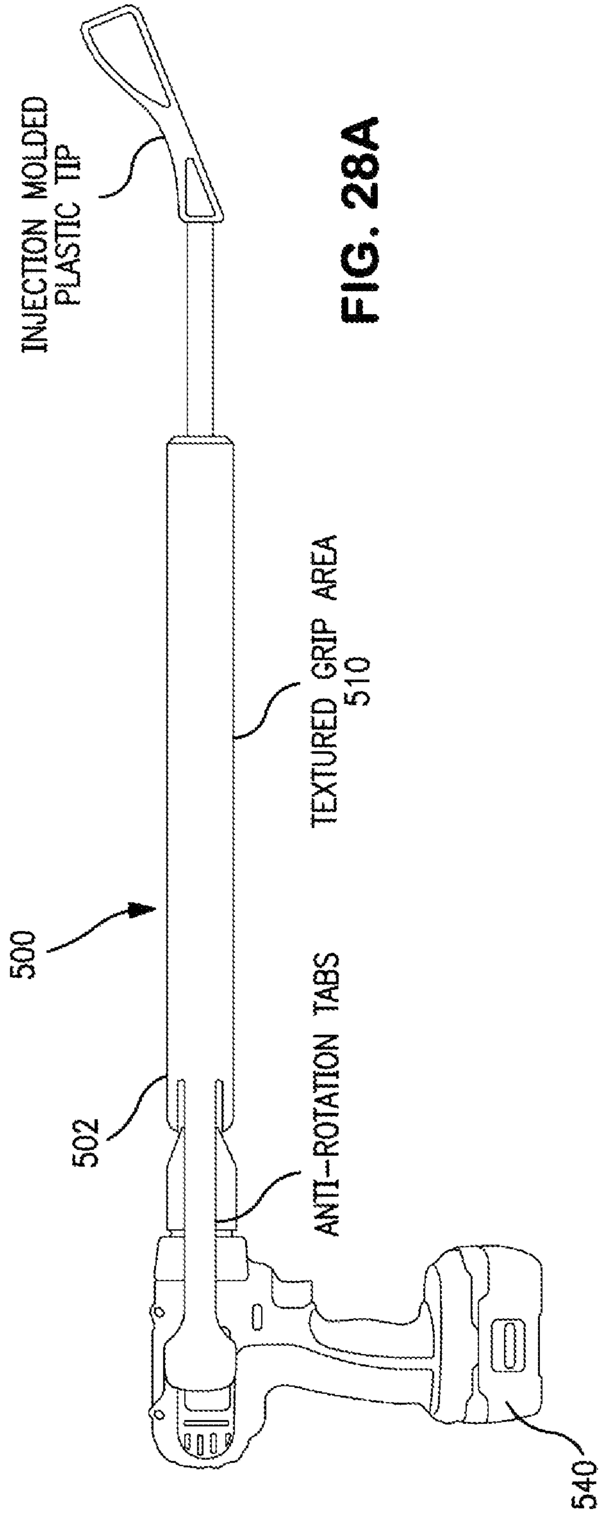
FIGS. 28A and 28B are annotated side views of an installation tool together with an enlarged top plan view of a portion of the tool, respectively.
Figure 28B:
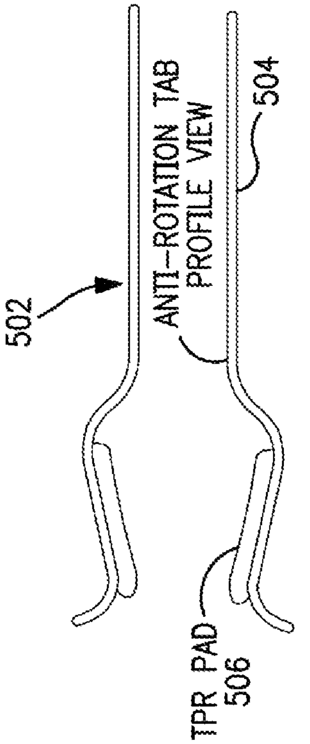

FIGS. 28A and 28B illustrate an installation tool 500 with an alternative embodiment of a tool adaptor 502. The embodiment of FIGS. 28A and 28B includes a pair of flexible arms 504 configured to elastically deform and grip the sides of a rotary driver tool 540. Thermoplastic resin pads 506 enhance frictional engagement between the arms and the sides of the rotary tool. The adaptor 502 of FIGS. 28A and 28B also includes an extended grip area 510 for use by the operator. The screw guide/plunger front end of the adaptor is shown with one of several contemplated plastic guide heads 550. The illustrated head 550 is configured to aid the operator in installing a screw at a 22.5° angle relative to the vertical as previously described. A plurality of plastic tips for mounting on the end of the screw guide can be swapped out for different screw installation purposes.

Figure 29:
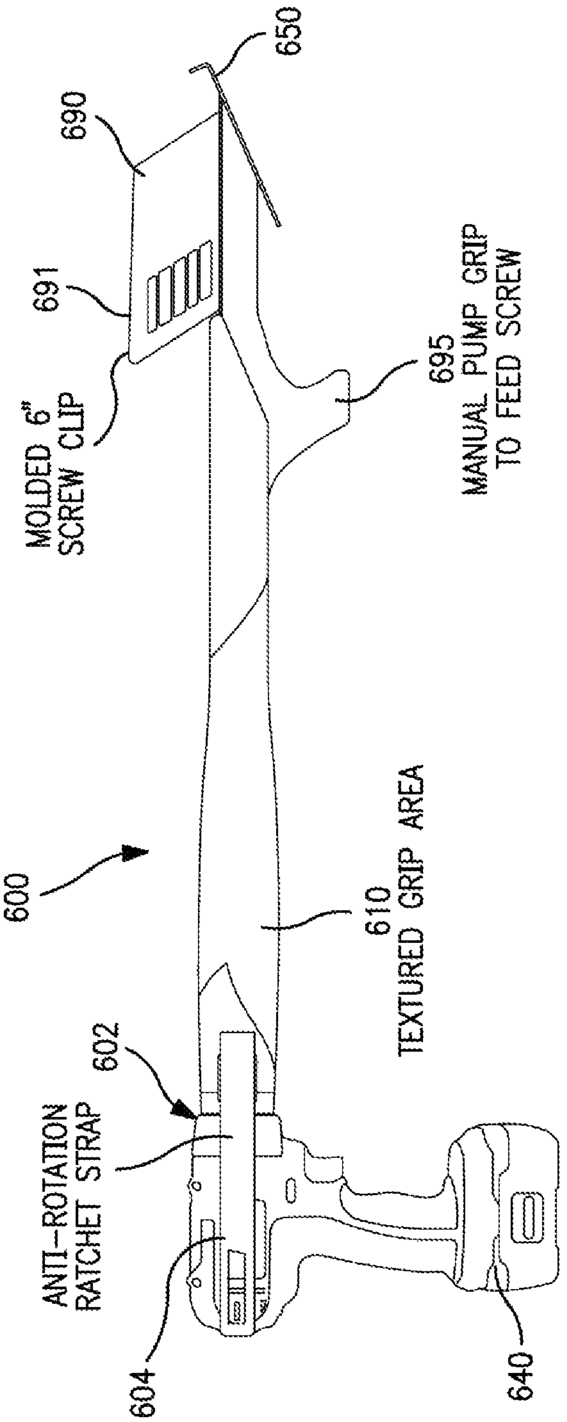
FIG. 29 is an annotated side elevational view of an installation tool.

In installation tool 600 with a further alternative tool adaptor 602 is disclosed in FIG. 29. In this embodiment, the adaptor is secured to the rotary tool by a ratchet type strap 604 extending from the sides of the adaptor around a rear portion of the rotary tool 640. This configuration permits the adaptor to be securely integrated with the rotary tool. Various means may be provided to tighten the ratchet strap in a manner similar to arrangements used on snow sport bindings for example. In the embodiment of FIG. 29, the rear grip portion 610 has an ergonomic shape and a textured grip area to enhance operator ease of use and safety. The embodiment of FIG. 29 shows a molded plastic plunger guide head 650 with an integrated molded 6" screw clip 690. The grip portion 610 is configured to permit the forward plunger portion to recede into the grip portion during screw delivery. A pump action screw feeder is illustrated where screws are moved from a clip to a screw guide by manual cycling of the manual pump grip 695. Once the first screw is manually fed into the screw guide, further screws may be delivered with the longitudinal cycling of the screw guide during subsequent screw installation. A sight line 691 on top of a clip 690 enhances the user's ability to center the screw guide on a structural member for accurate delivery of screws.

Figure 30:
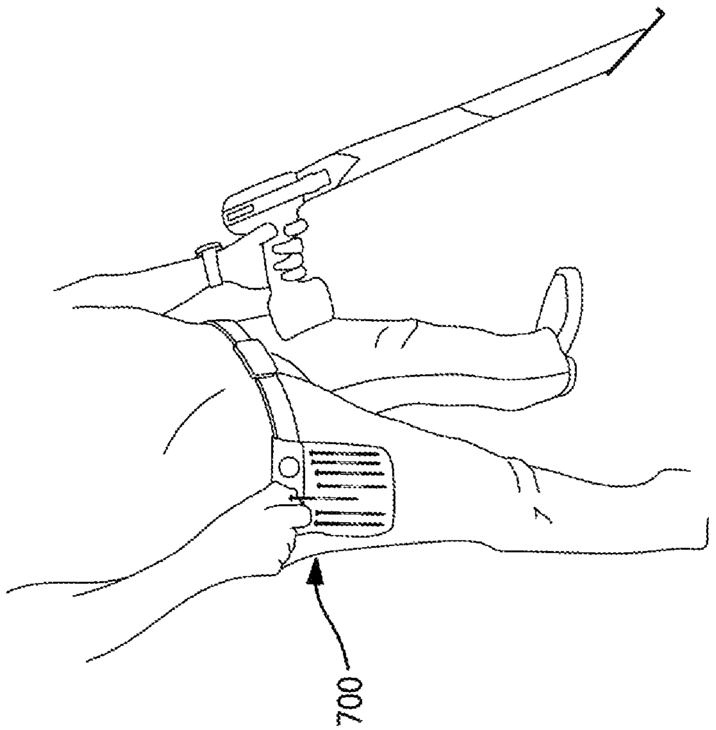
FIG. 30 is a schematic view of an installer illustrating a belt holster and a representative installation tool for reception by said holster.
Figure 31A:
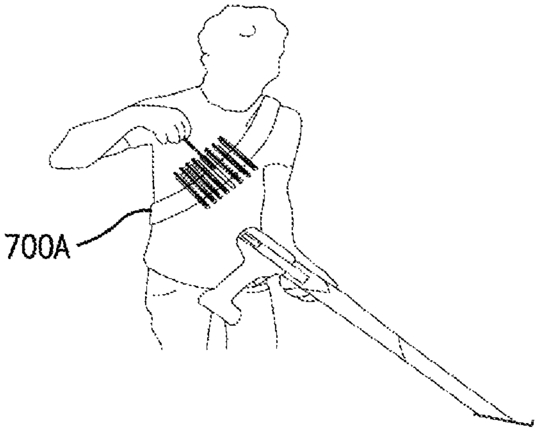
FIGS. 31A and 31B are respectively a schematic view illustrating a bandolier holder for fasteners and a representative installation tool and an enlarged fragmentary front view of the bandolier holder and fasteners.
Figure 31B:
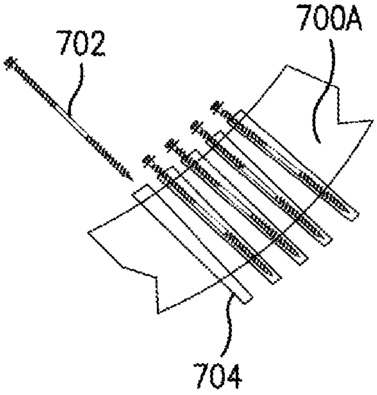
Figure 32A:
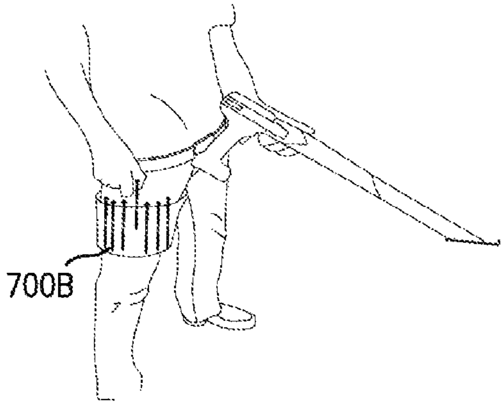
FIGS. 32A and 32B are respectively a schematic side view of a thigh-mounted fastener holder and a representative installation tool and an enlarged fragmentary front view of the thigh-mounted fastener holder and fasteners.
Figure 32B:
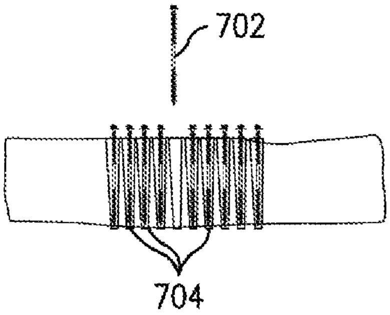
Figure 34A:
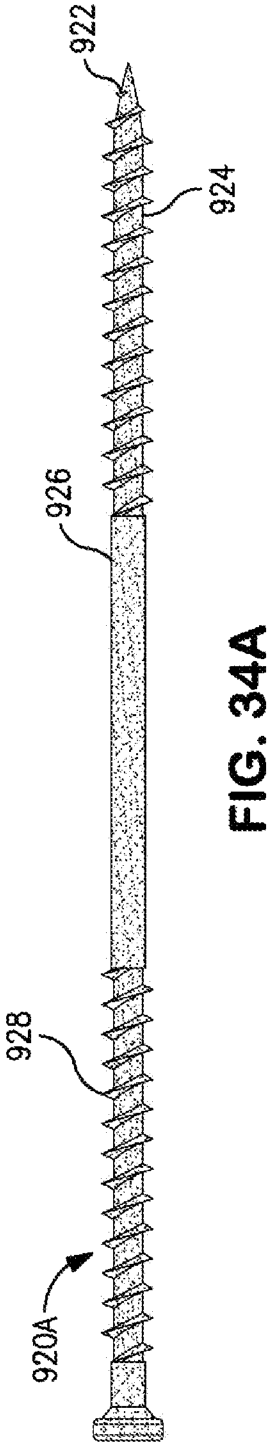
FIGS. 34A-34D are respectively a side view of a fastener employed in an installation tool, an enlarged top plan view of the fastener and a side elevational view of a fastener with a different tint together with an enlarged top plan view of the fastener with the different tint.
Figure 34B:
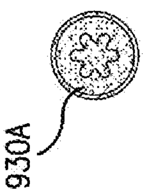
Figure 34C:
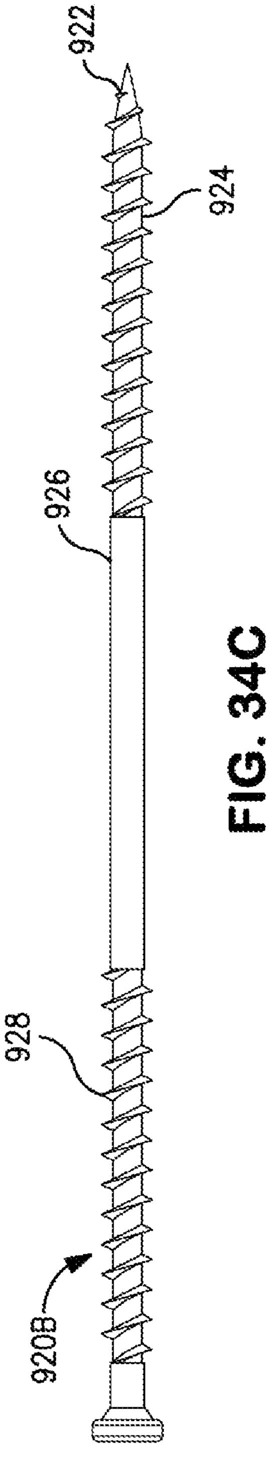
Figure 34D:
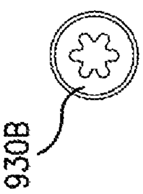
Figure 35A:
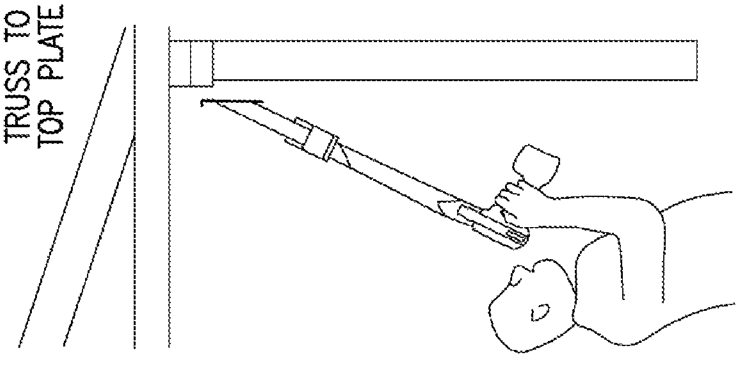
FIGS. 35A-35E schematically illustrate an installer using an installation tool for fastening respectively a truss to a top plate, a stud to a top plate, a stud to a bottom plate, a bottom plate to a rim, and a top plate to a rim.
Figure 35B:
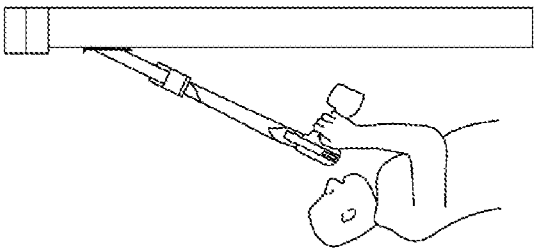
Figure 35C:
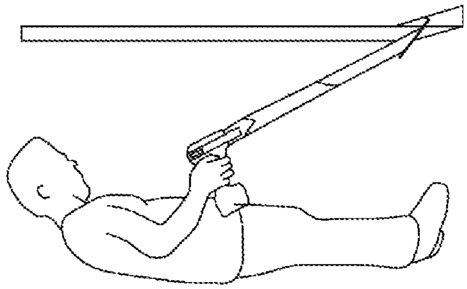
Figure 35D:
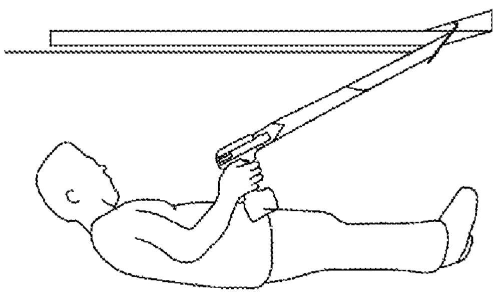
Figure 35E:
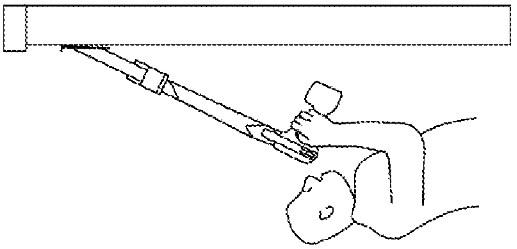

Accessories can also aid in efficient use of the disclosed installation tools and the construction system. Various ways of maintaining a supply of fasteners on the person of an operator are disclosed. Such accessories minimize the necessity to interrupt installation to renew a supply of fasteners. For example, FIG. 30 illustrates a belt holster 700 holding several screws from which the operator efficiently retrieves a screw and manually installs each screw in a screw guide.

FIGS. 31A-31B and 32A-32B respectively illustrate a bandolier 700A and leg mounted screw holster 700B as alternatives for maintaining a number of screws 702 on the person of the operator. The screw holding systems illustrated in FIGS. 31A-31B and 32A-32B may include magnets arranged to maintain screws in the disclosed holders while the worker is moving about the construction site. This reduces the chance that screws may fall out of the disclosed holders and enhance ease of use. The fastener holders of FIGS. 30-32B may include tapered plastic tubes 704 for each fastener. The tubes can be configured to cover the sharp points of the fasteners to avoid inadvertent injury to the operator. For example, the bottom end of the tapered tubes 704 may be closed.

Figure 33:
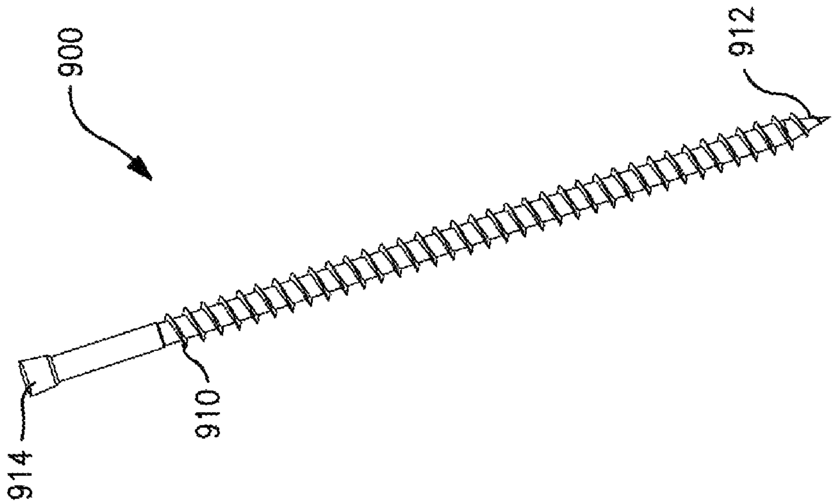
FIG. 33 is a perspective view of a representative fastener that may be employed in the installation tools.

The disclosed installation tools may be adapted for use in driving a wide range of fasteners to implement various connections of wood components in a wood structure. A preferred fastener 900 which has particular applicability for providing a connection between a top plate and a truss frame is illustrated in FIG. 33. Fastener 900 is a six-inch fastener which has an uninterrupted thread 910 extending from a gimlet point 912 toward a head 914. The thread 910 is approximately five inches. In one embodiment, the gimlet point has a 30° angle. The head 914 has a socket which may be a T25 Autosert drive or other socket configuration with a fixed diameter that preferably ranges from 0.260 to 0.290 inches, which is approximately the major diameter of the thread 910.

Depending upon the application, a number of other fasteners are possible depending upon the connection to be implemented as well as the specific structural components.

FIGS. 34A-34D illustrate representative fasteners compatible with the disclosed construction system. The disclosed fasteners 920A and 920B are double-threaded, having a self-drilling tip 922 and approximately 2" bottom thread 924 paired with a threadless center shank portion 926 and 1½"-2" top thread. The top thread 928 (under the head 930A and 930B) is for increasing head pull-through performance. The top thread 928 in one configuration has a higher pitch, e.g., a greater number of threads per inch, to reduce the rate of penetration of the fastener as the top thread enters the wood during installation. This configuration will reduce the likelihood of board jacking and enhance clamping during installation. The top thread 928 may be of the same major and minor diameter as the bottom thread or may have a larger major and/or minor diameter to enhance pull-through resistance. The axial length of the top thread 928 may be as short as ½" depending upon the configuration of the upper thread and the desired pull-through resistance. The threadless center portion of the screw is arranged to permit maximum penetration of the bottom thread 924 into the various structural members prior to engagement of the top thread. The screws are illustrated with a Torx type drive socket 932 configured to facilitate automated or mechanized screw installation in the disclosed screw guides.

Different bright colors or tints are applied to the screws 920A and 920B to readily identify the fastener for both proper connection and inspection purposes. Currently, building inspectors can easily identify metal brackets applied to structural members. The alternative use of threaded fasteners potentially makes inspections more problematic. Threaded fasteners are not as easily seen by building inspectors. Even if the inspector can see the ends of the fasteners, the inspector would not necessarily know what type of fastener is installed. The disclosed construction system addresses this issue by applying bright colors to the fastener or at least the head of each fastener. Brightly colored fastener heads 930A and 930B provide a clear visual indication of the type of fastener installed in a given location.

Bright colors can also help builders and workers to identify the correct fastener for a particular purpose.

FIGS. 35A-35E illustrate an embodiment of the representative installation tool and construction system being used to install the disclosed threaded fasteners to connect various structural components. Note that the construction worker standing on the floor has clear sight lines to the installed fasteners whether the installation is overhead or at floor level. The worker is neither climbing a ladder nor squatting down at floor level. The disclosed construction system should enhance workers' safety and productivity while reducing the possibility of injury or worker discomfort.

Figure 36A:
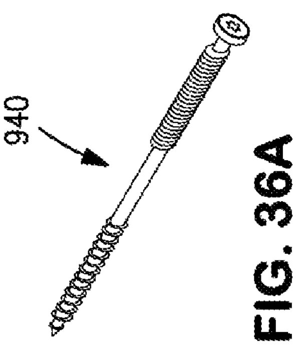
FIGS. 36A-36C are respectively a perspective view, a diagrammatic side view and an end view of a fastener which may be employed for an installation tool.
Figure 36B:
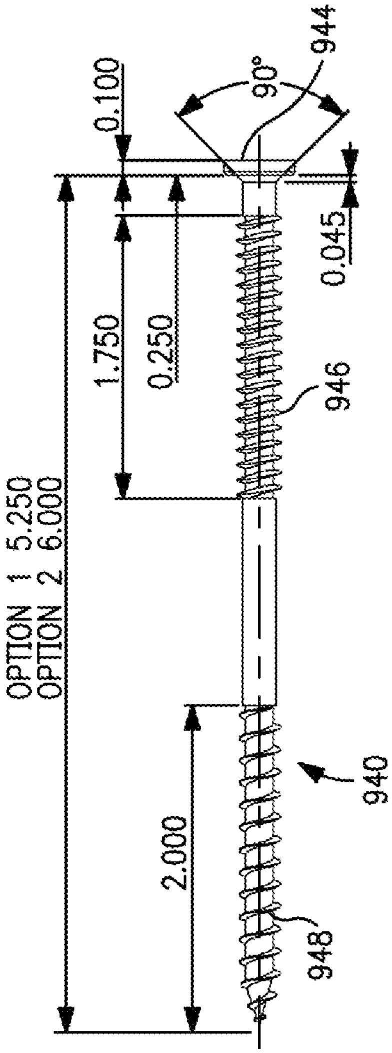
Figure 36C:
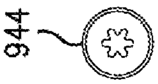

FIGS. 36A-36C illustrate a proposed embodiment of a fastener 940 compatible with the disclosed construction system. A Torx drive socket 942 in the screw head 944 is shown but other socket-type drive heads, such as square drive, Torx T-Tap, Torx Plus, Phillips, etc. are possible. The head 944 of the fastener employs an internal (socket) type drive, is compact and relatively small in diameter to reduce the likelihood of interference with other building components such as sheathing on the outside and sheetrock on the inside of a structure. The relatively small head can reduce the fastener resistance to pulling through wood structural members when subjected to forces along the axis of the fastener.

In the disclosed fastener 940 shown in FIGS. 36A-36C, it can be seen that the top thread 946 has a higher pitch than the bottom thread 948. This thread pitch differential between top and bottom threads for some applications to reduces board jacking and enhances building component clamping during installation of the disclosed screws. The top threads of the disclosed fasteners are configured to enhance pull-through resistance of the disclosed fasteners. It will be noted that the major diameter of the top thread 946 is larger than the major diameter of the bottom thread 948. The disclosed fastener employs a single diameter shank which is formed to result in the disclosed thread patterns. Multi-diameter blanks are also contemplated where the diameter of the shank at the top of the fastener may be larger to provide more material for the top thread resulting in enhanced pull-through resistance. The disclosed threaded fasteners are contemplated between 5.25"-6" in length but length will vary depending on the intended purpose of the fastener. The illustrated fastener 940 has a 2" bottom thread 948 and a 1.75" top thread 946. The length of the top thread and the length of the unthreaded center portion of the screw shank can be varied to tune screw performance.

While the fastener 940 employs a thread configuration where the top thread 946 has a higher thread count (TPI) than the bottom thread 948, fasteners with the same thread count or a bottom thread having a higher thread count than the top thread may be useful for some purposes.

Figure 37B:
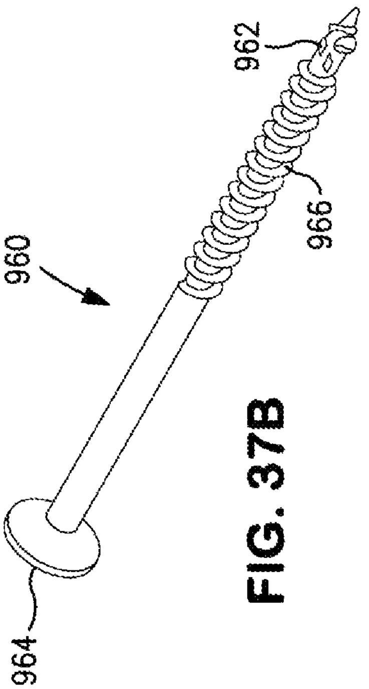
FIGS. 37A-37C are respectively a diagrammatic view of a fastener which may be employed for an installation tool, a perspective view of the fastener and a top plan view of the head of the fastener.
Figure 37A:
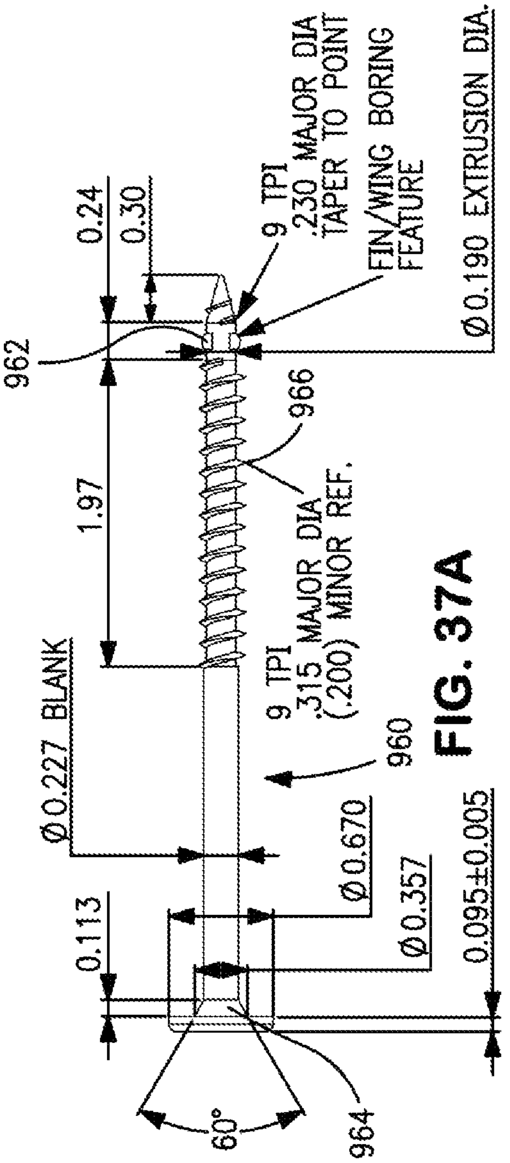
Figure 37C:

FIGS. 37A-37C illustrate an alternative screw configuration 960 contemplated as useful for certain locations in a structure. This fastener is a single thread fastener with a fin 962 or wing type boring feature adjacent to the tip. Fastener 960 may be suitable for a bottom plate to rim joist applications for example. The flared head 964 of this fastener provides enhanced pull-through resistance in locations where interference with sheathing or sheetrock is not a concern. The boring feature reduces the possibility of cracking the wood structural member during screw installation. This fastener has a large diameter main thread 966 to reduce strip out of the fastener when tightening multiple plies of laminated veneer lumber beams together. Alternatively, the boring feature may be configured as more of a fin type wing that can appear as a spiral and may be applied by a threading machine, eliminating the need for a secondary pointing operation. There may be two, three or four fins 962 that are equi-angularly distributed about the circumference of the screw tip. Each of the fasteners illustrated in FIGS. 36A-36C and 37A-37C are configured so that the head penetrates slightly into a structural member or sits flat against the member to prevent interference with other building components such as sheathing or brackets, straps and joist hangers that may need to be installed.

Figure 38C:
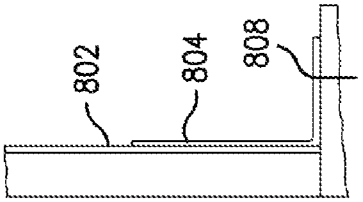
FIGS. 38A-38C are respectively fragmentary portions of a perspective view of a representative construction illustrating the use of a bracket assembly, an exploded view of the brackets, and a side sectional view illustrating the mounting of the brackets.
Figure 38A:
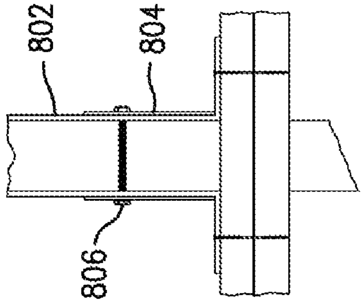
Figure 38B:
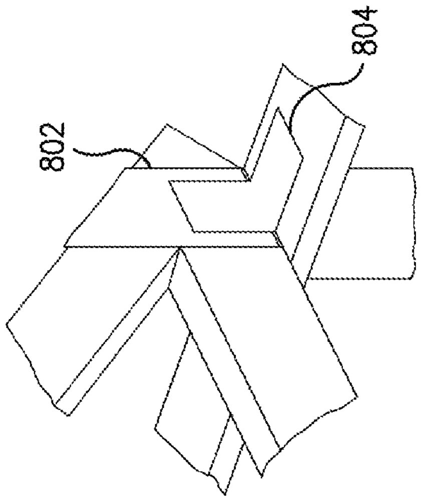

FIGS. 38A-38C illustrate various metal brackets and straps that may be employed in conjunction with the disclosed construction system. FIGS. 38A-38C illustrates the junction of a roof truss with the top plate of a structure. This is a location where many building codes require that the truss be strapped or tied to the top plate using a hurricane tie or the like. Metal plates 802 are typically used to hold truss components together. Such truss plates 802 are installed in a factory setting and include perforations that provide metal penetrating barbs to hold the plate to the truss components, thereby securing the truss components to each other. The resulting perforated configuration may provide an opportunity to attach L-shaped brackets 804 to tie the roof truss to the top plate of the wall as shown in FIGS. 38A-38C. Screws or bolts 806 may pass through the roof truss plates 802 and L-shaped brackets 804. Threaded fasteners 808 may be used to attach the lower portion of the L-shaped bracket to the top plate. FIG. 38C illustrates an L-shaped bracket 804 with perforations and wood penetrating barbs arranged to match the perforations in the truss plates. The L-shaped bracket 804 could be installed by pressing or hammering into the truss plates and threaded fasteners 808 can be employed to tie the L-shaped bracket 804 to the top plate.

Figure 39A:
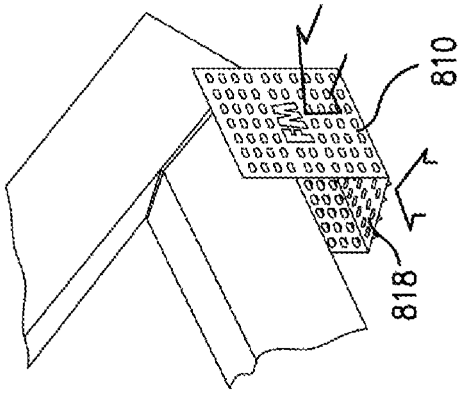
FIGS. 39A-39E respectively illustrate another bracket for construction in connection with a portion of a truss, a schematic view of a fastener in connection with a second truss assembly portion together with the brackets, a third side end view of the bracket together with a fastener in a truss assembly, a perspective view of the bracket and a side elevational view of the bracket.
Figure 39B:
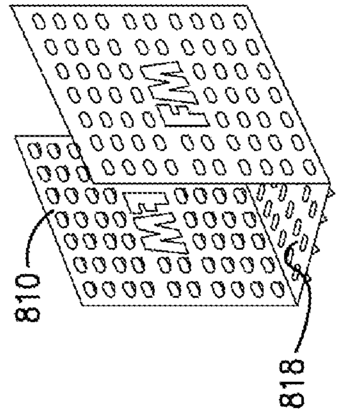
Figure 39C:
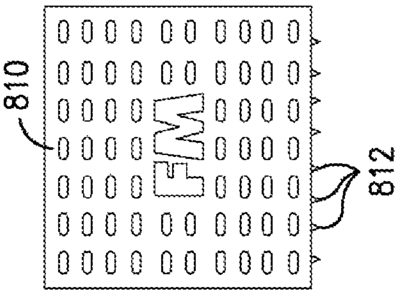
Figure 39D:
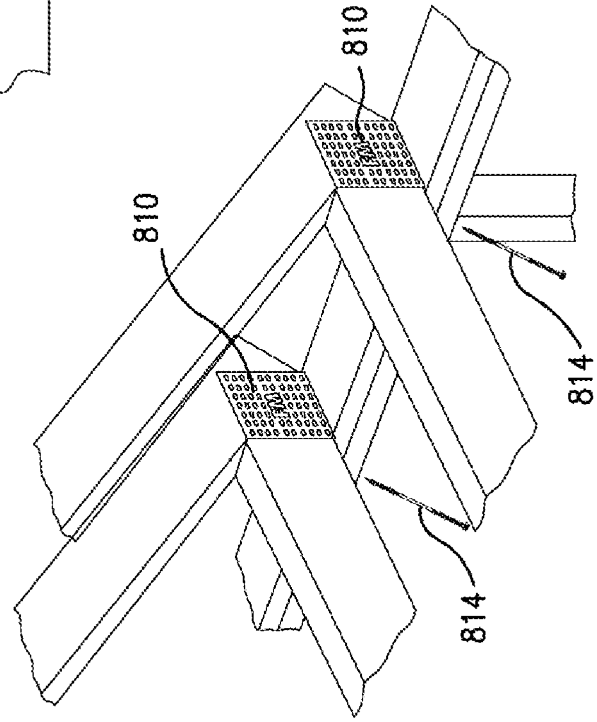
Figure 39E:
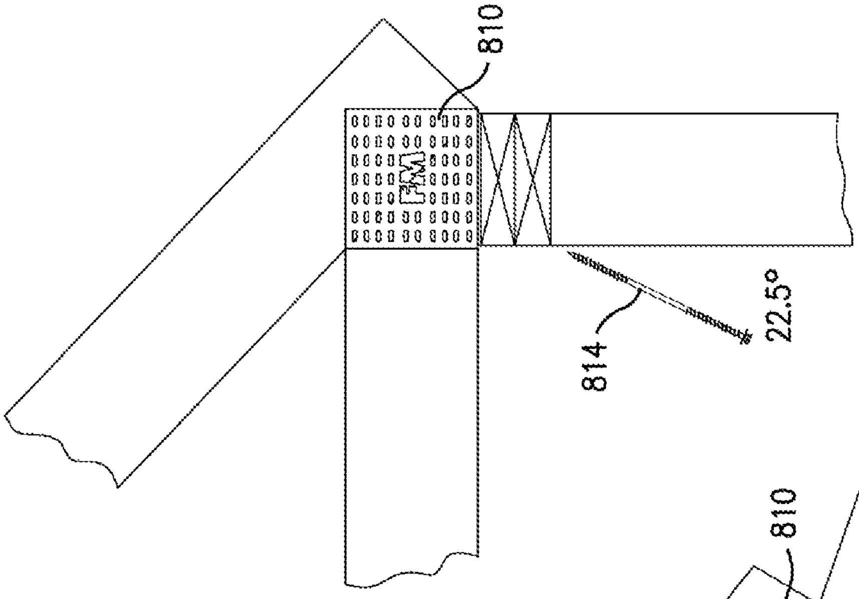

FIGS. 391A-39E illustrates a possible alternative configuration for a truss plate. The disclosed truss plate 810 is U-shaped with the vertical portions of the U including perforations and wood penetrating points configured to secure the truss plate to the truss components. The bottom portion of the U-shape includes wood penetrating barbs 812 directed away from the truss and intended to penetrate the top plate of the wall. Threaded fasteners 814 contemplated in the disclosed construction system are then installed to tie the truss to the top plate and wall. The downward extending barbs 812 from the proposed U-shaped truss plate grip the top plate and enhance a secure connection of the truss to the wall. Further, the metal bottom panel 818 of the proposed truss plate 810 enhance pull-through resistance of the fastener relative to the truss.

Figure 40B:
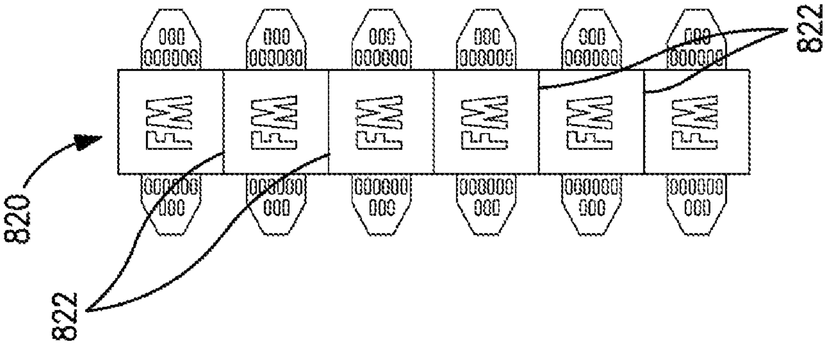
FIGS. 40A-40B respectively illustrate a perspective view of another bracket as mounted in place and a top view in a preassembled stage for the bracket.
Figure 40A:
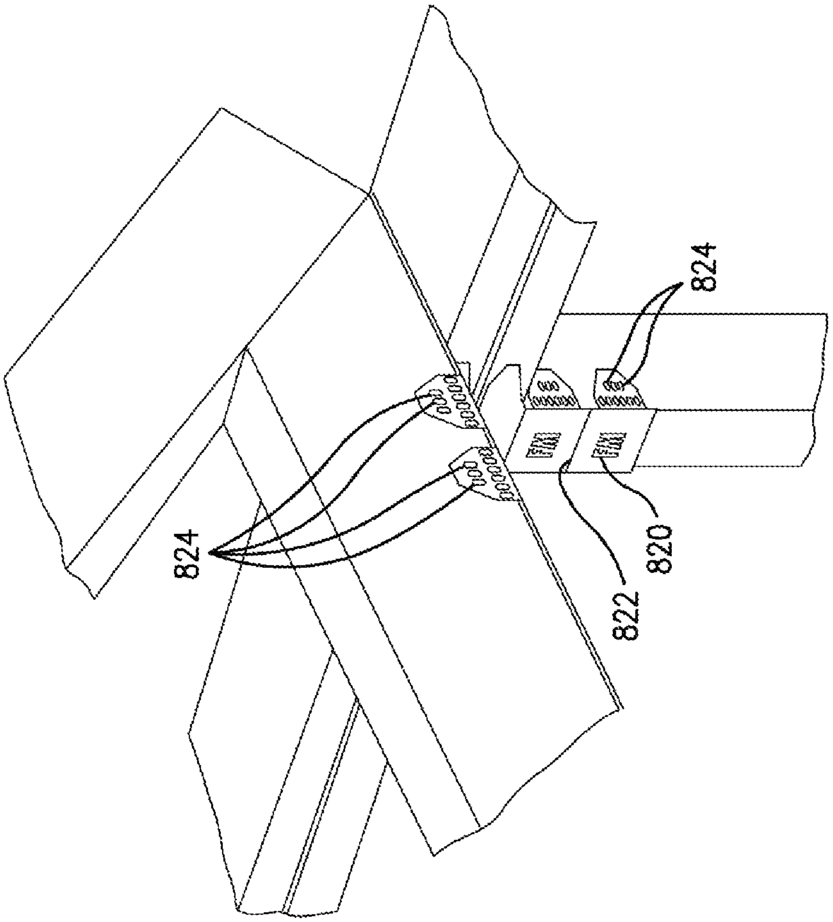
Figure 41B:
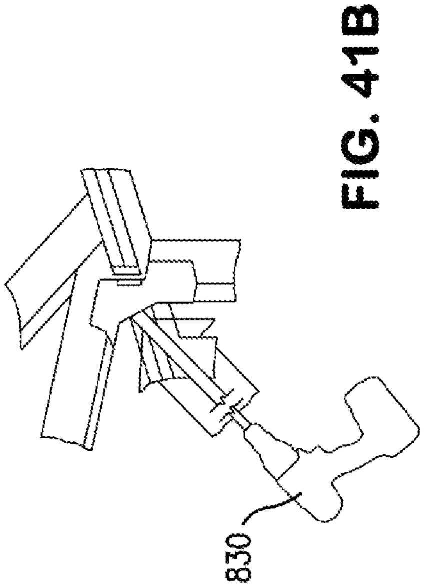
FIGS. 41A-41D respectively illustrate a first step and tool which may be employed in installing the bracket of FIGS. 40A and 40B, a second step in the installation process, a third step in the installation process, and an installed view of the bracket
Figure 41D:
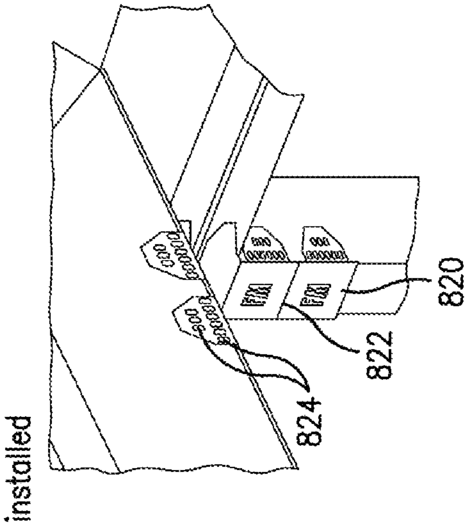
Figure 41A:
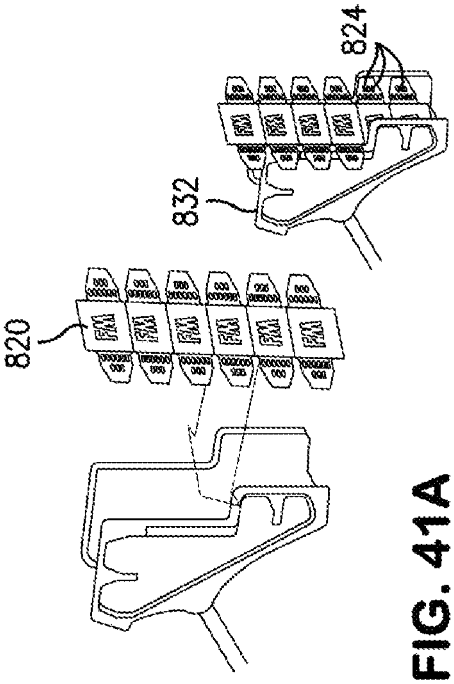
Figure 41C:
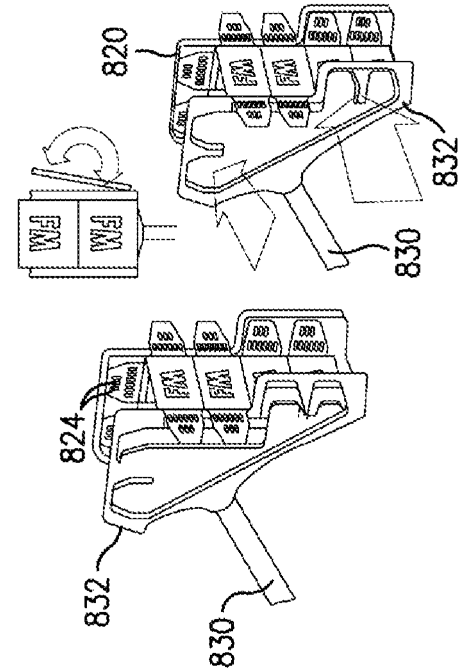

FIGS. 40A-40B illustrates an alternative metal construction bracket system. Flexible metal brackets 820 are arranged in elongated strips with score marks 822 or indentations between the segments. The elongated strips may be cut or broken between segments to provide metal brackets of different length. FIG. 40A illustrates a five-segment bracket placed to tie a vertical stud to a top plate and a roof truss. The disclosed metal brackets 820 include metal perforations which can be pressed into the wood to provide a secure bracket to wood connection.

FIGS. 41A-41D illustrates a tool 830 complementary to the disclosed flexible metal brackets 820. The tool 830 is configured to bend and clamp the proposed bracket in place, pushing the perforated metal barbs into the wood. A tool adaptor 832 provides clamping force on the disclosed brackets. A rotary drive tool adaptor is disclosed, though a hydraulic tool is also suitable for this purpose. The jaws of the tool include protrusions configured to mate with perforations on the brackets and push portions of the brackets into the wood, thereby attaching the brackets to the wood.

Figure 44A:
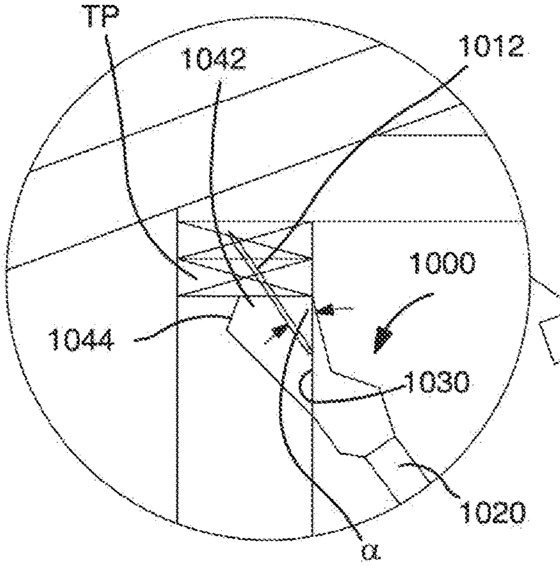
FIG. 44A is an enlarged schematic view of the adaptor and wall stud/top plate portion of FIG. 44.
Figure 44B:
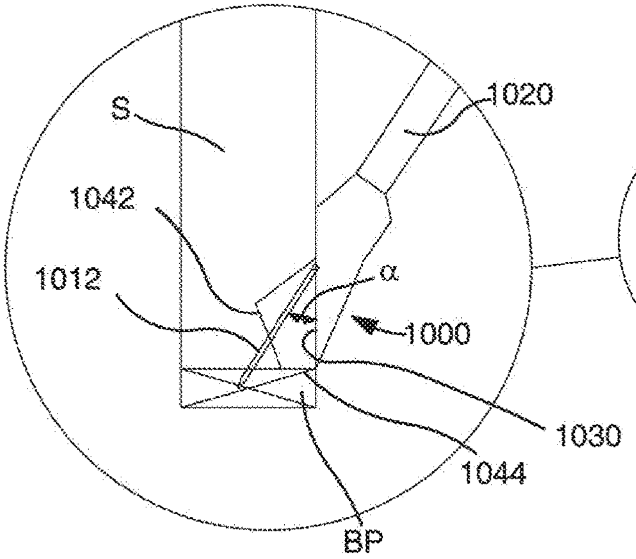
FIG. 44B is an enlarged schematic view of the adaptor and wall stud/bottom plate portion of FIG. 44.
Figure 44:
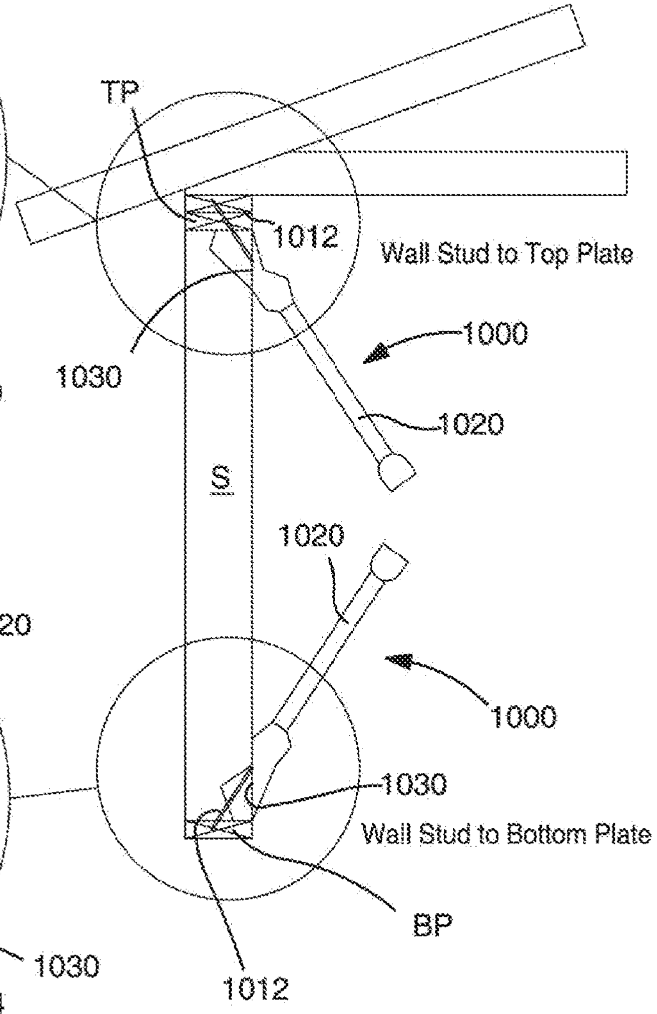
FIG. 44 is an annotated schematic view illustrating a fastener installation tool adaptor as used in connection with fastening a wall stud to a top plate and as used in fastening a wall stud to a bottom plate.
Figure 45:
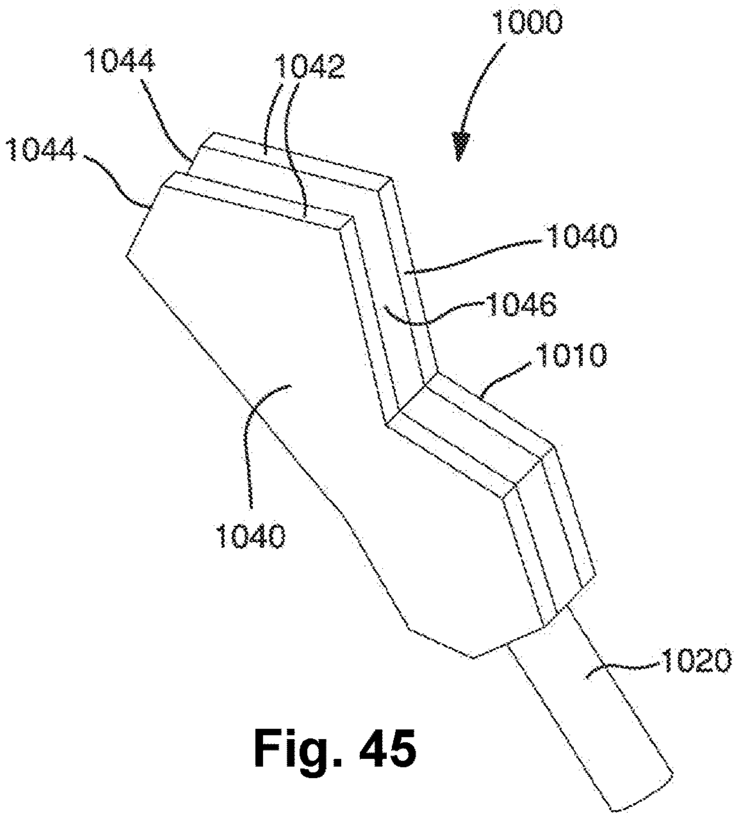
FIG. 45 is a perspective view of the adaptor of FIG. 44.
Figure 46:
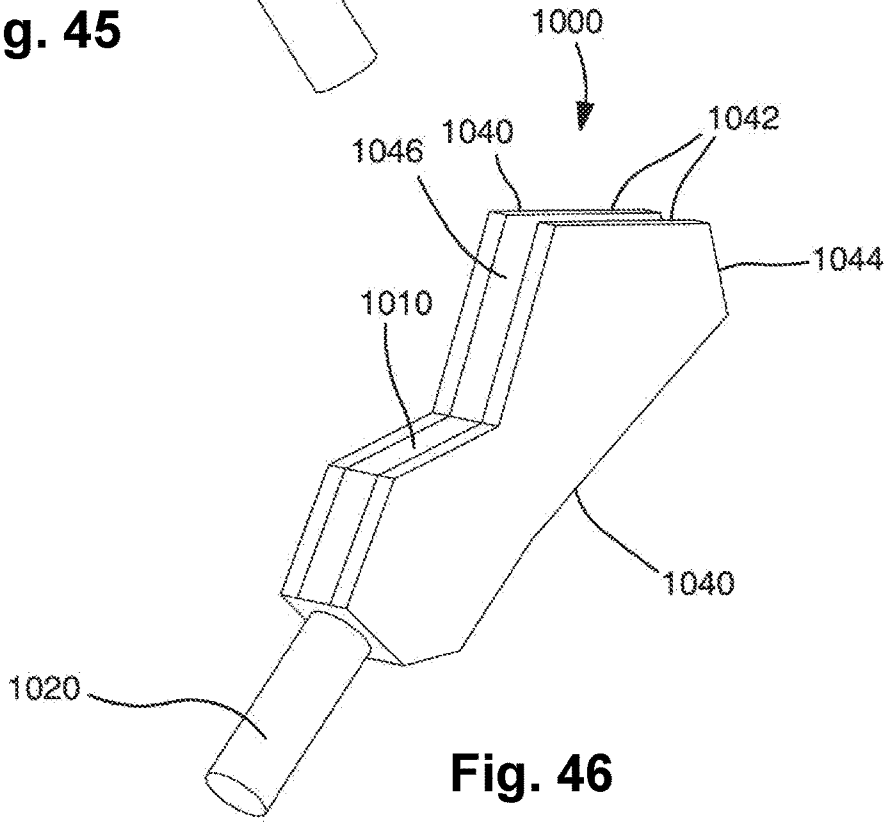
FIG. 46 is a perspective view of the adaptor of FIG. 45 from a different perspective.
Figure 47:
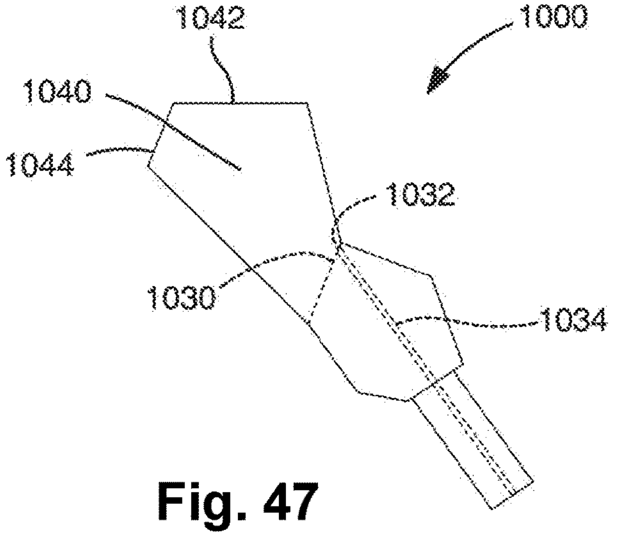
FIG. 47 is a side view, portions in phantom, of the adaptor of FIG. 45.

With reference to FIGS. 44-49, an adaptor 1000 is adapted for use in mounting to the end of an installation tool, such as tools 10, 200, 300, 400, 500 and 600 (without guide assemblies or adaptors) to provide a reference guide to reliably implement a proper entry angle and location of a fastener 1012 connecting through a support stud into a top plate and also into a bottom plate. The same adaptor 1000 may be used for both the illustrated top plate fastener installation and the bottom plate fastener installation as illustrated in FIG. 44. The stud is designated by the letter S, the top plate by TP and the bottom plate by BP in FIGS. 44, 44A and 44B.

Figure 48:
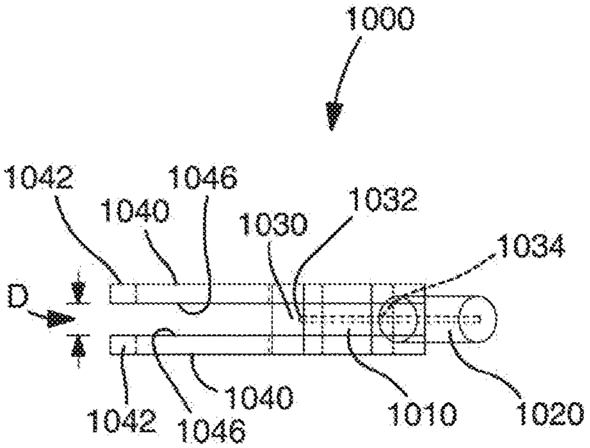
FIG. 48 is a diagrammatic bottom plan view, portions in phantom, of the adaptor of FIG. 47.
Figure 49:
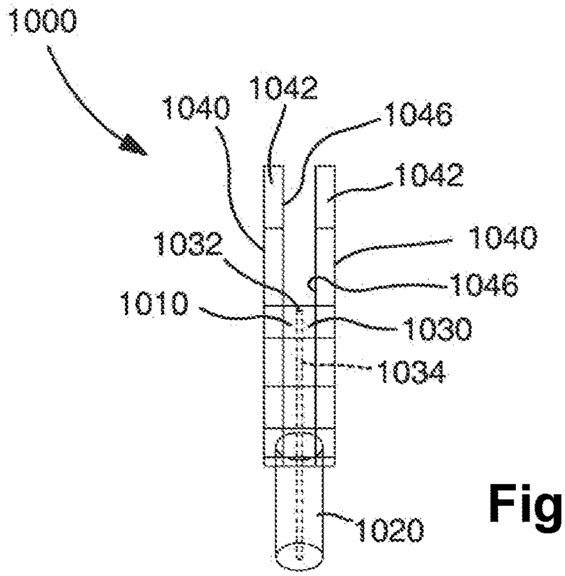
FIG. 49 is a right side view, portions in phantom, of the adaptor of FIG. 47.

The adaptor 1000 comprises an adaptor head 1010 which mounts via coupling tube 1020 to the distal tube of a telescopic tube assembly. The head defines a reference entry surface 1030 which is at an angle to the fastener opening 1032 and fastener channel 1034 aligned with the drive axis of the tube. A pair of irregularly shaped polygon arms 1040, which are identical in shape, connect at opposite sides of the head and define spacing distance D which is substantially equal to the width of the stud S (FIG. 48). The arms 1040 each have a first reference edge 1042 and a second reference edge 1044 that intersect and are at angles to each other. The reference edges 1042 are co-planar, and the reference edges 1044 are co-planar.

The arms have substantially parallel inner faces 1046. The inner faces 1046 of the arms receive and essentially capture the upper portion of the stud S. The entry surface 1030 engages against the edge of the stud and the first reference edges 1042 of the arms engage the underside of the top plate TP, as best illustrated in FIGS. 44 and 44A. The concurrent engagement of the entry surface 1030 and the first reference edge 1042 properly fixes the position and the entry angle of the fastener 1012 into the stud S (from the edge) and ultimately the top plate TP to provide an optimum connection. In the preferred embodiment, the entry angle α (relative to the vertical) is approximately 35°.

When it is desired to use the installation tool to provide a connection between the lower portion of the wall stud S and the bottom plate BP, the installation tool with the fixed adaptor is merely repositioned so that the entry surface 1030 of the head engages the lower portion of the edge of the stud and the second reference edge 1044 engages the top portion of the bottom plate BP to provide an optimal position and entry angle for driving a fastener 1012 into the stud S and the bottom plate BP as illustrated in FIG. 44B. In the preferred embodiment, the entry angle α relative to vertical is approximately 35°.

Figure 50:
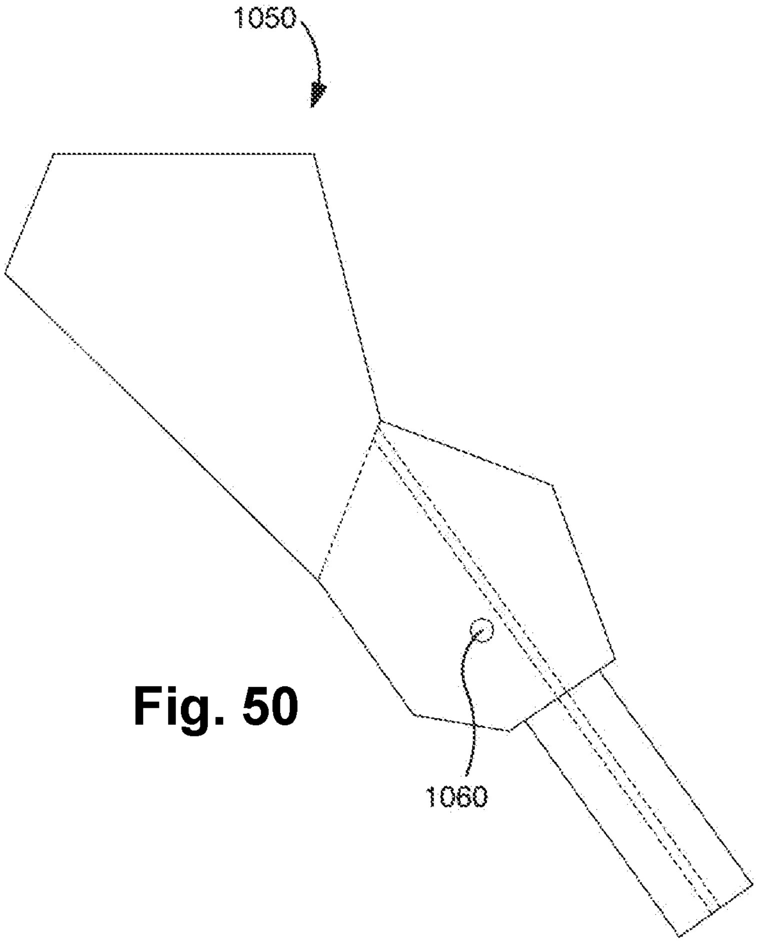
FIG. 50 is a side view, portions in phantom, of a modified adaptor.
Figure 51:
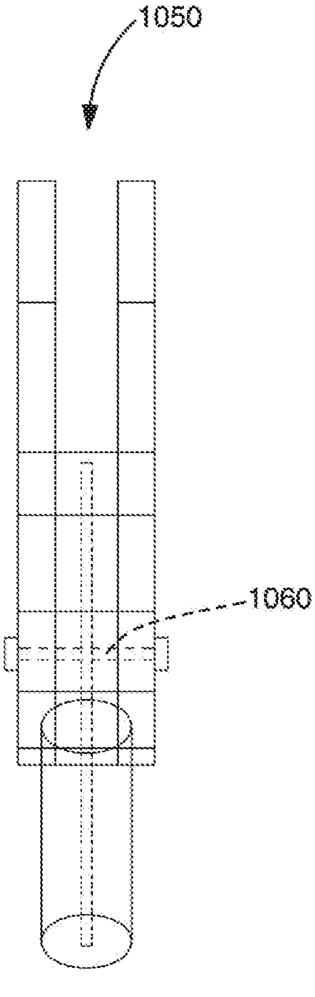
FIG. 51 is a bottom plan view, portions in phantom, of the modified adaptor of FIG. 50.

With reference to FIGS. 50 and 51, a modified version of adaptor 1000 is designated as adaptor 1050. This adaptor 1050 is substantially identical to adaptor 1000 except that the arms 1040 are pivotally mounted to the adaptor head by a pivot pin 1060. The arms may be independently pivotal, but for most fastener installations, generally align as illustrated for adaptor 1000. This adaptor 1050 thus allows for one arm to be pivoted in the event that there is a headroom constraint or obstacle which prevents both of the arms from engaging opposing sides of a vertical stud S.

Figure 52:
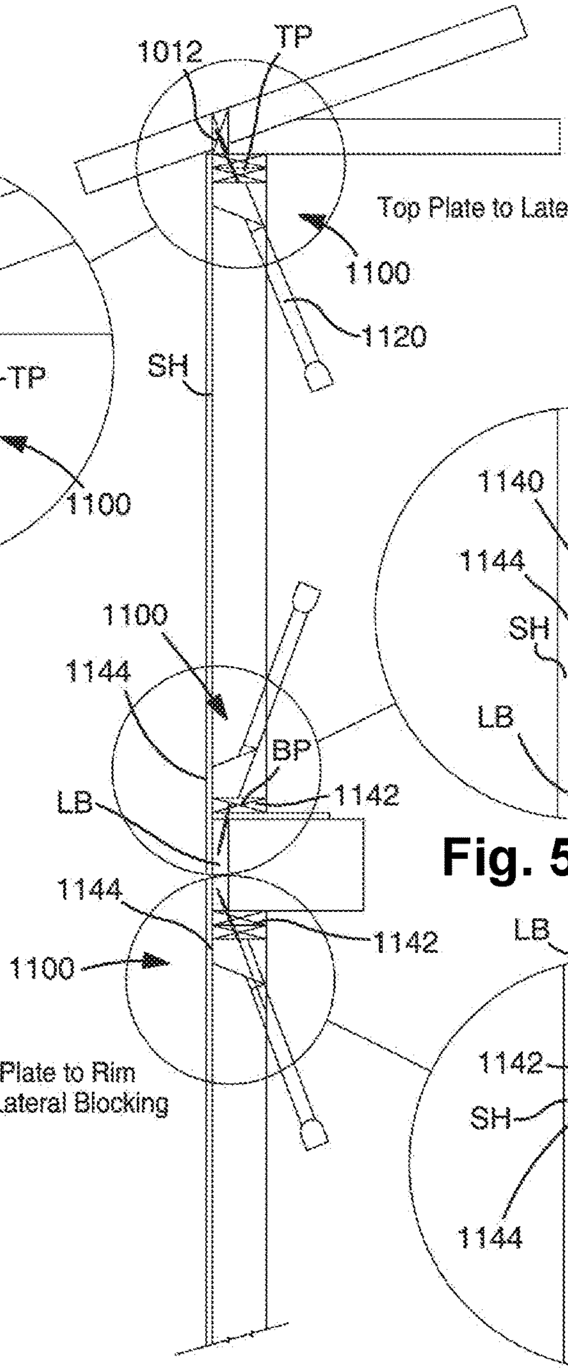
FIG. 52 is an annotated schematic view illustrating the usage of another embodiment of a fastener installation tool adaptor to fasten a top plate to lateral blocking, to fasten a plate to a rim board/lateral blocking from an upper installation position and to fasten a top plate to a rim board/lateral blocking from a lower position.
Figure 52A:
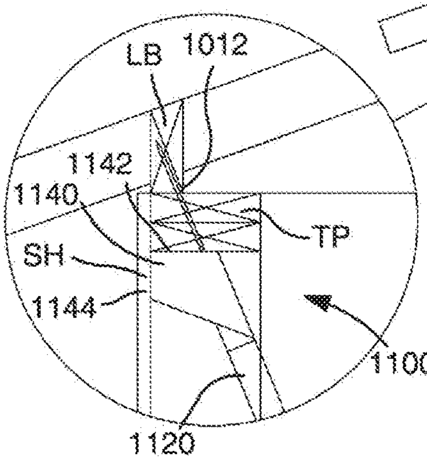
FIG. 52A is an enlarged schematic view of the adaptor and plate/lateral blocking of FIG. 52.
Figure 52B:
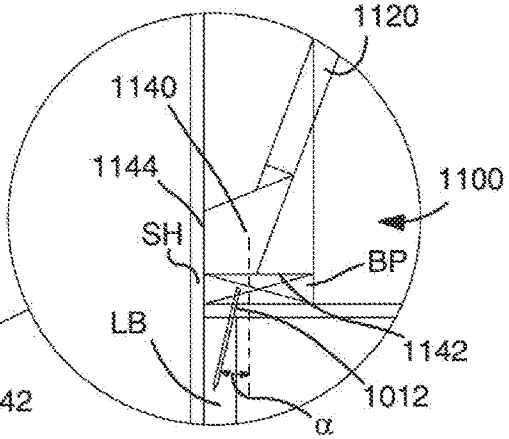
FIG. 52B is an enlarged schematic view of the adaptor and bottom plate/rim board/lateral blocking from a mid-position of FIG. 52.
Figure 52C:
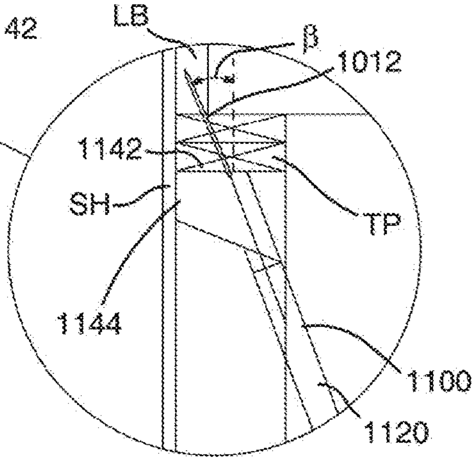
FIG. 52C is an enlarged schematic view illustrating the adaptor and top plate/rim board/lateral blocking from a lower position.
Figure 53:
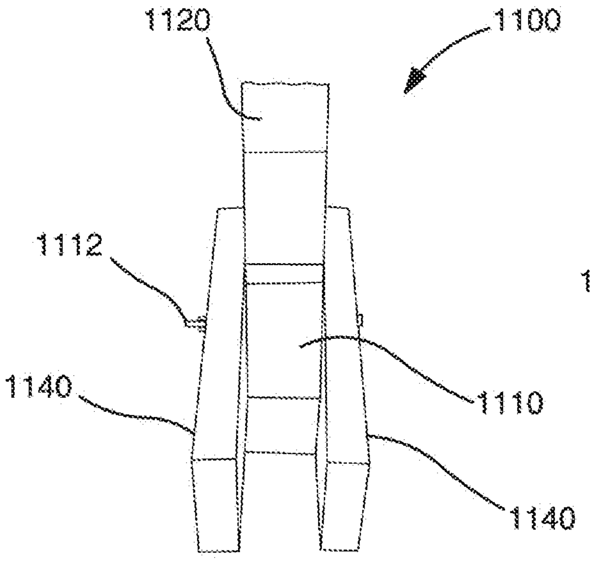
FIG. 53 is a frontal view of the fastener installation tool adaptor of FIG. 52.

With reference to FIGS. 52-56, a fastener installation tool adaptor 1100 is configured to mount to the end of a fastener installation tool and provide a proper entry for a fastener 1012 for a plate to a rim board or blocking B as illustrated in FIGS. 52-52C. The fasteners are installed to resist uplift and/or lateral forces in the structure. For adaptor 1100, there are two pivotal positions. Each pivot position defines a different entry angle into a horizontally disposed member.

The head 1110 mounts to a connector or coupling tube 1120 and provides an opening for the fastener so that the fastener is driven at an optimum location and angle. Two substantially identical irregular four sided arms 1140 are pivotally mounted to the head by a pivot pin 1112. A transverse bridge 1150 connects the arms 1040. The arms 1140 pivot in tandem. The arms define first reference edges 1142 and second reference edges 1144 that are at substantially right angles or orthogonal to each other. The first reference edges 1142 are coplanar and the second reference edges 1144 are coplanar.

In the upper or TOP position, as best illustrated in FIG. 52A, reference edges 1142 engage the underside of the top plate TP and reference edges 1144 engage against a sheathing SH. This fixes the proper location and entry angle β (relative to the vertical) for the fastener which connects the top plate to the lateral blocking LB. This position is also illustrated in FIG. 52C.

The arms 1140 may also be pivoted in tandem to a second BOTTOM position wherein the first reference edges 1144 engage the upper surface of a lower plate and the second reference edges 1142 engage the sheathing SH to provide the proper location and entry angle γ (relative to the vertical) into the rim board/lateral blocking LB, as best illustrated in FIG. 52B.

Figure 54:
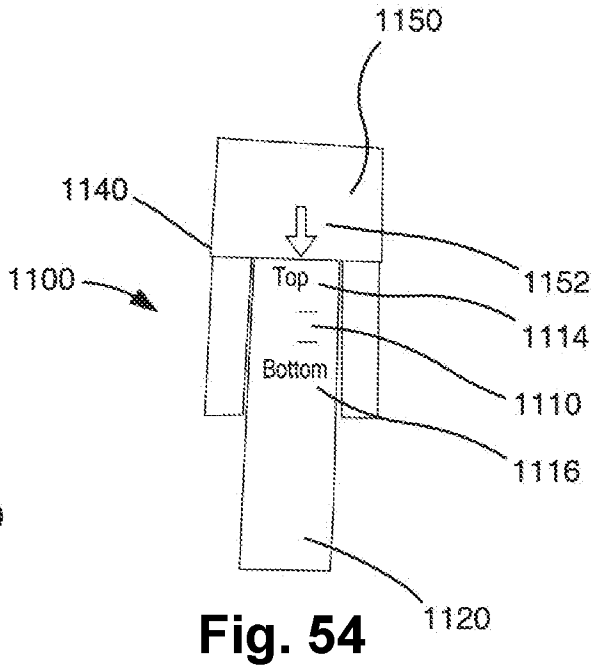
FIG. 54 is an enlarged view of the adaptor of FIG. 53 in a top pivot position.
Figure 55:
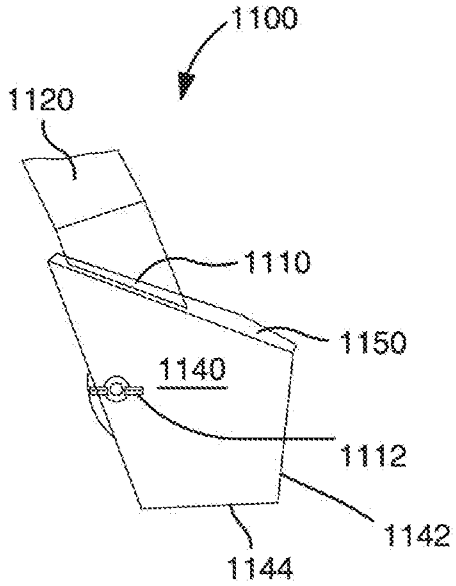
FIG. 55 is a side view of the adaptor of FIG. 53 in a bottom pivot position.
Figure 56:
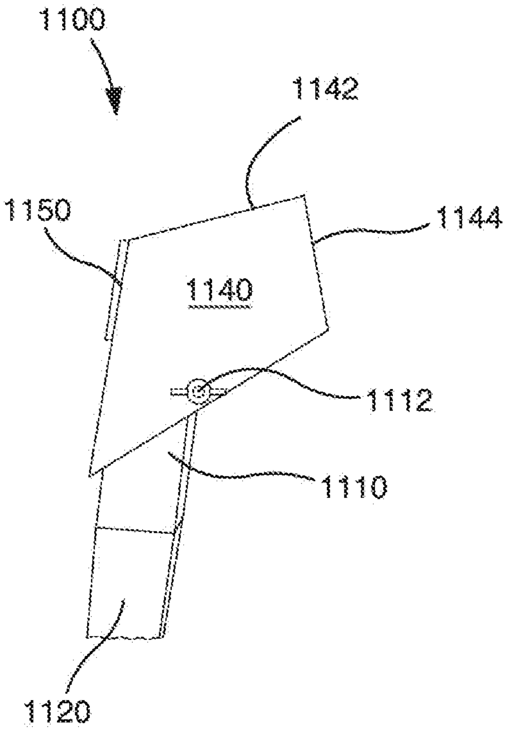
FIG. 56 is a side elevational view of the adaptor of FIG. 53 in a top pivot position.

With reference to FIG. 54, the bridge 1150 preferably includes an arrow 1152 and the head has indicia 1114 and 1116, respectively, indicating TOP and BOTTOM pivot position. Selectively pivoting positioning the arrow 1152 relative to the head 1110 indicates the proper pivotal position of the adaptor 1100 for a desired fastener connection. The entry angles are preferably approximately 20° for the entry angle β of the top plate TP to the lateral blocking LB (FIG. 52C) and approximately 12° for the entry angle γ of the bottom plate BP to the lateral blocking LB (FIG. 52B).

With reference to FIGS. 57A to 75, a dual positionable fastener installation tool adaptor is generally designated by the numeral 2000. The adaptor 2000 functions to provide the proper entry angle and location for driving a fastener to connect a vertical member, such as a stud, with a horizontal member. Adaptor 2000 mounts to the end of a fastener driver assembly 2010 having a telescopic tube assembly with a distal tube 2020. The adaptor 2000 and distal tube 2020 of the driver assembly are configured so that the adaptor may be mounted to the tube at one of two angular positions about the central axis of the distal tube 2020 at essentially 180° spaced angular positions.

Figure 57A:
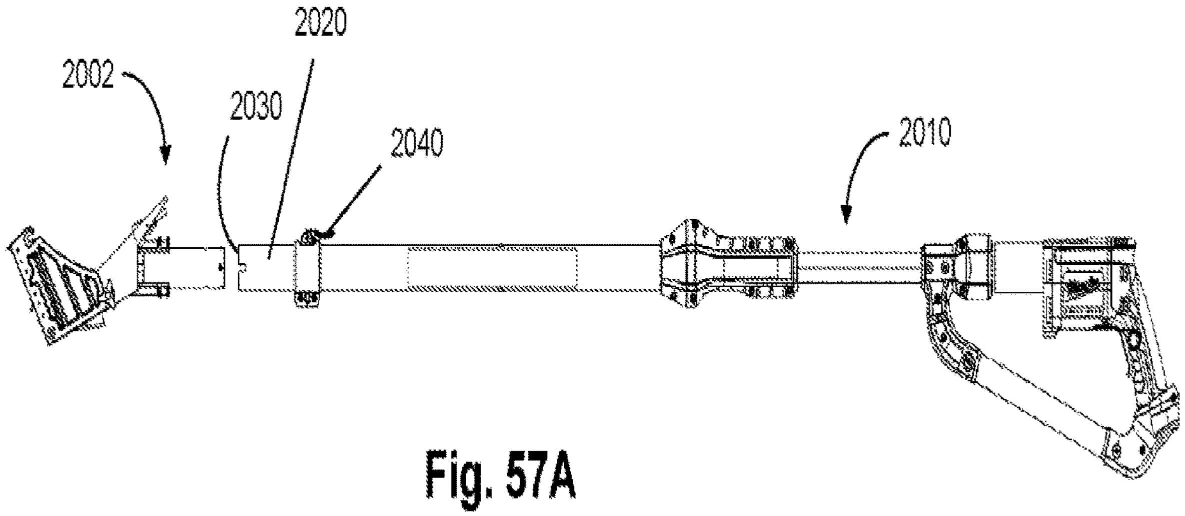
FIGS. 57A and 57B are respectively side views of a dual positionable adaptor and a fastener driver assembly in a dismounted and mounted disposition for a first installation position.
Figure 57B:
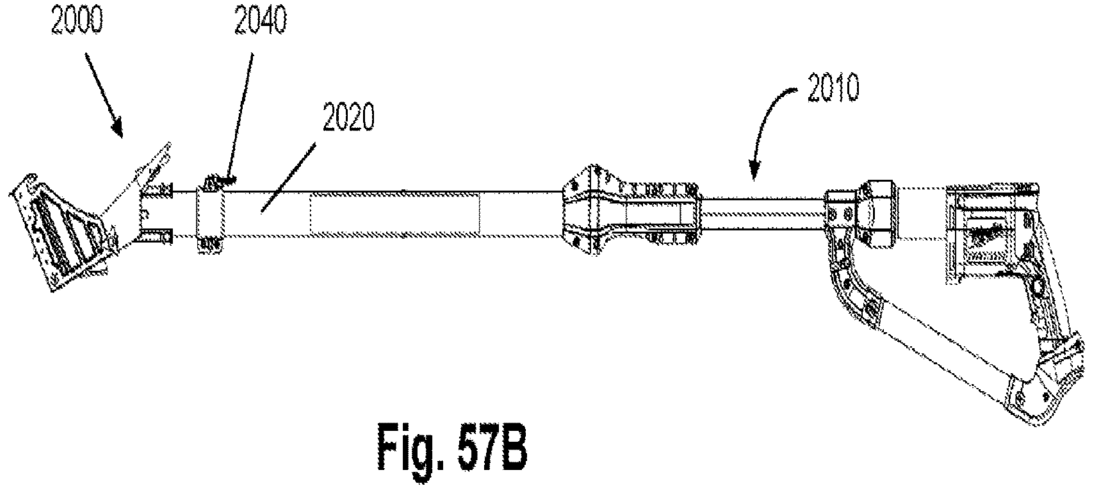
Figure 58A:
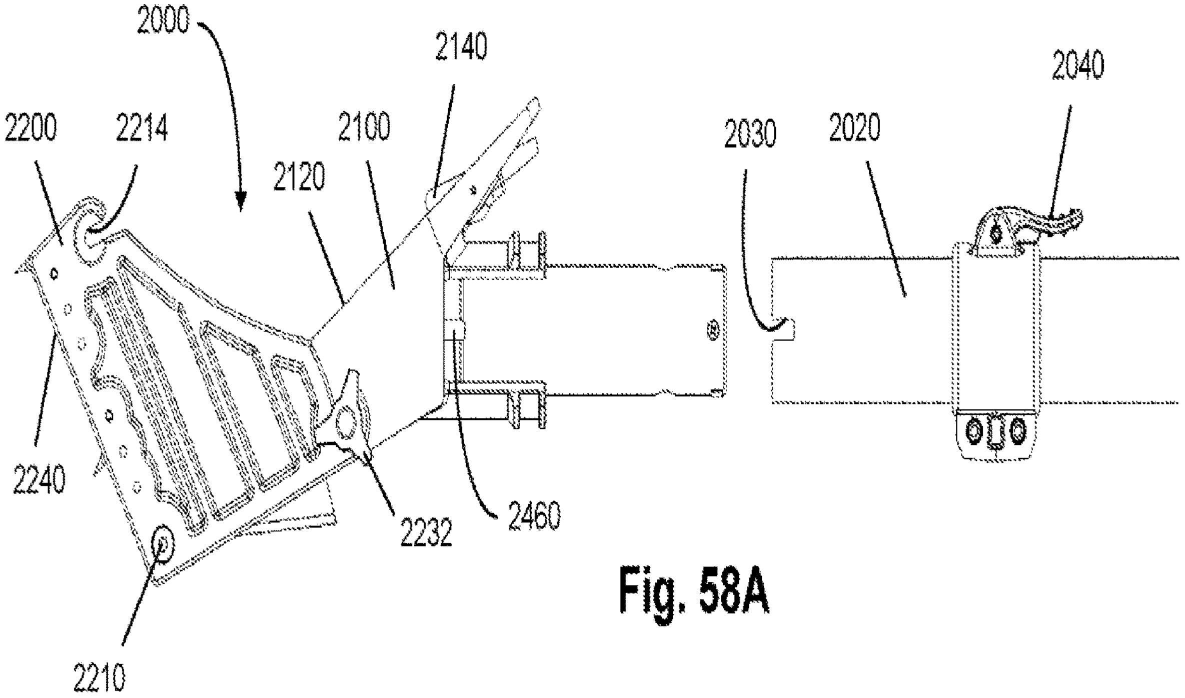
FIGS. 58A and 58B are respectively enlarged side views of the adaptor and a portion of the driver assembly of FIG. 57A in a dismounted and mounted disposition for the first position.
Figure 58B:
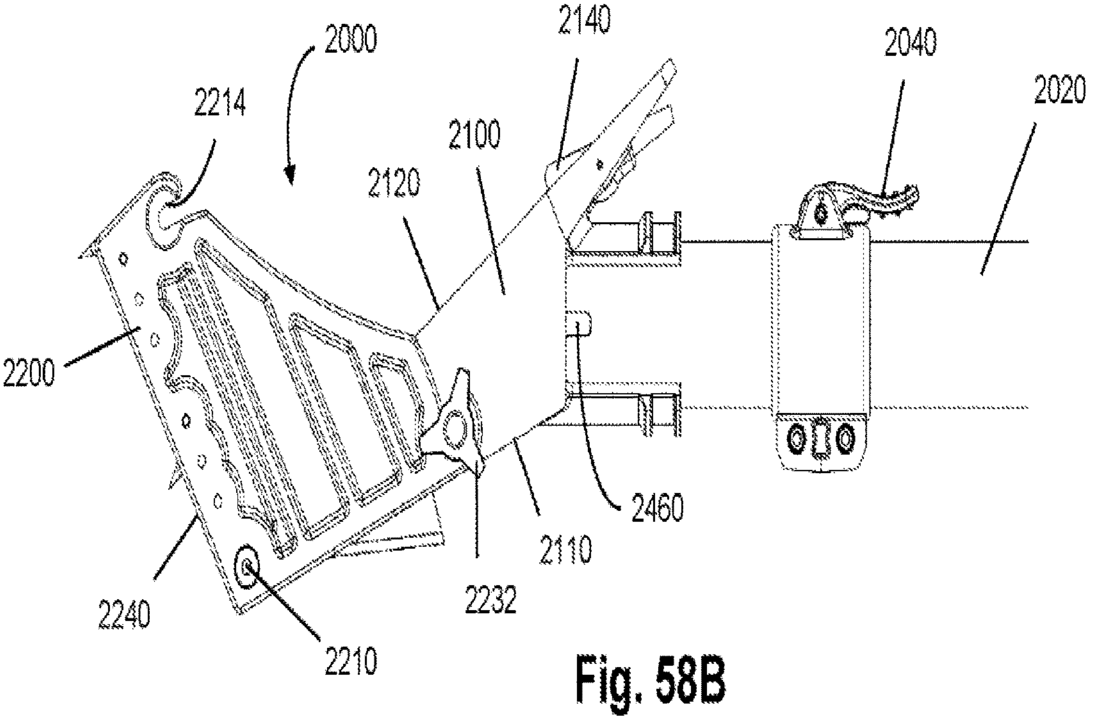
Figure 59A:
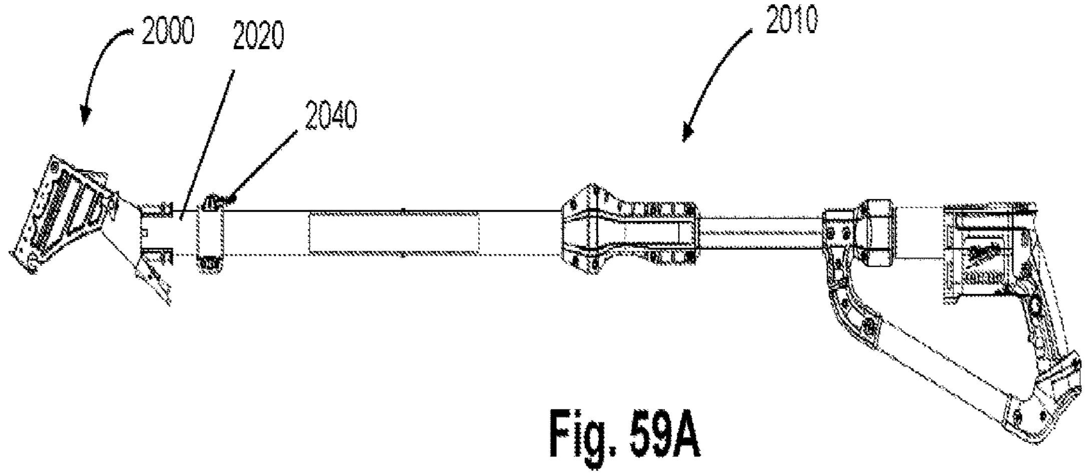
FIGS. 59A and 59B are respectively side views of the adaptor and driver assembly of FIG. 57A in a mounted and a dismounted disposition for a second installation position.
Figure 59B:
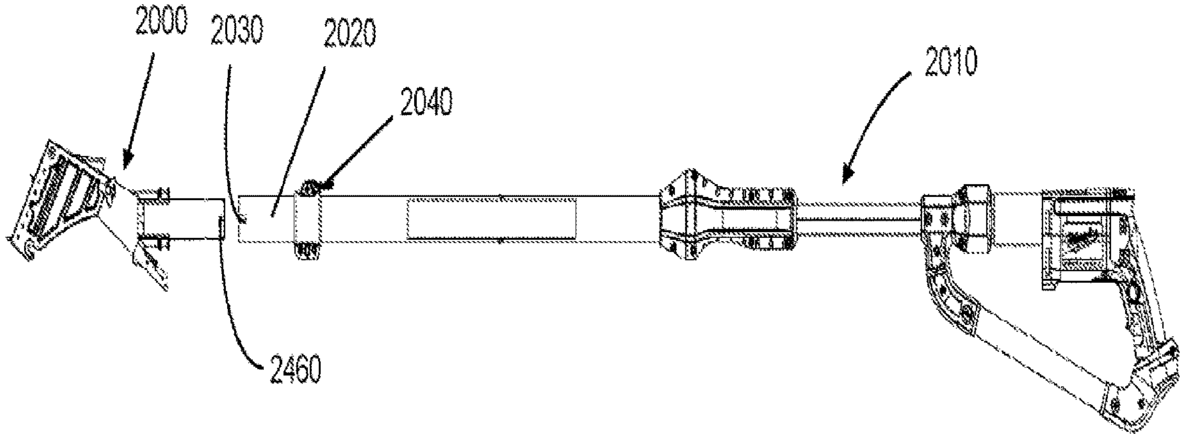
Figure 60A:
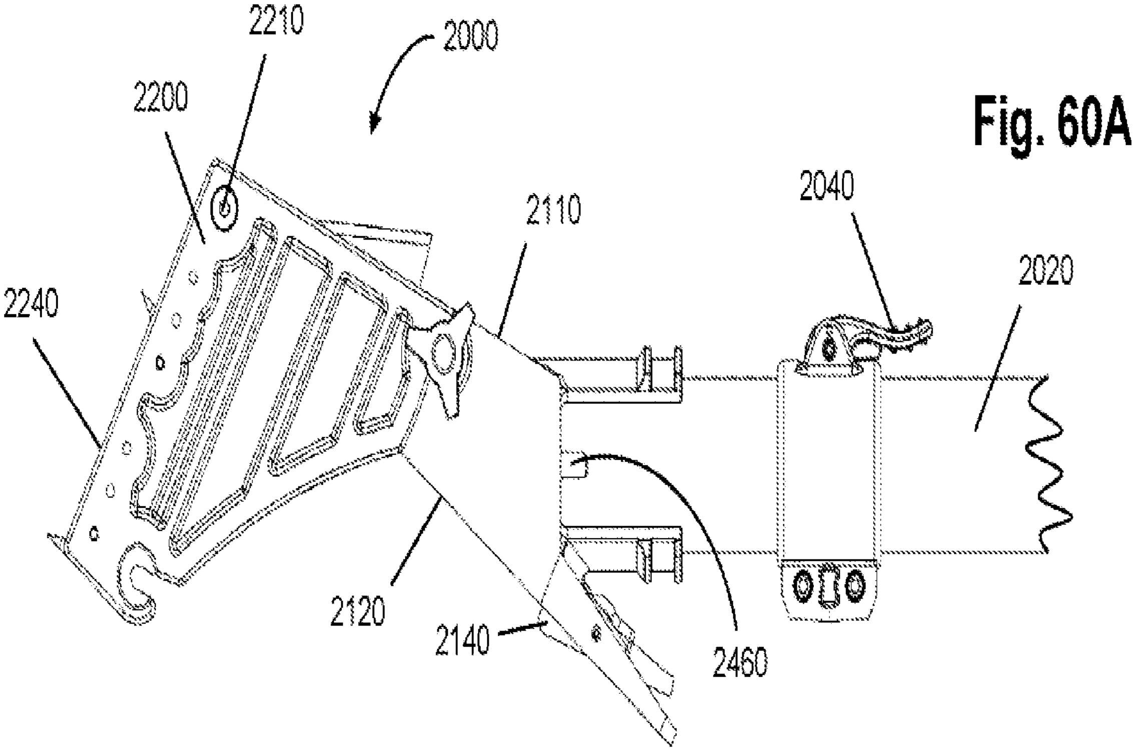
FIGS. 60A and 60B are respectively enlarged side views of the adaptor and driver assembly of FIG. 59A in a mounted and a dismounted position illustrating the second installation position.
Figure 60B:
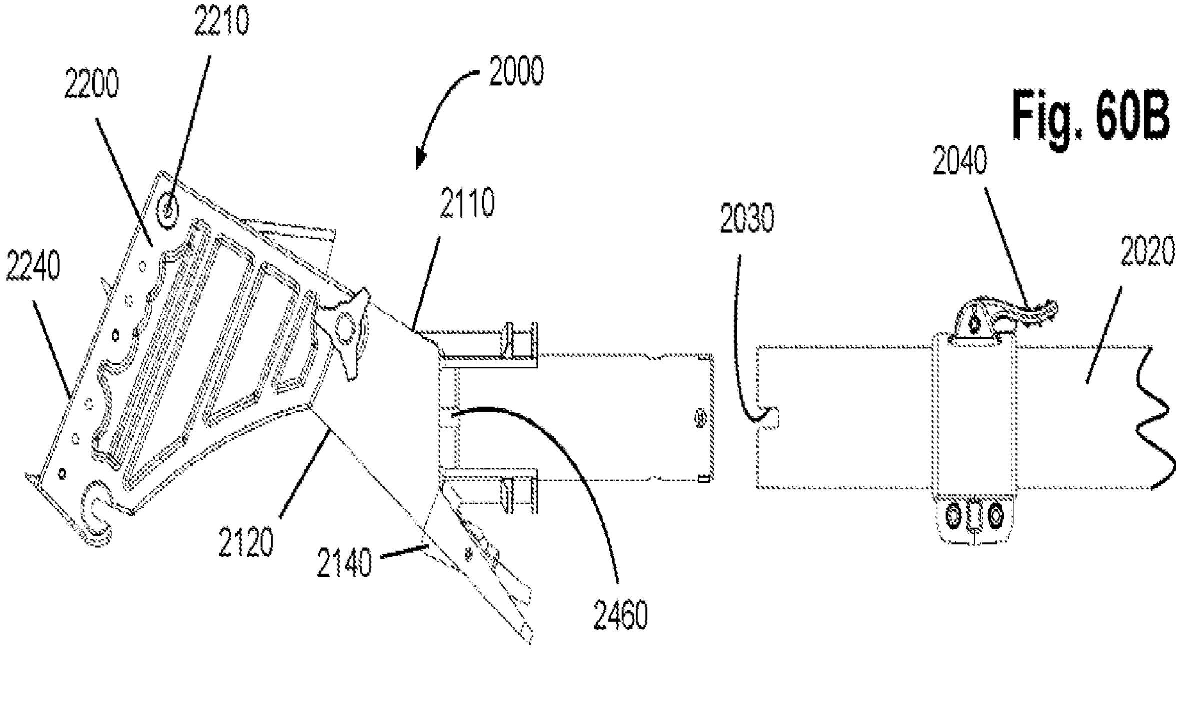

A first mounted position is illustrated in FIGS. 57A and 57B. The adaptor engages a vertical member and a horizontal member in a stable, fixed position to provide a proper angle for driving a fastener, for example, through a vertical stud into a bottom plate. In a second mounted position illustrated in FIG. 59B, the adaptor 2000 is configured to engage the stud in a stable, fixed and properly aligned relationship and drive a fastener into a top plate. The adaptor 2000 thus provides an optimal location and entry angle for connecting an upper top plate and an optimal location and entry angle for driving a fastener for connecting a lower bottom plate.

The key to obtaining the dual positions is unclamping the adaptor 2000 at a first defined angular position relative to the tool, slightly axially displacing the adaptor, rotating the adaptor 180° to a second angular position, slightly axially displacing the adaptor, and reclamping the adaptor 2000 in position.

Figure 62A:
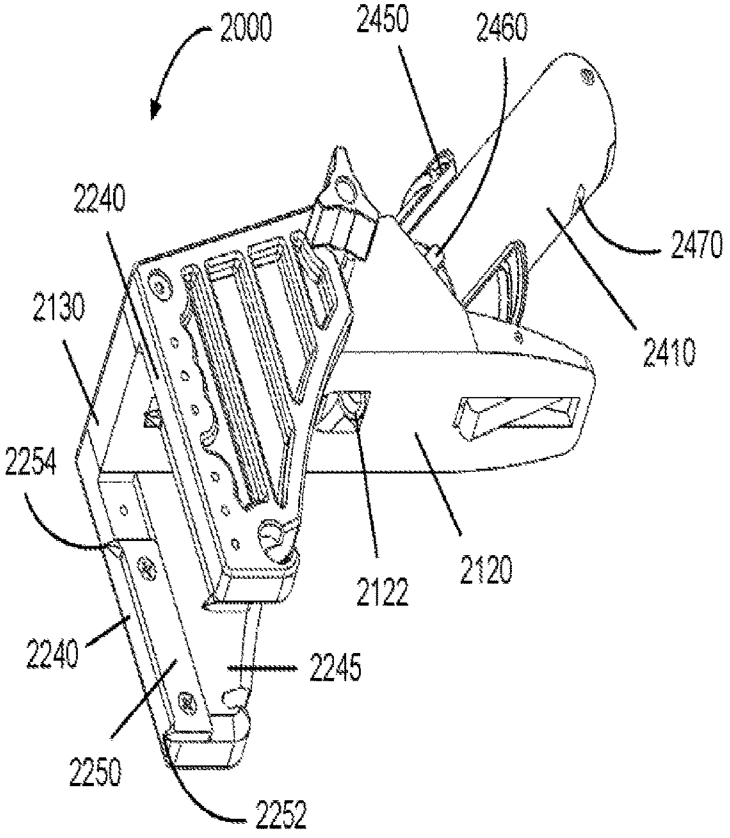
FIGS. 62A and 62B are generally bottom and left end perspective views, respectively, of the dual positionable adaptor.
Figure 63A:
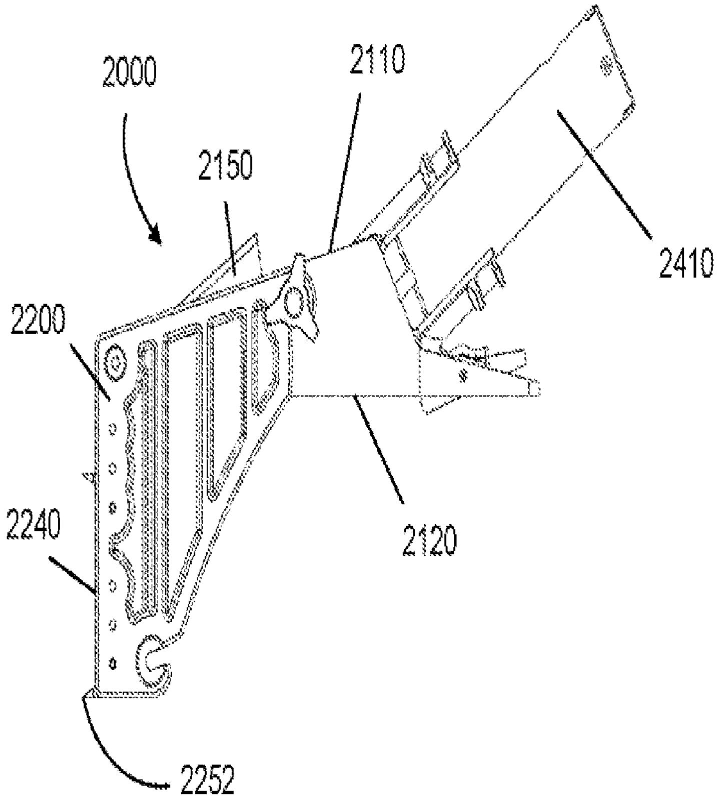
FIGS. 63A and 63B are respectively a side view and a bottom plan view of the dual positionable adaptor.
Figure 63B:
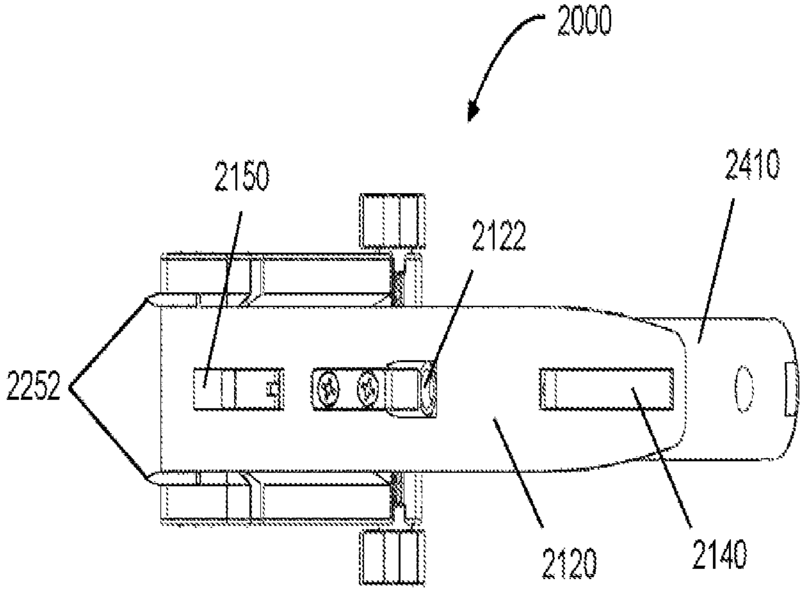
Figure 64A:
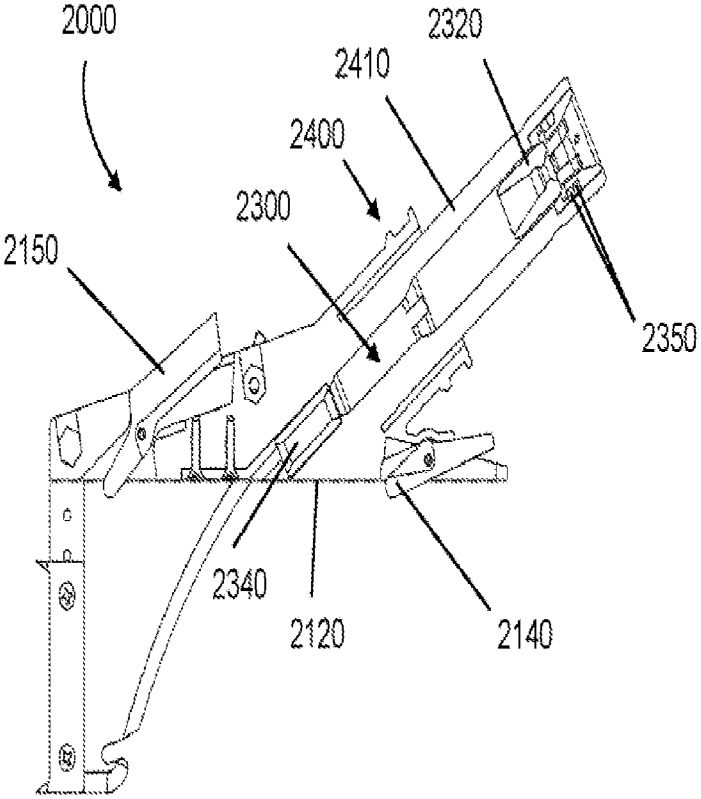
FIGS. 64A and 64B are central sectional views of the dual positionable adaptor illustrating a non-flush mode and a flush mode for the adaptor for a first and a second flush indicator, respectively.
Figure 64B:
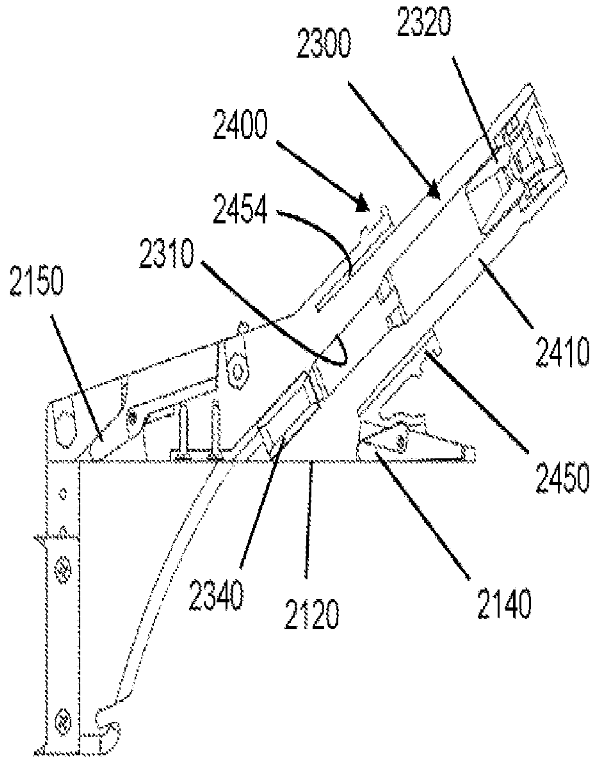

The adaptor 2000 includes a base 2100 which has a generally planar first reference surface 2110 and a generally opposite second generally planar reference surface 2120. Surfaces 2110 and 2120 are not parallel. The reference surface 2120 of the base defines a fastener opening 2122 (FIG. 63B). A fastener receiver assembly 2300 (FIG. 65) is received by the base 2100 and is disposed at an acute angle relative to the reference surface 2120. The forward distal portion of the base 2100 forms a planar nose 2130 (FIG. 62A). The base also mounts a flush indicator 2140 which is pivotal relative to the reference surface 2120 to provide an indicator that the reference surface 2120 is flush with the appropriate member as desired for driving the fastener.

Figure 61A:
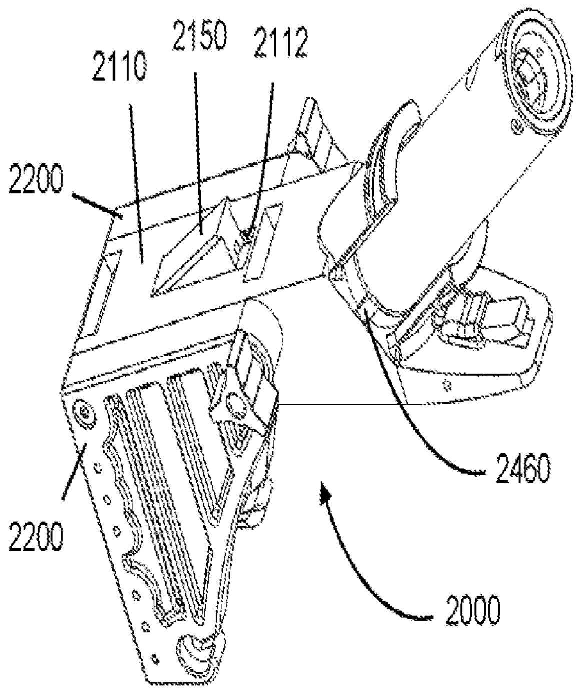
FIGS. 61A and 61B are perspective views of the dual positionable adaptor respectively illustrating a flush indicator in a non-flush mode and a flush mode.
Figure 61B:
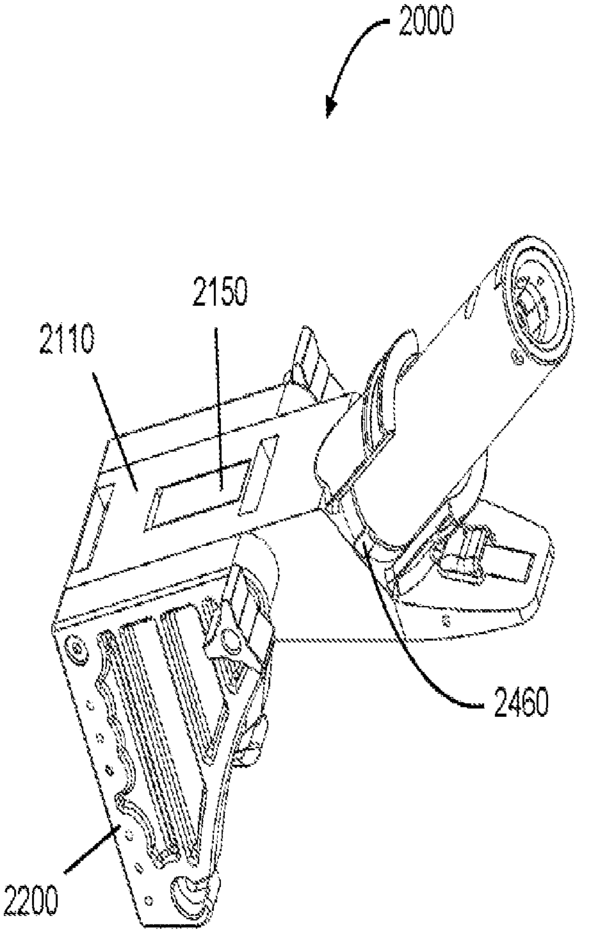

The surface 2110 of the base defines a recess 2112 which receives a second pivotal flush indicator 2150 which, when the reference surface 2120 is flush against upper vertical reference surface, the indicator 2150 pivots to indicate a flush position (FIG. 61B). The indicator is spring biased to extend outwardly from the reference surface when a component is not engaged in surface-to-surface relationship with the reference surface 2120.

Transversely spaced wings 2200, which are preferably substantially identical in shape, function in tandem as guides to properly position and stabilize the adaptor. The wings pivotally mount to the base about a pivot 2210 at a location generally adjacent the nose 2130 of the base. The wings preferably have a quasi-triangular shape with a restricted access opening 2212 (FIG. 72B) and a second restricted access opening 2214 at quasi-opposed vertex positions. Openings 2212 and 2214 are equidistantly spaced from pivot 2210. A threaded pin 2230 with a knob 2232 threads into the base and extends through one of the openings to secure the wing 2200 at a given pivotal position (see FIG. 74). In that position, the other access opening is temporarily non-functional.

Figure 62B:
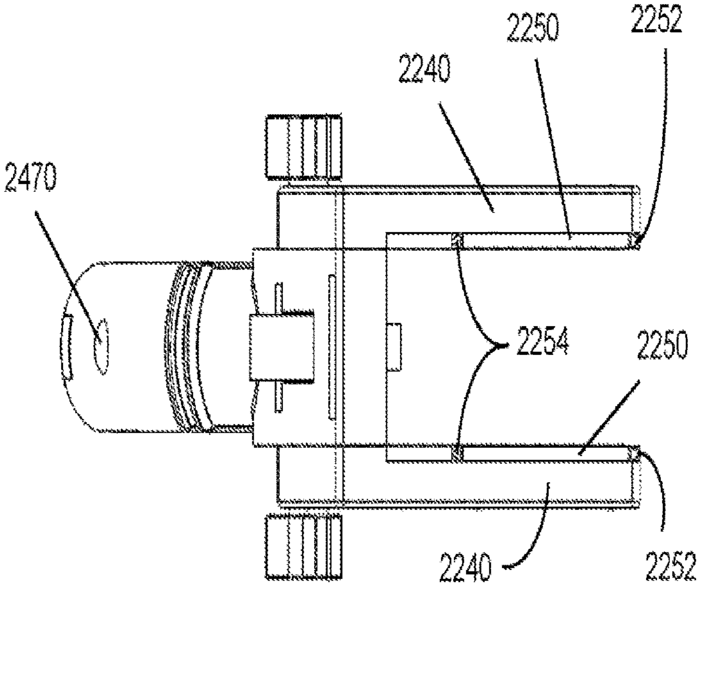

With additional reference to FIG. 62B, a wing has a reference engagement edge 2240. A metal plate 2250 is preferably mounted in a recess of an inner surface 2245. The plate 2250 is integrally affixed with a pair of spaced claws 2252 and 2254. The claws preferably have a claw configuration wherein the claws essentially traverse in three directions. The claws 2252, 2254 project from the reference engagement edges 2240. The claws are adapted to bite into the structural members to provide a stable fixed position for the fastener installation tool. As described herein, engagement by edges 2240 encompasses direct edges 2240 and/or claws 2252, 2254.

It will be appreciated that the wings 2200 are transversely spaced so that they receive between surfaces 2245 opposite sides of a stud so that the opening 2122—and hence the fastener—can be driven through the medial center line of the stud. The reference surface 2120, of course, also functions to engage against the stud surface-to-surface relationship to provide an optimum angle entry for the fastener.

Figure 65:
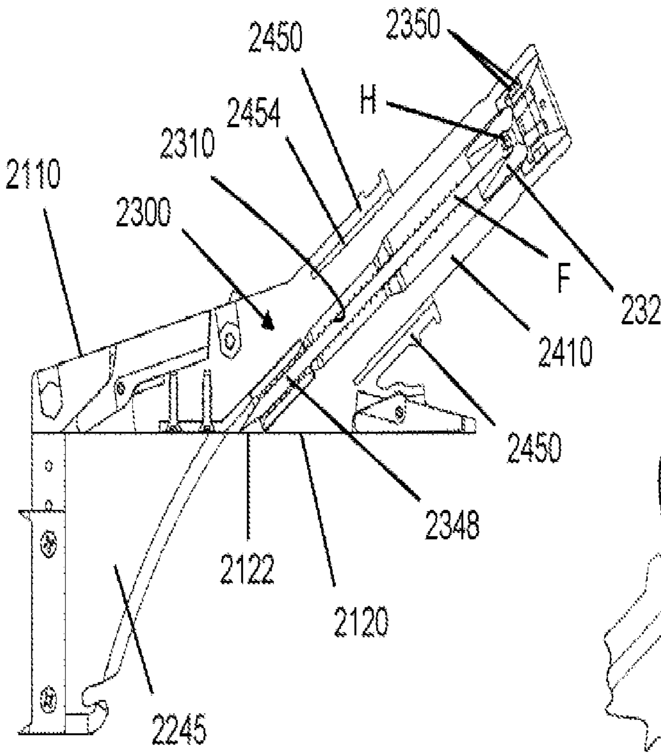
FIG. 65 is a central sectional view of the dual positionable adaptor with a received fastener with indicators in a flush mode.
Figure 66:
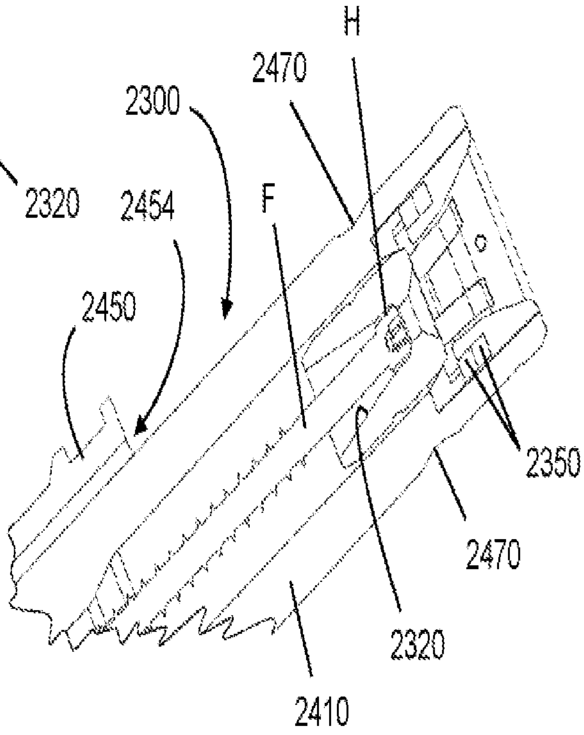
FIG. 66 is a fragmentary enlarged sectional view of the adaptor and fastener of FIG. 65.
Figure 67:
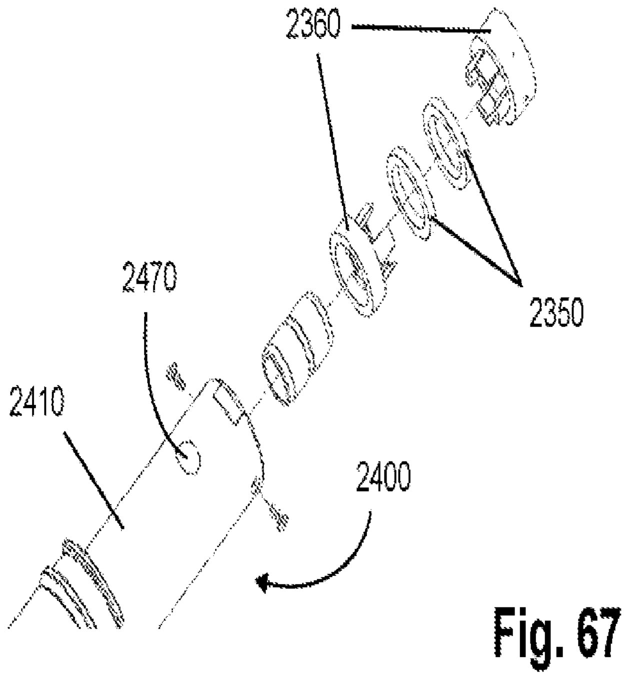
FIG. 67 is an exploded perspective view of portions of the dual positionable adaptor.

With reference to FIGS. 64A-67, the base mounts a fastener receiver assembly 2300 that employs a multifunction tube 2410 which defines a fastener channel 2310 for a received fastener F (FIGS. 65, 66). The channel is disposed at a pre-established angle relative to the reference surface 2120, e.g., the entry angle. A conical or quasi-conical funnel-like guide 2320 is mounted at an upper portion of the receiver assembly to center the received fastener F so that the driver bit or coupler (not illustrated) from the driver tool will properly engage the fastener head H. The lower portion of the tube assembly also includes a guide sleeve 2340 so that the driver will be unidirectionally driven into the member without wobble. A pair of wraparound magnets 2350 is secured by cooperative engaged pronged plugs 2360 at the driver coupling end of the tube. The magnets 2350 function so that the fastener is retained within the adaptor and does not slide out through the opening 2122 prior to drive engagement with the driver coupler.

A connector assembly 2400 extends from the base 2100. The assembly functions to receive the distal end of the telescopic tube assembly of the installation tool. The connector assembly employs the tube 2410 which defines and extends coaxially with the channel 2310. A pair of cooperative arcuate brackets 2450 surrounds a lower portion of the tube to form an arcuate receiving slot 2454. A lug 2460 (FIG. 68A) projects from the tube 2410. A second lug 2460 also projects at a diametrically opposed location.

Figure 68A:
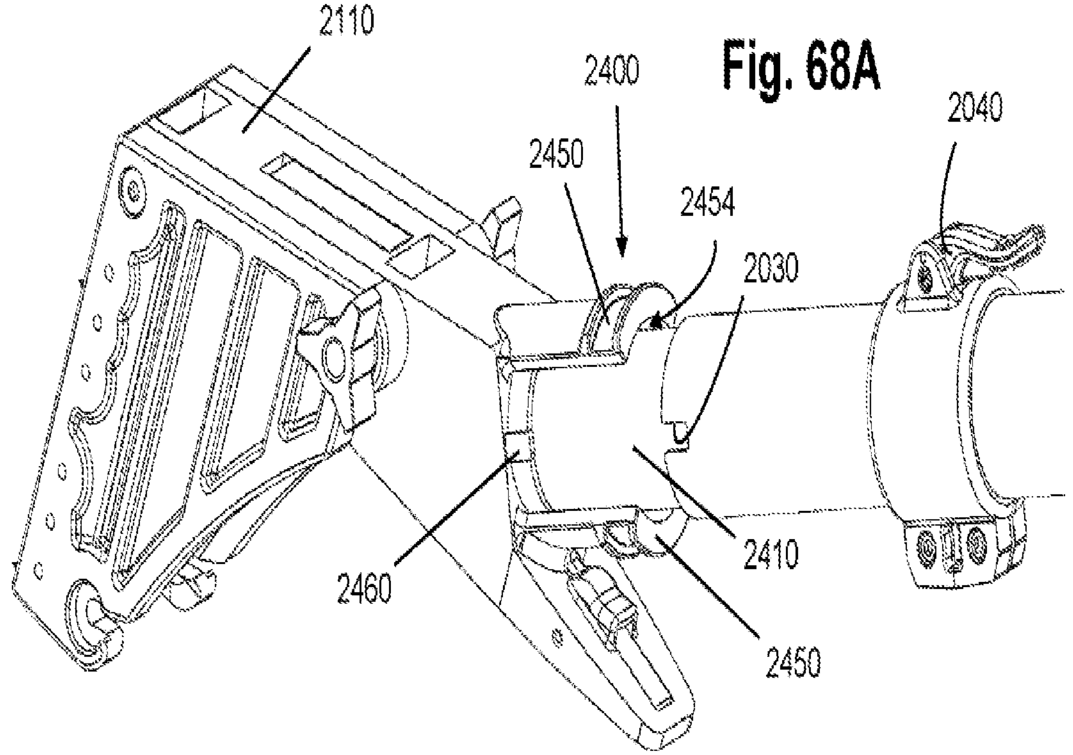
FIGS. 68A and 68B are perspective views of the adaptor and a portion of the drive assembly illustrating an unsecured and secured position, respectively, for the adaptor and driver assembly at a first installation position.
Figure 68B:
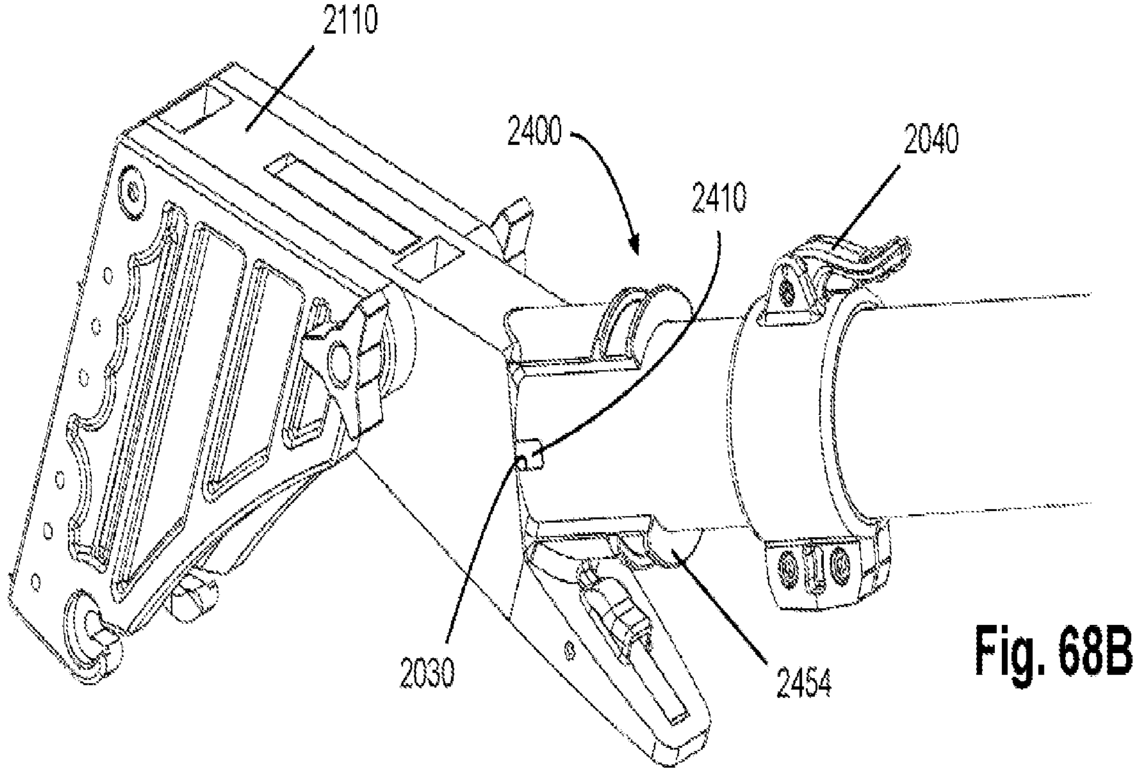
Figure 69A:
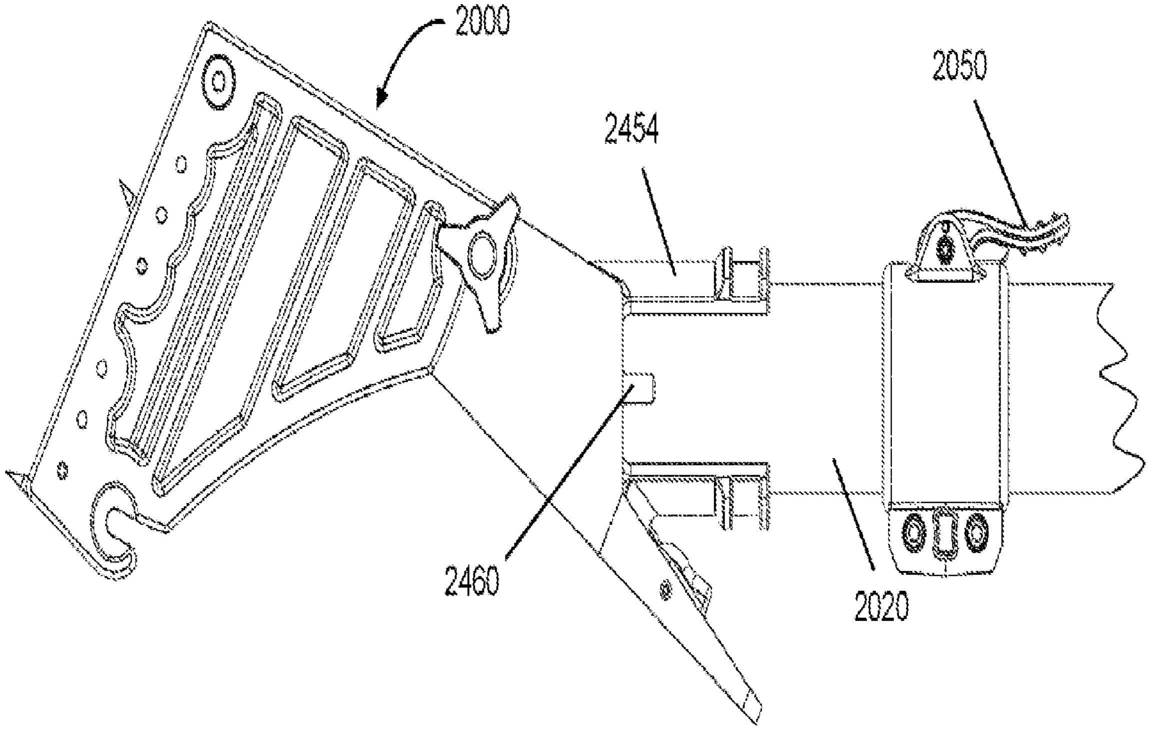
FIGS. 69A and 69B are side views of the adaptor and driver assembly portion of FIGS. 68A and 68B, respectively.
Figure 69B:
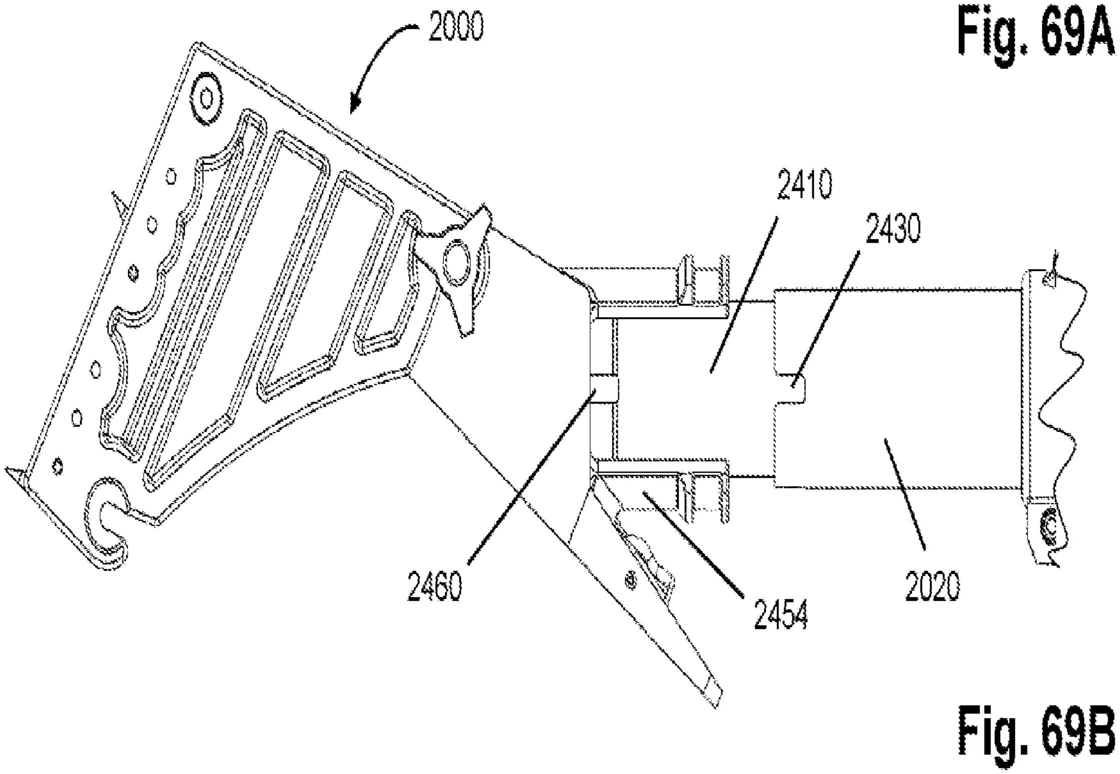
Figure 70A:
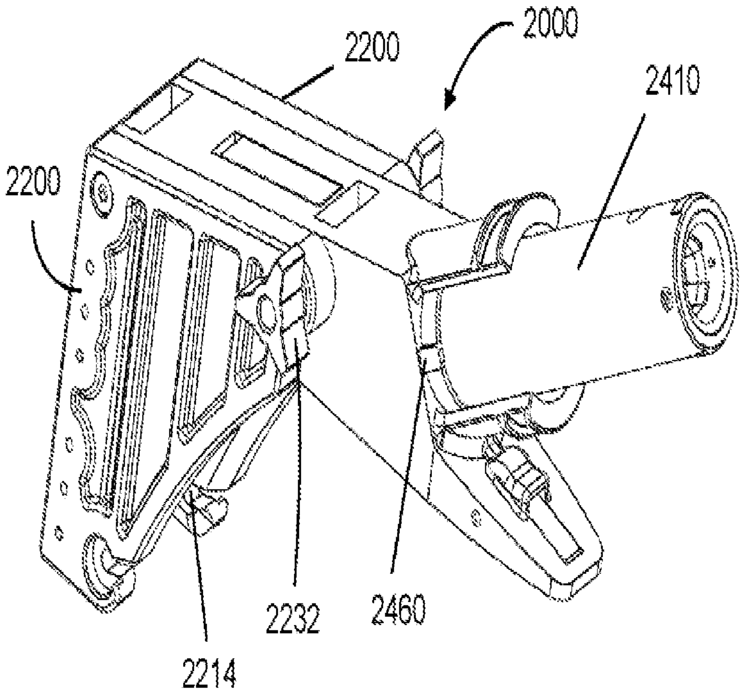
FIGS. 70A and 70B are perspective views of the adaptor showing the pivoting transformation of a wing from a tandem wing relationship to a pivoted position, respectively.
Figure 70B:
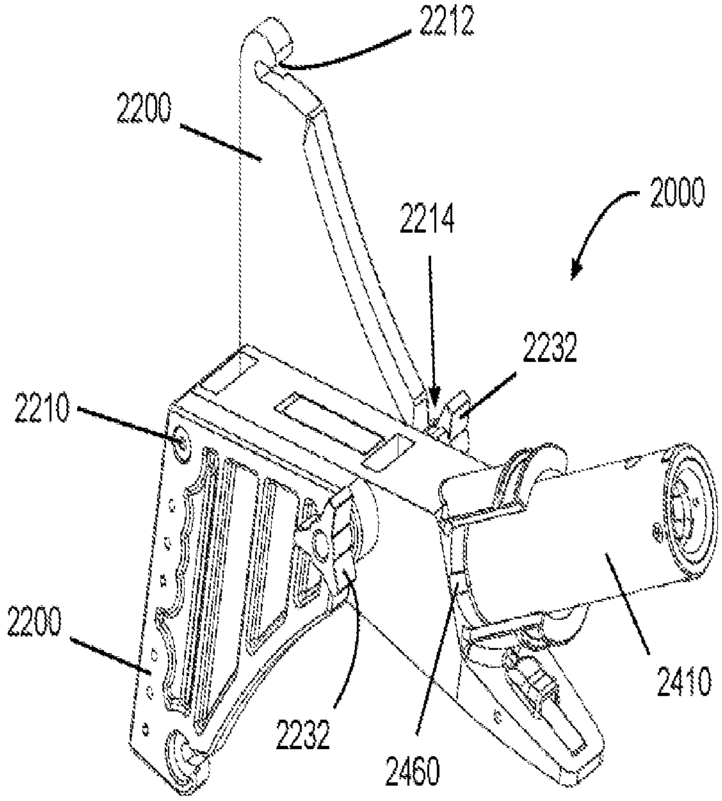
Figure 71A:
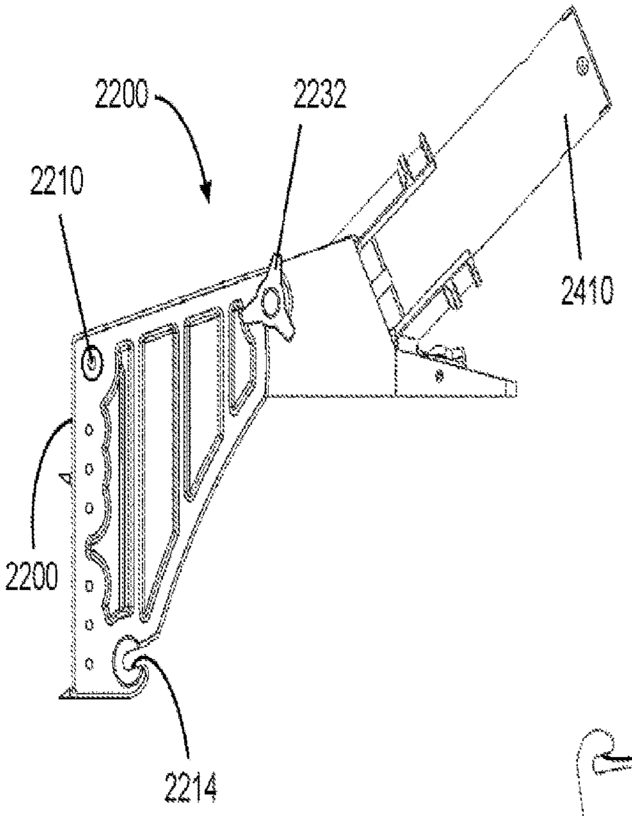
FIGS. 71A and 71B are side views of the adaptor illustrating the wing positions of FIGS. 70A and 70B, respectively.
Figure 71B:
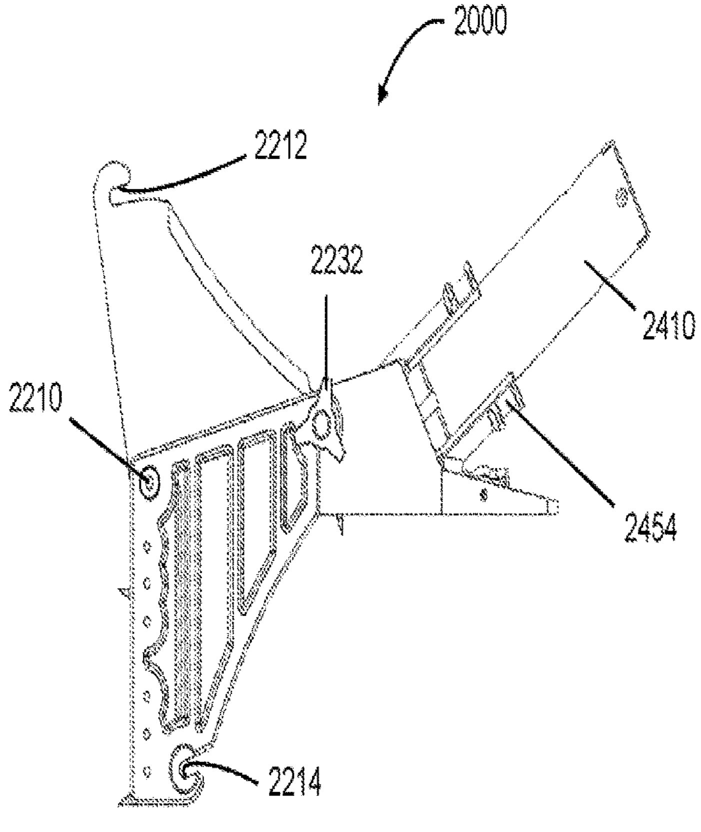

The fastener driver assembly 2010 has a distal tube portion 2020 with two notches 2030 at diametrically opposed positions at its terminus. A lever clamp 2040 is spaced from the distal end. The clamp 2040 is pivotally actuated to govern the radial position of a lock member. The distal tube portion 2030 slides over tube 2410 into slot 2454. The adaptor tube 2410 and distal tube 2020 align so that each circumferential lug 2460 is received in a distal notch 2030 (FIG. 68A). The handle of clamp 2040 is forced inwardly to secure the adaptor to the tool by the lock member engaging a detent 2470 on the tube 2410.

Figure 75A:
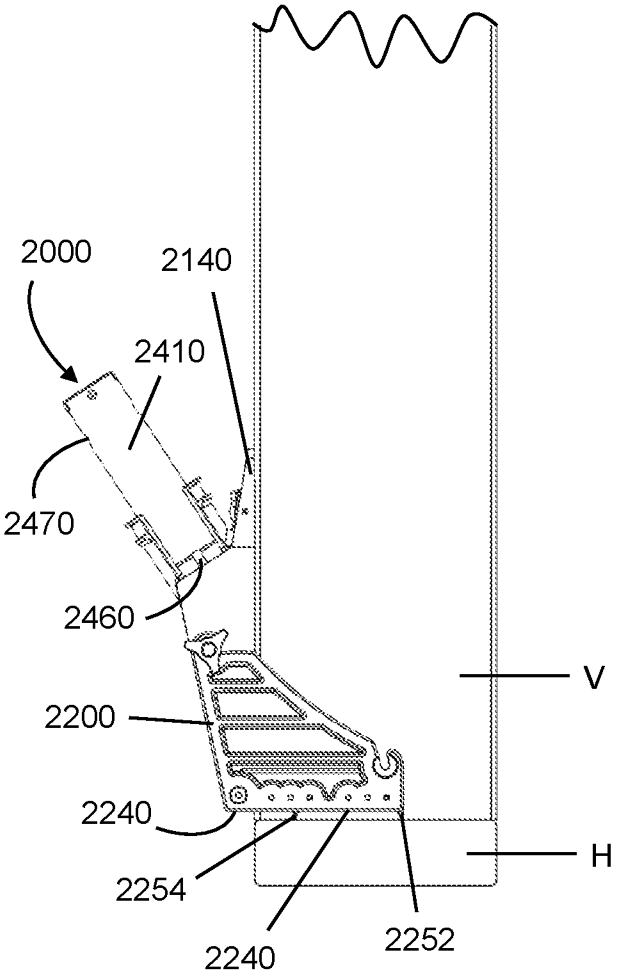
FIGS. 75A and 75B are fragmentary side views of the adaptor illustrating an adaptor installation position for a stud to bottom plate configuration from a side and a rear view, respectively.
Figure 75B:
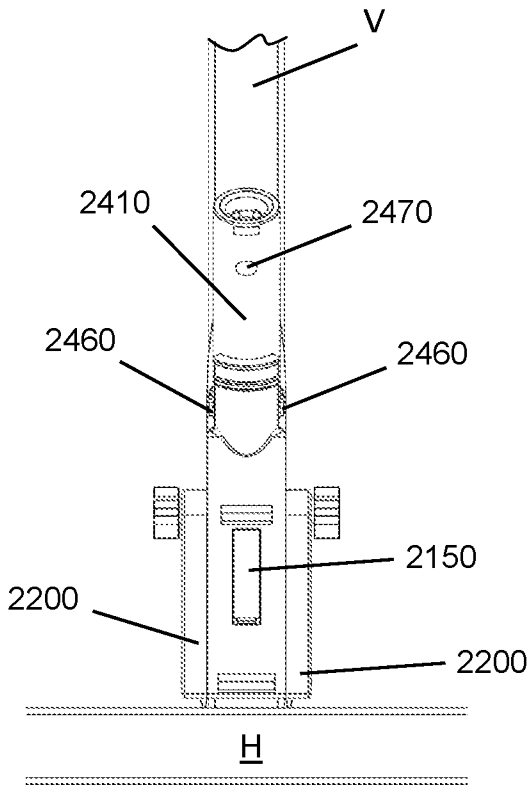

It will be appreciated that the adaptor is positioned at the selected angular position on the telescopic end of the installation tool, the lugs are captured in the notches and the clamp is locked to axially secure the adaptor to the driver assembly at the desired angular position. A fastener is then loaded in the channel 2310. The adaptor 2000 may be, for example, positioned, as indicated in FIG. 75A (the fastener driver assembly 2010 is omitted for purposes of clarity) where the claws engage the bottom rim or plate H and the wings capture the opposite sides of the vertical stud V. The reference surface 2120 of the base is moved against the edge of the stud V and the engagement edges 2240 and/or claws 2252, 2254 engage the surface of plate H. The flush indicator 2140 indicates the flush position, as best illustrated in FIGS. 75A and 75B. The installation tool with the mounted adaptor 2000 may then drive the fastener at the properly located entry position and angle to fasten the stud V to the bottom plate H.

Figure 72A:
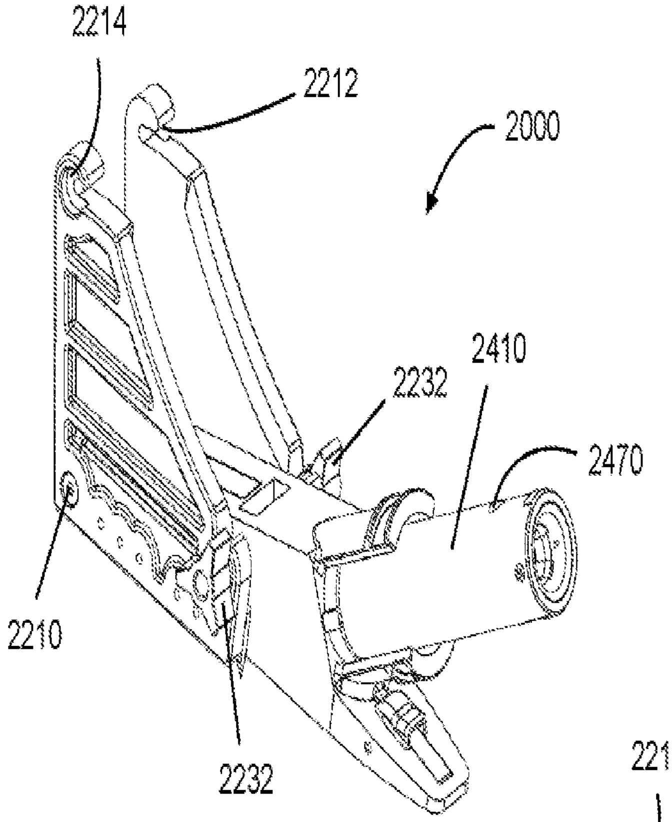
FIGS. 72A and 72B are perspective views illustrating the adaptor transformation of a wing from a tandem relationship to a pivoted position, respectively.
Figure 72B:
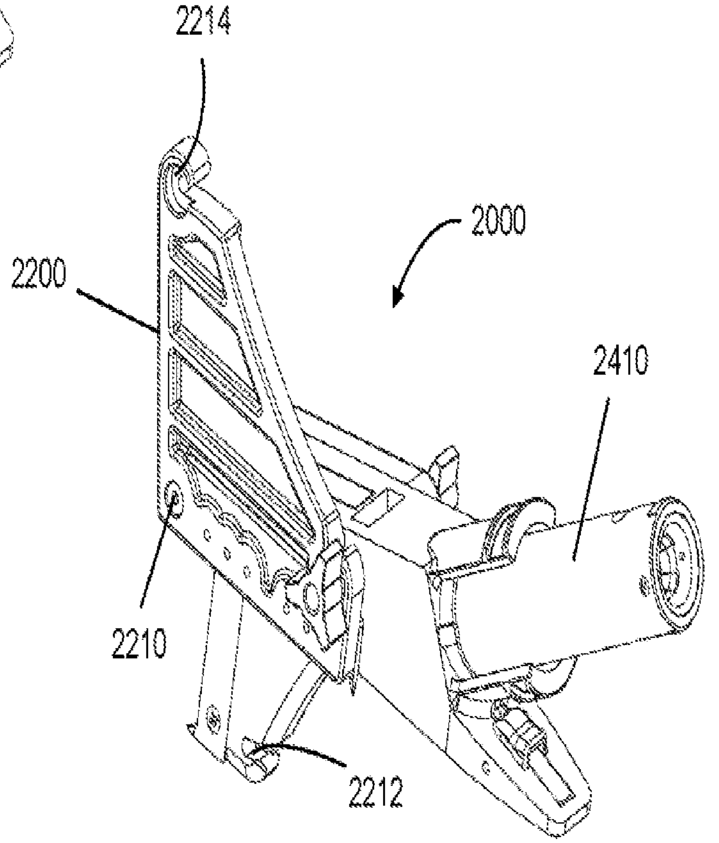
Figure 73A:
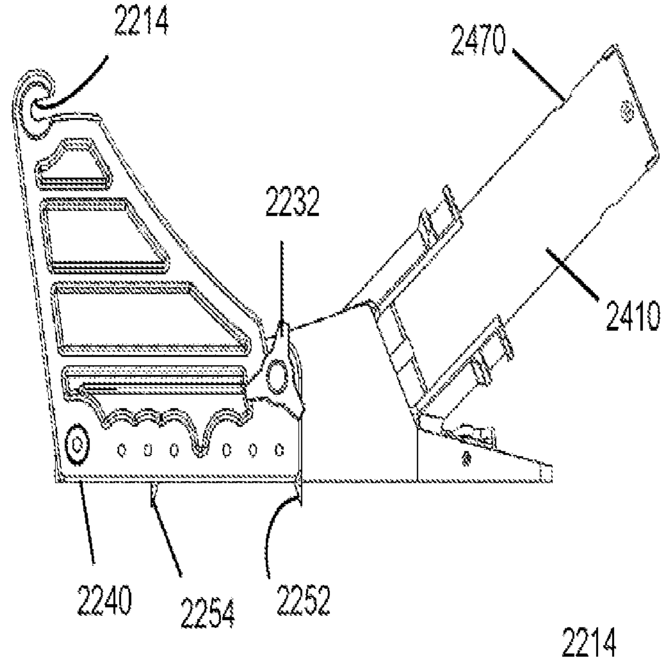
FIGS. 73A and 73B are side views of the adaptor positions illustrating the wing portions of FIGS. 72A and 72B, respectively.
Figure 73B:
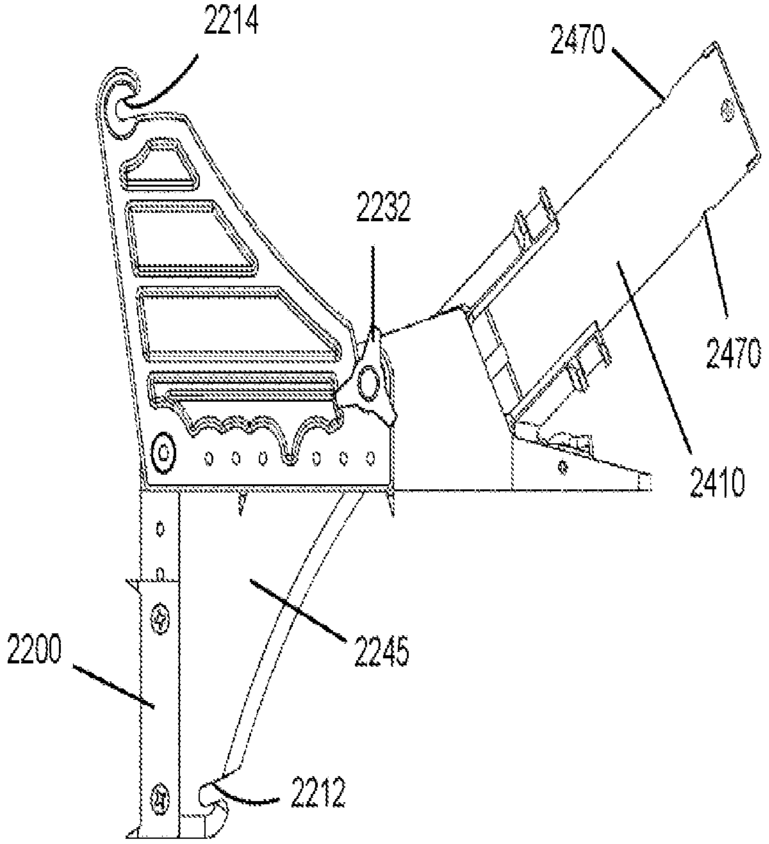
Figure 74:
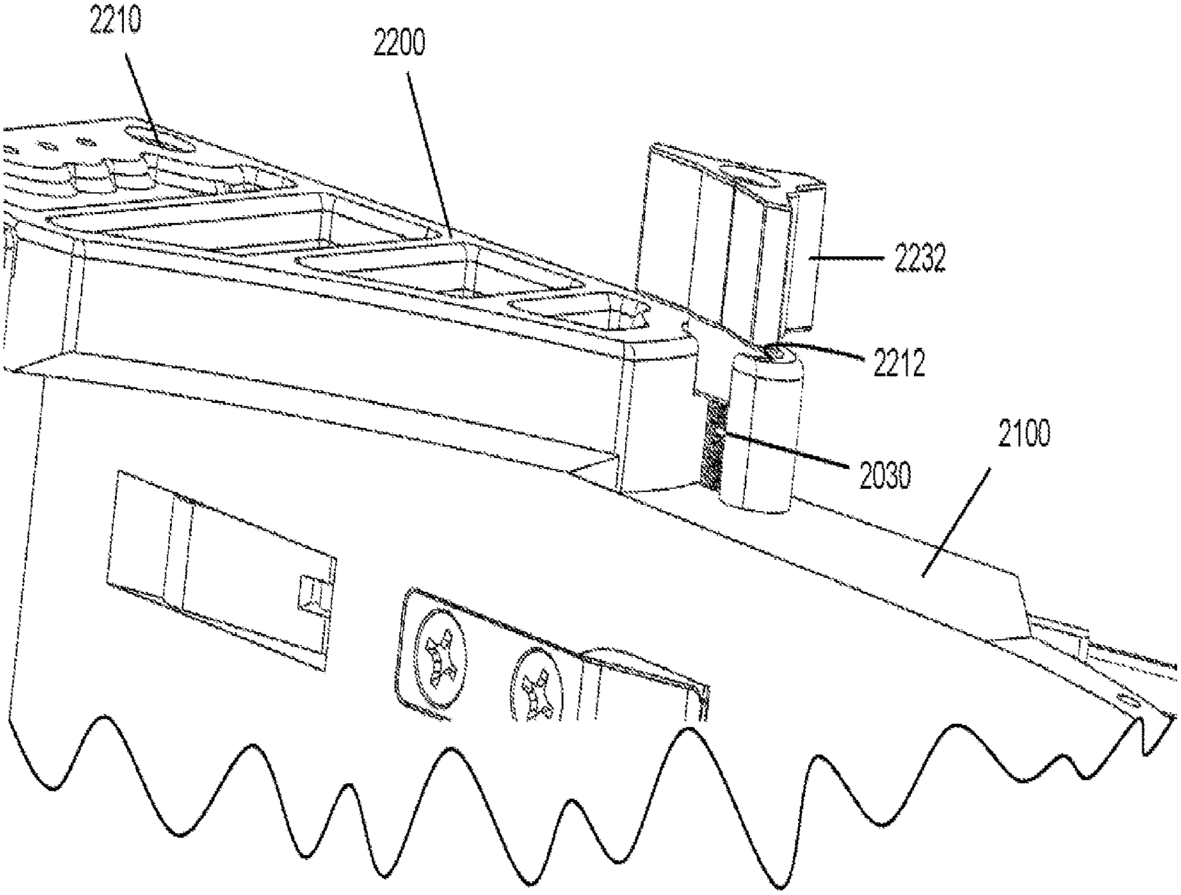
FIG. 74 is a fragmentary side perspective view illustrating how the wing pivoting is achieved and secured.

For some applications, there is an obstruction which prevents the tandem usage of the wings 2200 in positioning the adaptor for properly driving the fastener. The wings 2020 may be independently pivoted out of the way by loosening the knob 2032, pivoting the wing 2020 and then securing the previously unused access opening 2214 against the threaded pin 2230 of the knob 2232 and tightening the knob 2232, such as illustrated in and in FIGS. 70B and 71B. For this application, only a single wing is employed to install the fastener. Likewise, the opposed wing may also be pivoted out of position and secured by the opposing knob, as best illustrated in FIGS. 72B and 73B. It should be appreciated that FIGS. 70A and 70B together illustrate pivoting the wing out of the way from the normal tandem wing position of FIG. 70A. FIGS. 72A and 72B illustrate pivoting the opposed wing from the normal tandem wing position to the pivoted position for a second adaptor/driver assembly position. Accordingly, it will be appreciated that either wing 2200 may be independently pivoted, if required, to accommodate a structural obstacle.

It will thus be appreciated that the adaptor 2000 has a novel claw feature to lock the adaptor in place. The adaptor 2000 also provides two flush indicators to readily indicate that the proper flush position for the adaptor has been achieved. The adaptor 2000 functions to angularly pivot and be secured in position on the distal tube portion of the driver assembly to provide the optimal driving position and angle for both the top plate and the bottom plate fastener connection. The adaptor 2000 also functions to provide a feature for retaining a loaded fastener within the adaptor by means of a pair of magnets. In addition, the adaptor 2000 is highly versatile in that, if required, either wing 2200 may be independently pivotally retracted and secured to accommodate obstacles wherein the tandem wing arrangement cannot be employed.

Figure 85A:
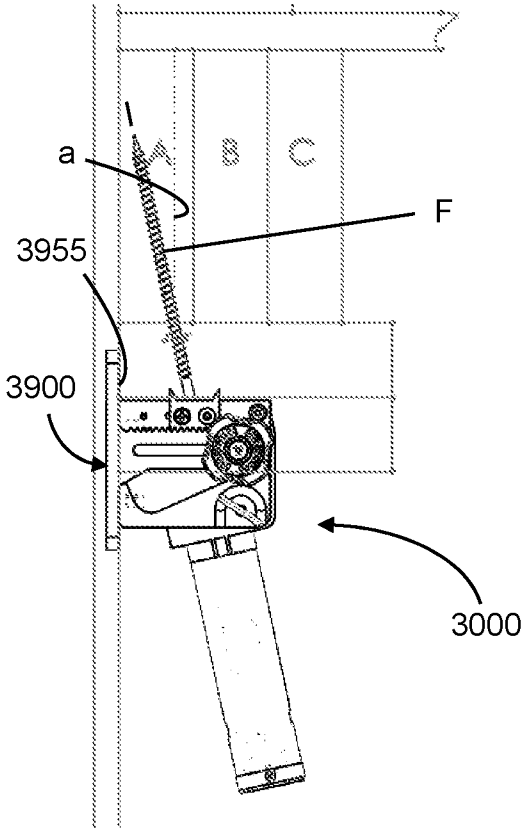
FIGS. 85A and 85B are side elevational views of the adaptor of FIG. 76 illustrating a fastener installation shown in section in a representative application for an overhead external rim board connection.
Figures 88A, 88B:
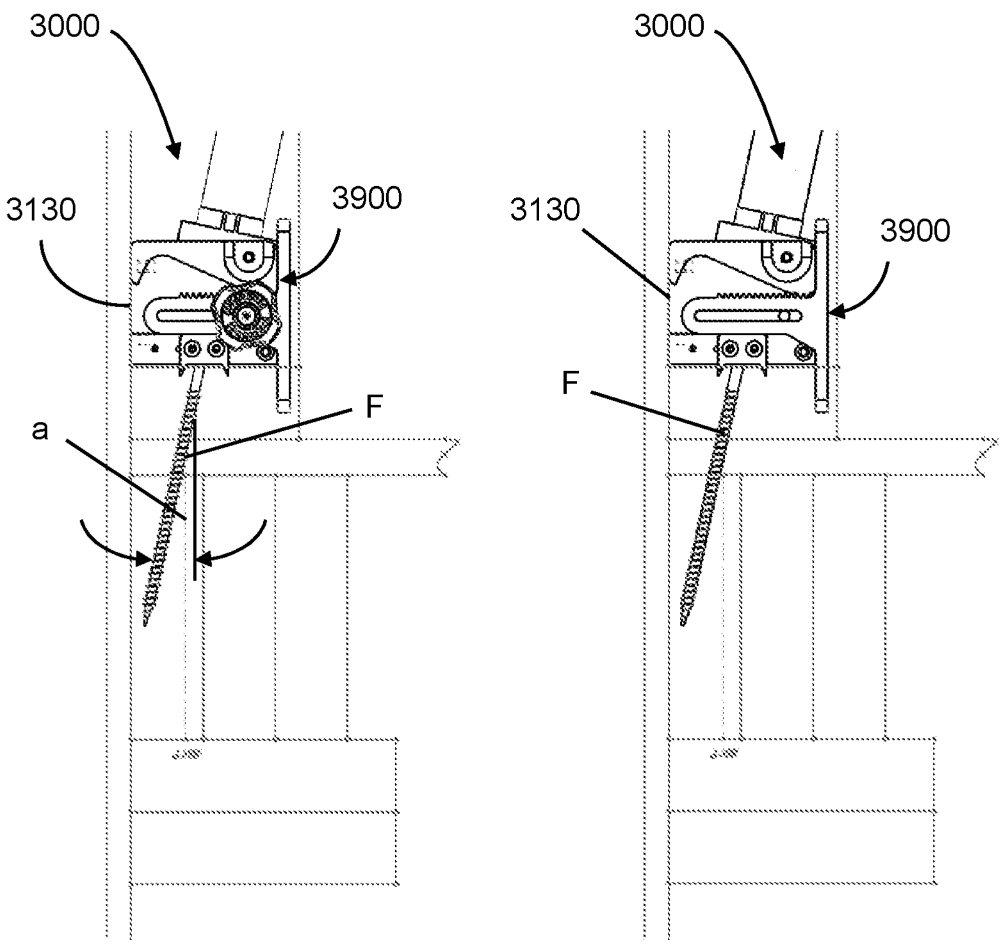
FIGS. 88A and 88B are side elevational views of the adaptor of FIG. 76 illustrating a fastener installation shown in section connecting a member to a lower external rim board.
Figure 89A:
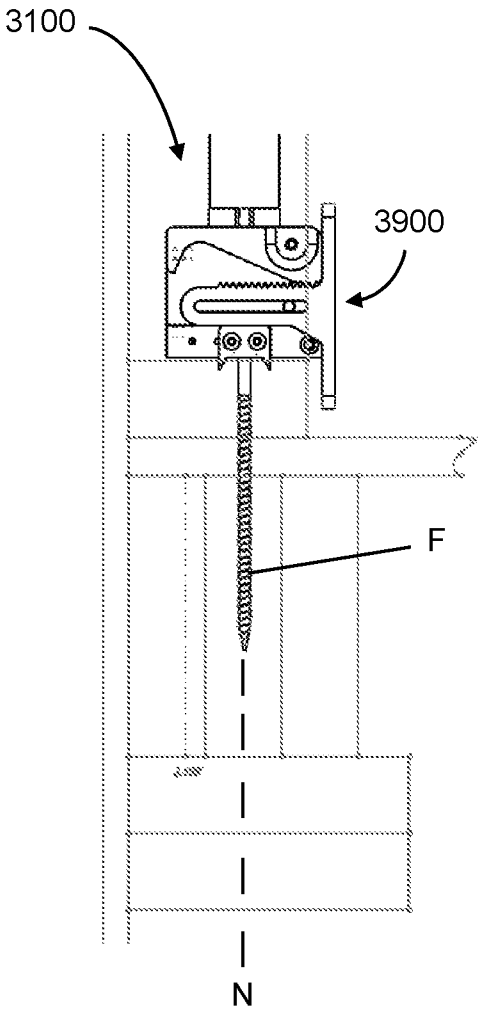
FIGS. 89A and 89B are side elevational views of the adaptor of FIG. 76 in a second entry angle mode and illustrating a fastener installation shown in section connecting a stud with an underlying member.

With reference to FIGS. 76-89B, a convertible multiple entry angle adaptor with a position locator for a fastener installation tool is generally designated by the numeral 3000. The adaptor 3000 functions to provide the proper entry angle and location for driving a fastener for various structural connections, for example, to connect a horizontal member, such as a top plate or a bottom plate with an external rim board A, as illustrated in FIGS. 85A and 88A, or to provide a vertical connection through a horizontal member to an adjacent support member, truss or stud B or C, as illustrated in FIGS. 86A and 89A.

The adaptor 3000 principally comprises a head 3100, a pivotally mounted convertible angle guide 3500 and a pivotally mounted and transformable locator 3900. The adaptor 3000 mounts to the end of a fastener/driver assembly 2010 having a telescopic tube assembly with a distal tube 2020. The adaptor and distal tube are configured so that the adaptor 3000 is mounted to the tube assembly at a fixed angular position about the central drive axis of the tube assembly. The multiple angle feature is accomplished by a manual position adjustment of a pivotal angle guide 3500, as will be described below. An optimum fastener entry location for certain structural configurations is provided by a variably positionable locator 3900 mounted to the guide 3500, as will be described below.

The head 3100 has a planar reference surface 3110 (top depicted in FIG. 76) which defines a fastener opening 3120. The fastener opening 3120 preferably functions both as a fastener receiver opening and a fastener discharge opening. The head has a generally multifaceted structure defined by a front 3130 and laterally opposed parallel sides 3140 and 3150 and a rear 3160.

Figure 80:
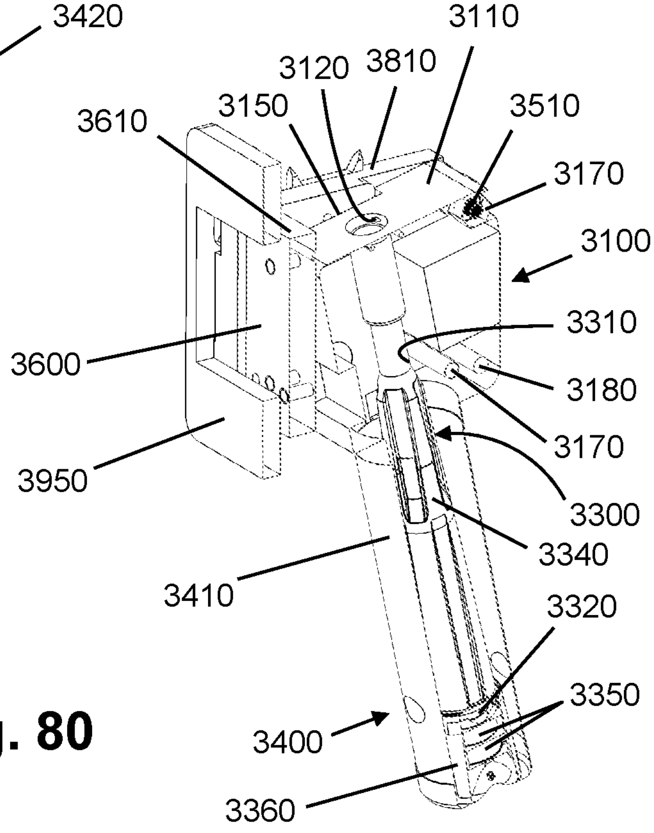
FIG. 80 is a sectional view taken of the adaptor as shown in FIG. 79.
Figure 81:
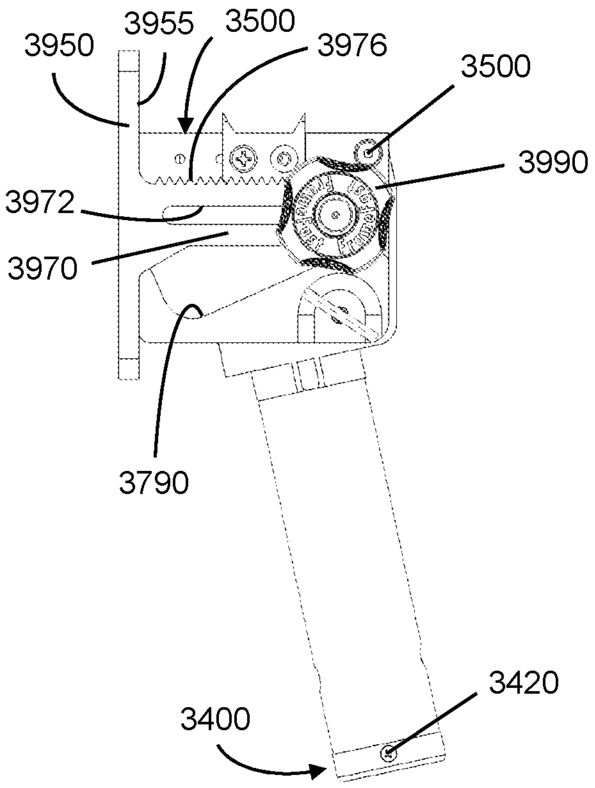
FIG. 81 is a side elevational view of the adaptor of FIG. 76.
Figure 82:
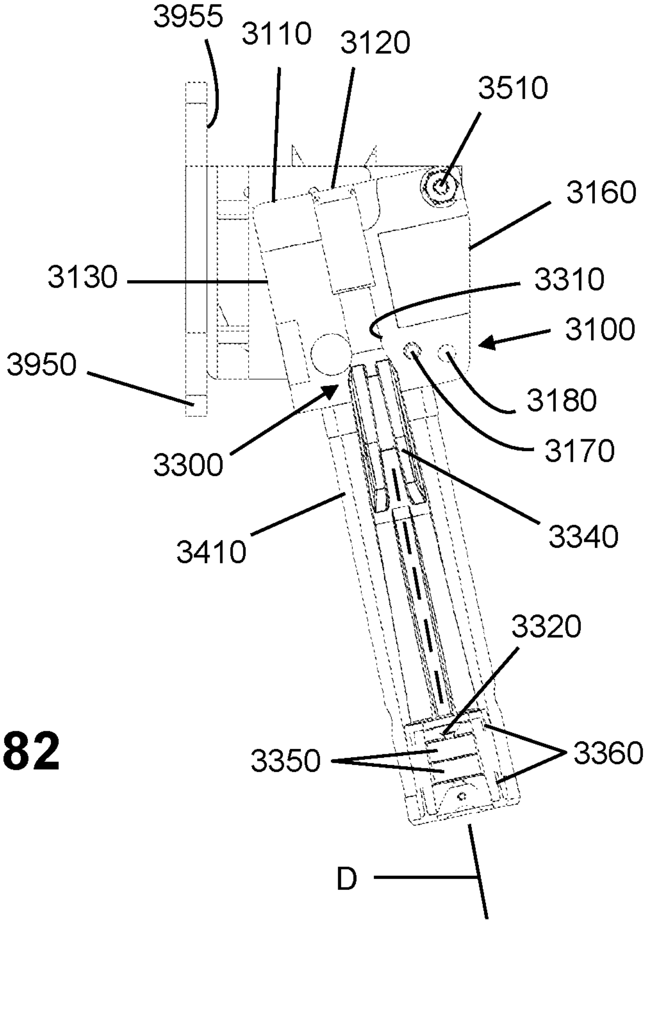
FIG. 82 is a central sectional view of the adaptor as shown in FIG. 81.
Figure 83:
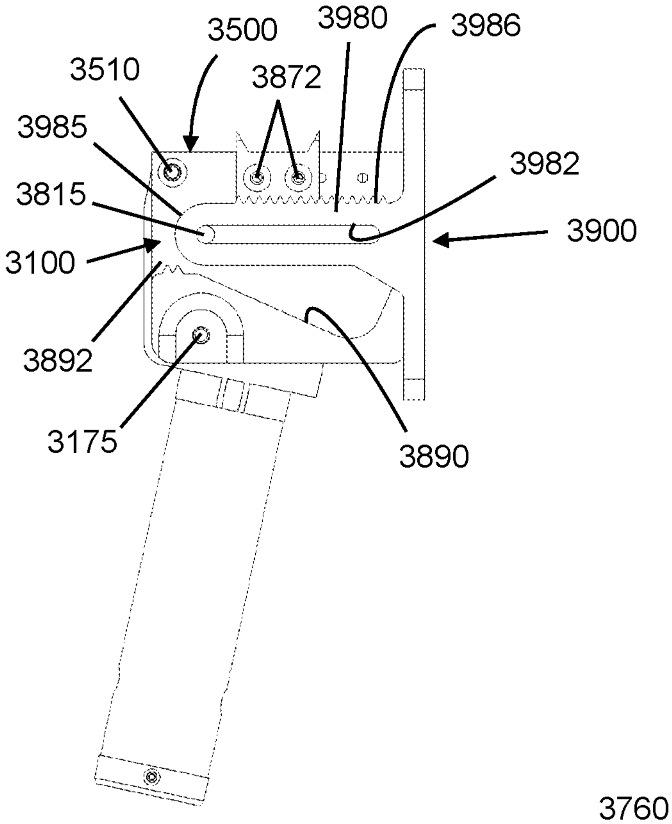
FIG. 83 is an opposite side elevational view of the adaptor as shown in FIG. 81.
Figure 84:
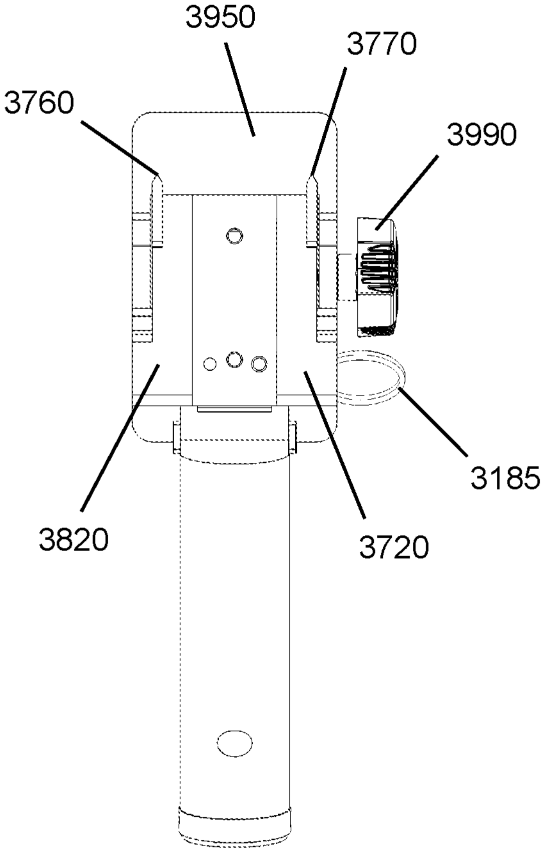
FIG. 84 is a front elevational view of the adaptor as shown in FIG. 81.

With additional reference to FIGS. 80 and 82, the head 3100 connects with a fastener receiver assembly 3300 that has a segmented tubular structure which at least partially defines a fastener channel 3310 for a received fastener F. The channel extends to opening 3120 and is disposed orthogonally with respect to reference surface 3110 of the head. A conical or quasi-conical funnel-like guide 3320 is mounted at a lower portion of the receiver assembly to center the received fastener F so that the driver bit or coupler from the driver tool properly engages the fastener head H. The upper portion of the tube assembly also includes a segmented guide sleeve 3340 so that the fastener will be uni-directionally driven without wobble into the member or members.

A pair of wraparound magnets 3350 is secured by cooperative engaged prong plugs 3360 at the driver coupling end of the tube. The magnets 3350 function so that a received fastener is initially retained within the adaptor 3000 and does not slide out through the opening 3120 prior to being driven by the driver.

A connector assembly 3400 extends from a tubular portion to receive and/or connect with the distal end of the telescopic tube assembly of the installation tool. The connector assembly preferably employs the tube 3410 which encloses a portion of the receiver assembly 3300 and extends coaxially with the channel 3310, and one or more screws and/or a circumferential clamp. In the illustrated connector, a connector screw 3420 extends through the connector portion to connect the adaptor at a fixed angular position relative to the end of the telescopic tube assembly. Other connection configurations are possible.

An angle guide 3500, which ultimately defines the fastener entry angle, is pivotally mounted to the head by a pivot pin 3510. Pin 3510 extends through a lateral opening 3170 of the head at opposed sides of the angle guide 3500. The guide has a three-sided rectilinear form, including a frontal end reference panel 3600 and perpendicular laterally opposed panels 3700 and 3800. The panels 3600, 3700 and 3800 form a pivotal shield-like enclosure which surrounds the head in a quasi-complementary fashion, but allows for pivoting relative to the head and specifically reference surface 3110, as will be described below. The outer and inner surfaces of panels 3700 and 3800 are configured to facilitate pivoting relative to the head 3100 and selective positioning of the locator 3900, as described below.

The respective edges 3610, 3710 and 3810 (upper edges in the orientation of FIGS. 76-84) of the panels form coplanar surfaces for the adaptor which together constitutes an entry angle reference structure. For some embodiments, the entry angle reference is formed by coplanar edges 3710 and 3810 only. The top of the head 3110, which surrounds the opening 3120, is generally planar, and in one pivotal position mode (which defines a 90° or normal entry angle), is preferably substantially coplanar with the edges 3710 and 3810. The outer side portions of panels 3700 and 3800, respectively, form a contoured cam-like abutment 3790, 3890 rearwardly terminating a serrated segment 3792, 3892 which interact with locator 3900, as further described below. Forward edges 3720 and 3820 of panels 3700 and 3800 define orthogonal coplanar reference strips which provide a vertical frontal position guide, as described below.

Figure 76:
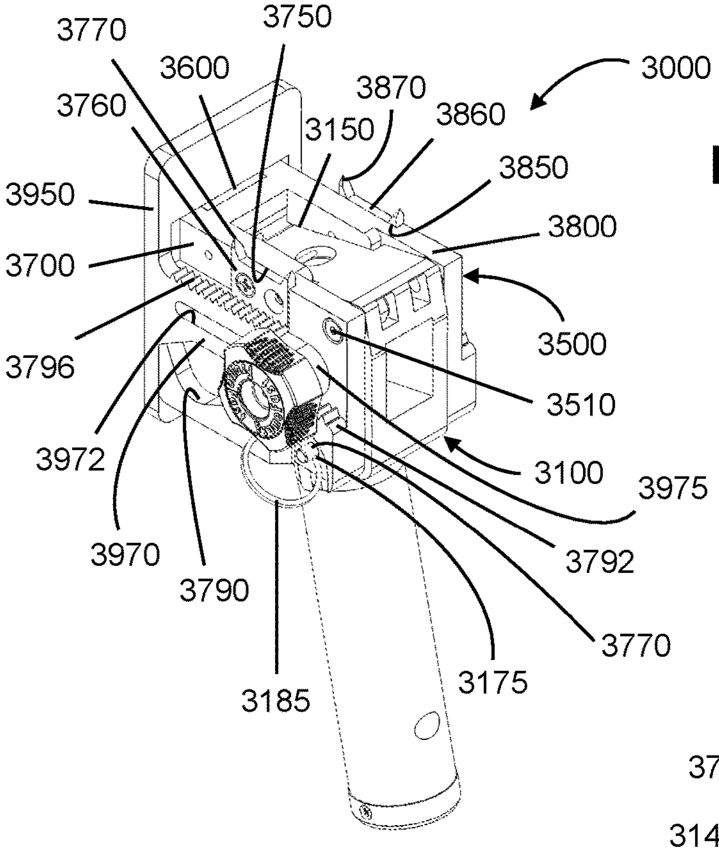
FIG. 76 is a perspective view of a multiple entry angle adaptor with a locator for a fastener installation tool.
Figure 77:
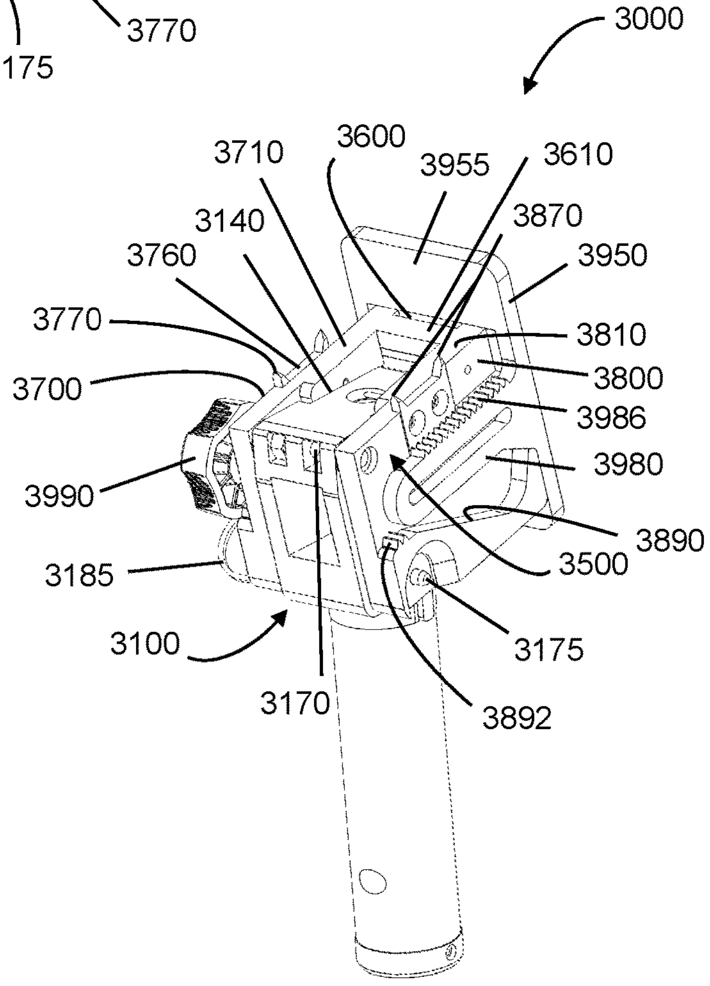
FIG. 77 is a second perspective view of the adaptor of FIG. 76.
Figure 78:
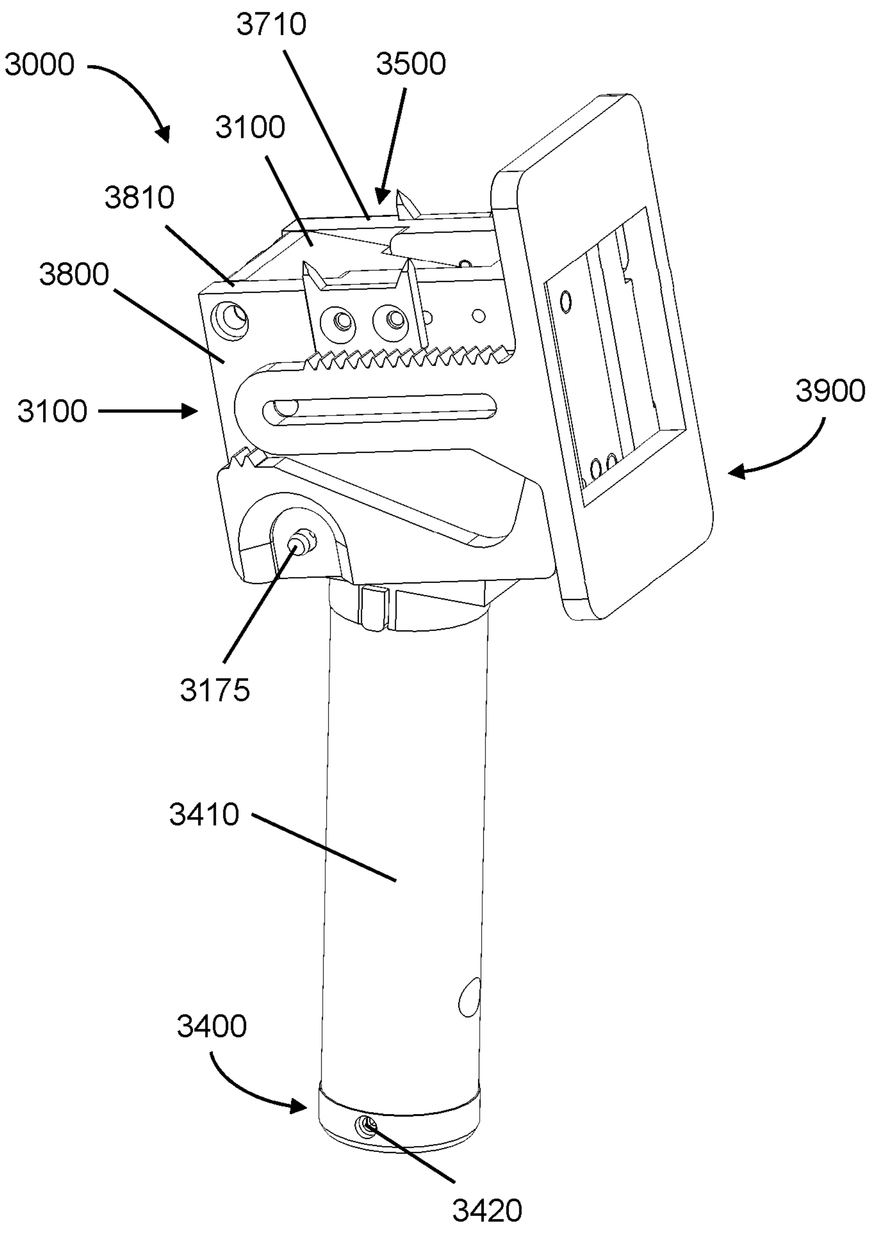
FIG. 78 is a third perspective view of the adaptor of FIG. 76.
Figure 79:
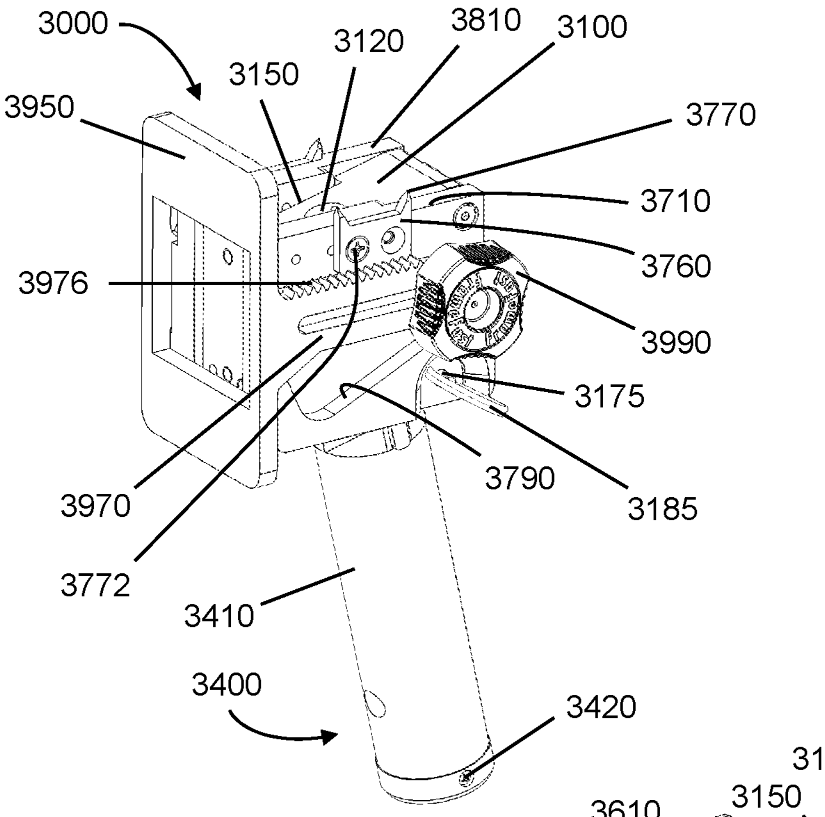
FIG. 79 is a fourth perspective view of the adaptor of FIG. 76.

In a first pivotal position mode of the guide relative to the head 3100, as best illustrated in FIGS. 76, 77 and 82, a pin 3175 extends through an opening 3770 of the panel 3700 and through an opening 3170 (FIG. 80) in the head to fix the angle of the angle guide relative to the head and the drive axis of the adaptor. The central drive axis D is preferably approximately 12° from the normal N to the reference edges. The head includes a second opening 3180. In the illustrated preferred embodiment, when the pin 3175 is received in opening 3180, the reference surface 3110 and the reference edges 3710, 3810 are parallel or coplanar and the entry angle is 90° or normal N to the member upon engagement against the member. See FIGS. 85A-89B. The pin 3175 has a ring 3185 to facilitate removal and insertion.

Alternatively, additional openings may be located in the head to provide for additional entry angles. It should also be appreciated that a single opening may be provided in the head and multiple aligned openings in the panels 3700 and 3800 to pivotally fix the guide assembly relative to the head and specifically reference surface 3110 and thereby define multiple entry angles.

A slidably and pivotally positionable bracket-like locator 3900 is selectively positionable to ensure the proper fastener entry location for certain structural configurations. Locator bracket 3550 has a frontal frame 3950 with a central window 3952. The obverse surface 3955 of the frame functions as a reference position guide and stabilizer. A pair of laterally spaced arms 3970 and 3980 project rearwardly. The arms 3970 and 3980 are perpendicular relative to the medial portion of the frame 3960. The arms 3970 and 3980 have rounded ends 3975 and 3985. The ends 3975 and 3985 are somewhat complementary to portions of abutments 3790 and 3890 which interact in cam-like fashion when the locator is repositioned, as described below.

The arms 3970 and 3980 each have an elongated slot 3972 and 3982, respectively, which functions as a guide for positioning and pivoting the locator 3900. Pins 3715 and 3815 project at opposing sides of the panels 3700 and 3800. Each pin is received in a corresponding slot so that the locator may slide along the pin and axially may pivot upwardly and rearwardly during the transformation of the locator 3900 from a frontal (FIG. 85A) to a rearward position. A knob 3990 is threaded to the panel through the slot and is tightenable against arm 3570 to secure the locator 3900 in a fixedly locked position. The knob 3990 may contain recesses and serrations to facilitate tightening the knob.

The upper edge of each bracket arm has a series of serrations 3976, 3986. The side panels 3700 and 3800 each include a protruding portion forming the abutments or cams 3790 and 3890. Each cam is contoured and positioned to engage the rounded ends 3975, 3985 of the arms. The protruding portion at its opposite terminus has a plurality of serrations 3792 and 3892 which are respectively engageable by the serrations 3976 and 3986 of the locator to fixedly engage the locator in a stable fixed transverse position when the frame 3950/reference surface 3955 is positioned at the rear of the head (see FIGS. 86B, 87B).

The panels 3700 and 3800 include recess portions 3750 and 3850 adjacent the reference edges 3710 and 3810. Plates 3760 and 3860, which mount a pair of claws 3770 and 3870, are secured at opposed sides of the panels by screws 3772 and 3872. The claws project upwardly from the reference edges and provide a secure engagement into the structure (horizontal member in preferred applications) to provide a stable positioning of the adaptor 3000 as the fastener is driven.

With reference to FIGS. 85A-89B, the adaptor 3000 may be configured and positioned to drive a fastener F at a proper entry angle and location for various structural configurations. For FIGS. 85B, 86B, 87B, 88B and 89B, the knob 3990 has been removed so that the position of the pin 3715 in the slot 3972 and the serrations 3792/serrations 3976 engagement can be illustrated. For FIGS. 85A, 85B, 87A, 88A and 88B, the angle guide 3500 is in the first angular mode which essentially functions to define an acute entry angle of 12° to the normal for the preferred embodiment. The locator 3900 is at a first position in FIGS. 85A and 85B for connecting with an overhead external rim board and at a second position illustrated in FIGS. 88A and 88B for providing a lower external rim board connection.

For the installations illustrated in FIGS. 86A, 86B, 87A, 87B, 89A and 89B, the angle guide is at a second pivotal position (the pin 3175 is withdrawn from slot 3170 and reinserted into slot 3180) so that the reference edges 3710, 3810 are coplanar with the top surface 3110 of the head. In this configuration, a normal or vertical connection is provided with the proper entry angle and location. For the overhead installation, the locator 3900 has been repositioned so that the reference surface 3955 engages a vertical edge of the top plate to provide the proper location and also to stabilize the fastener/driver assembly. It should be noted that the angle surfaces 3720 and 3820 function as a guide reference surface for the connection of FIGS. 88A and 88B.

Figure 85B:
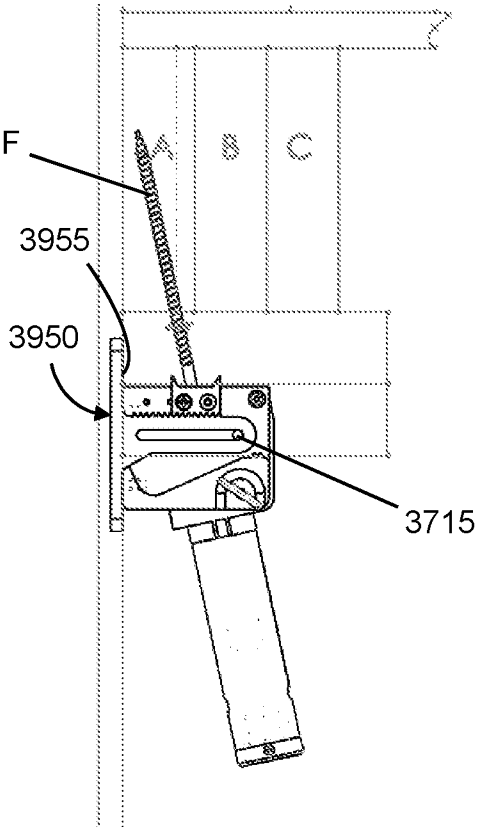
Figure 86A:
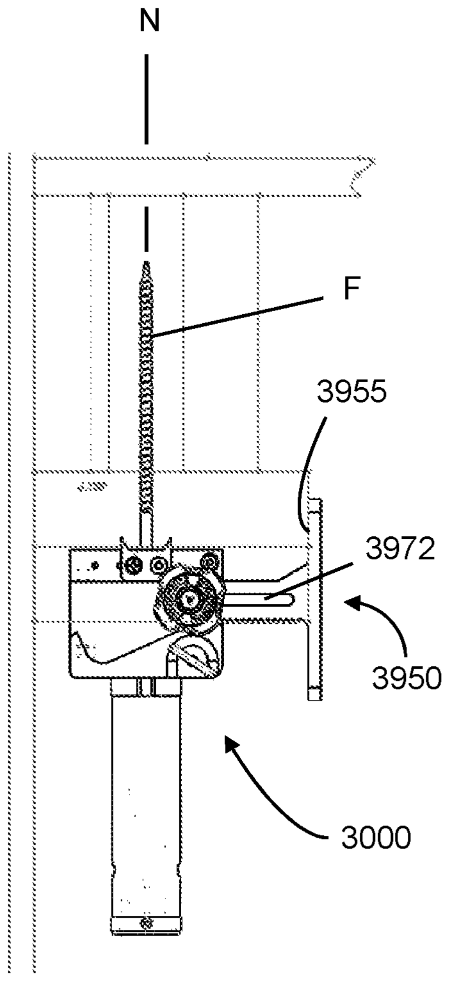
FIGS. 86A and 86B are side elevational views of the adaptor of FIG. 76 in a second entry angle mode and further illustrating a fastener installation shown in section connecting a header to an overhead member.
Figure 86B:
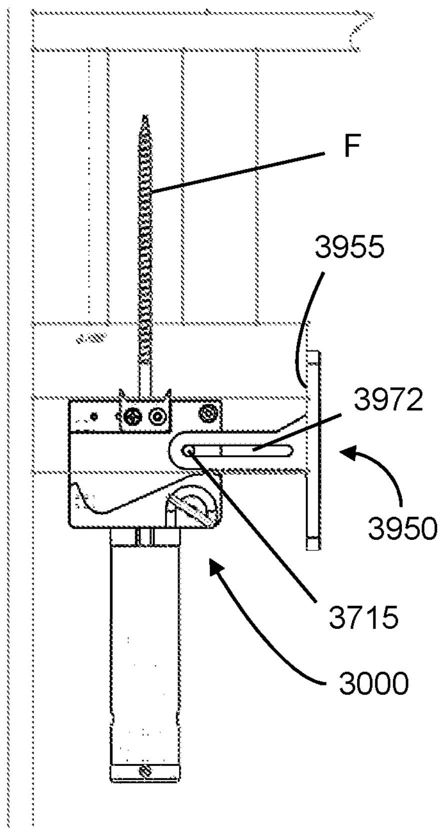
Figure 87A:
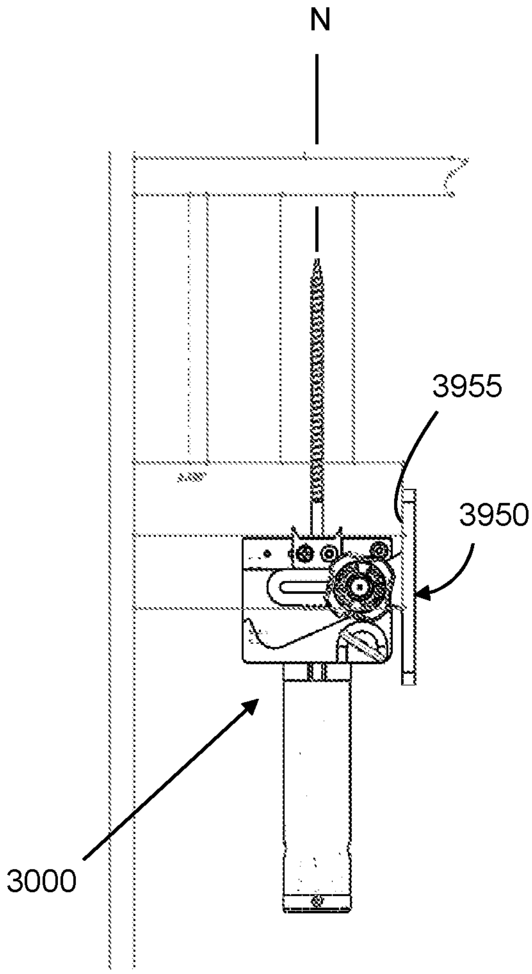
FIGS. 87A and 87B are side elevational views of the adaptor of FIG. 76 in a second entry angle mode and further illustrating a fastener connector shown in section connecting a header to another overhead member.
Figure 87B:
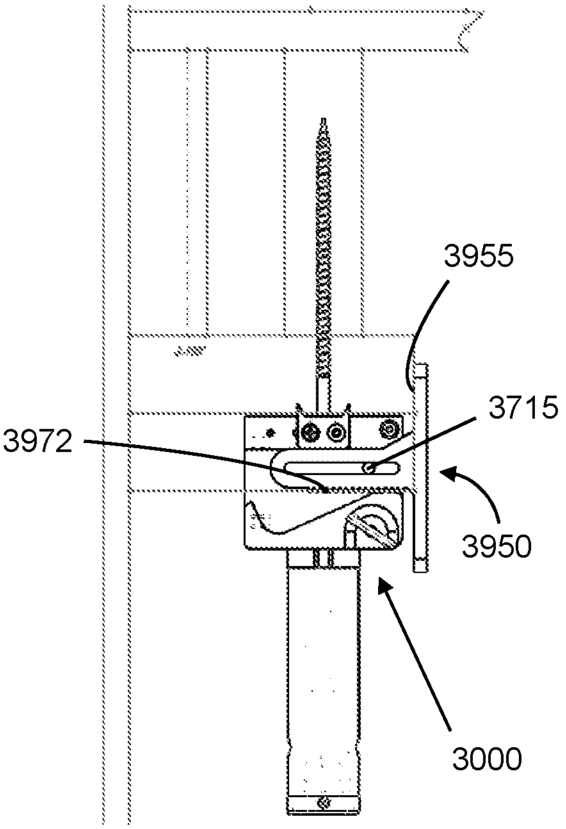

The locator 3900 is transformable from the position illustrated in FIGS. 85A and 85B for providing the proper entry angle for an external rim board A to the bracket position of FIGS. 86A and 86B which engages the edge of a top plate or header for providing a normal entry angle into a medial board B to a third lateral position as illustrated in FIGS. 87A and 87B wherein the proper entry angle for an entry into a third board C is positioned at the medial location. The position of pin 3715 in slot 3972 is different for FIGS. 86B and 87B.

With reference to FIGS. 88A and 88B, the locator 3900 is positioned in a location against the rear of the head and surfaces 3720 and 3820 engage a vertical member and the guide is positioned at the first entry angle position so that a proper entry angle into a lower rim board may be obtained. The front of the guide functions as a reference positioner.

Figure 89B:
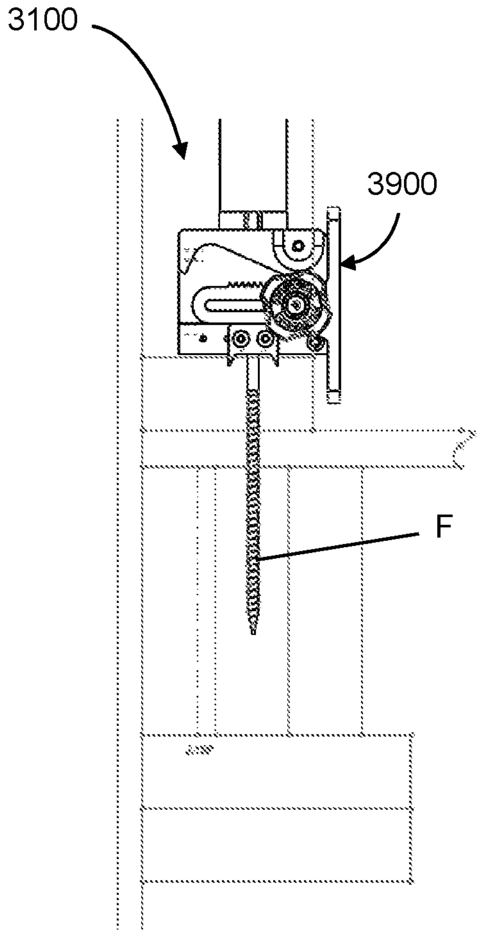

As best illustrated in FIGS. 89A and 89B, the normal angle for lower board at a proper location is illustrated. The position of the locator 3900 is transformable to a rear position, but does not function to provide a guide and stabilizer for the fastener installation and the illustrated structural configuration.

Figure 98:
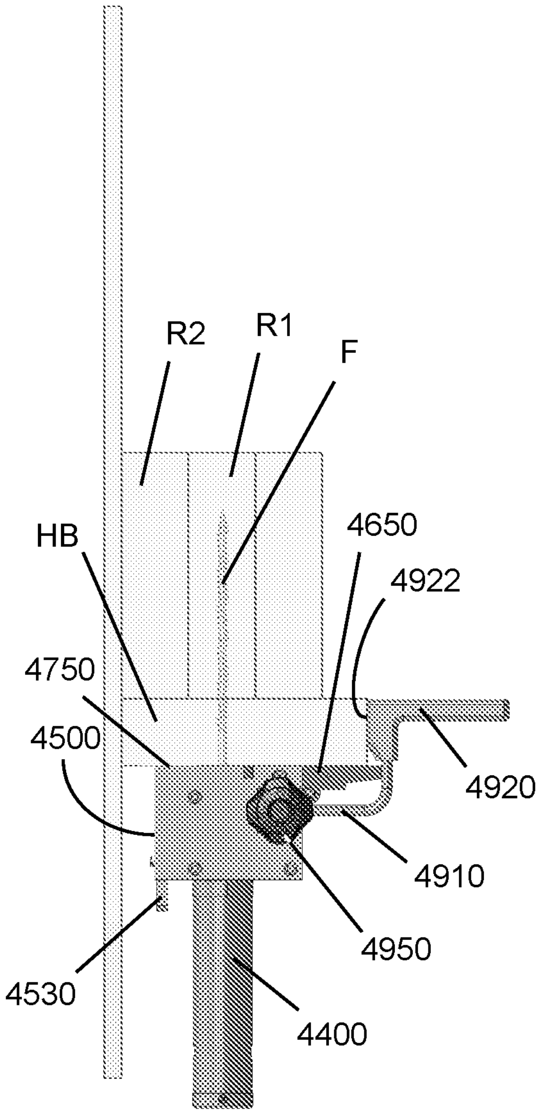
FIG. 98 is a side elevational view of the multiple entry angle adaptor of FIG. 90 in the first entry angle mode and illustrating a fastener installation shown in a section connecting a header to a rim board.
Figure 99:
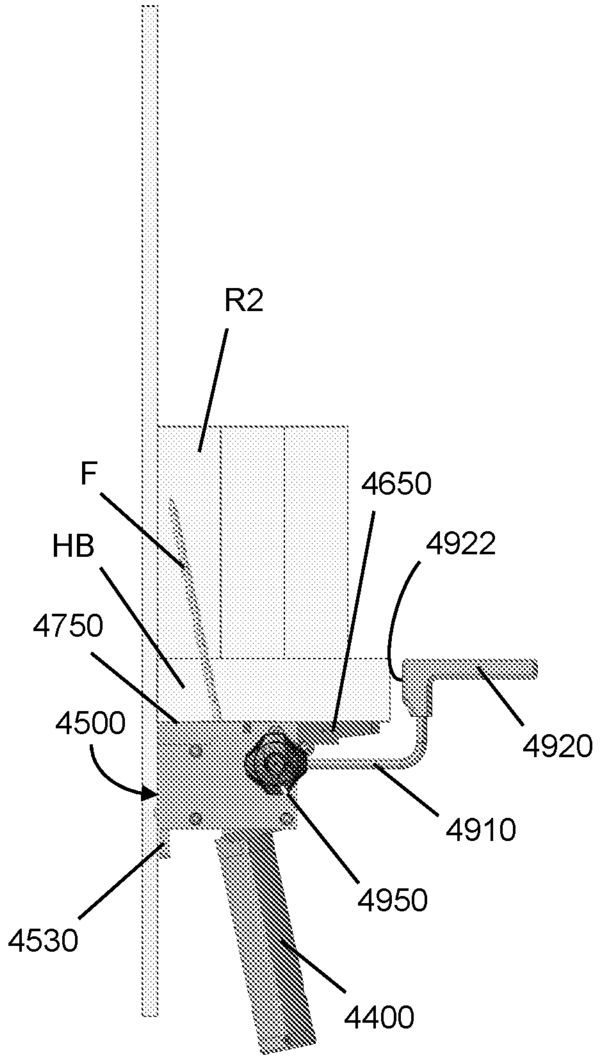
FIG. 99 is a side elevational view of the multiple entry angle adaptor in the second entry angle mode of FIG. 96 and further illustrating a fastener installation shown in connecting a header to another rim board.

With reference to FIGS. 90-99, a convertible multiple entry angle adaptor with a position locator for a fastener installation tool is generally designated by the numeral 4000. The adaptor 4000 functions to provide the proper entry angle and location for driving a fastener F for various structural connections preferably, for example, to connect a horizontal member, such as a horizontal beam HB with an overhead rim board R1, R2, as illustrated in FIGS. 98 and 99. Upon mounting to the installation tool, the adaptor 4000 provides an overhead beam/rim board fastening system which can be precisely implemented without a ladder and also facilitates numerous other structural connections.

The adaptor 4000 principally comprises a head 4100, a pivotally mounted convertible angle guide module 4500 and a removably mounted and transformable position locator 4900. The adaptor 4000 mounts to the end of a fastener/driver assembly 2010 having a telescopic tube assembly with a distal tube 2020. The adaptor and distal tube are configured so that the adaptor 4000 is mounted to the tube assembly at a fixed angular position about the central drive axis of the tube assembly. The multiple entry angle feature is accomplished by a manual adjustment of the pivotal angle guide module 4500, as will be described below. An optimum fastener entry location for certain structural configurations is facilitated by the variably positionable locator 4900 mounted to the guide 4500, as will be described below.

The head 4100 has a planar reference surface 4110 (top depicted in FIGS. 90-95) which defines a fastener opening 4120. The fastener opening 4120 preferably functions both as a fastener receiver opening and a fastener discharge opening. The head has a generally multifaceted structure including a rear 4130 and laterally opposed parallel sides 4140 and 4150 and a front 4160. It will be appreciated that the terms "top", "bottom", "front", "rear" and "side" are arbitrary and are employed for descriptive and explanatory purposes.

Figure 92:
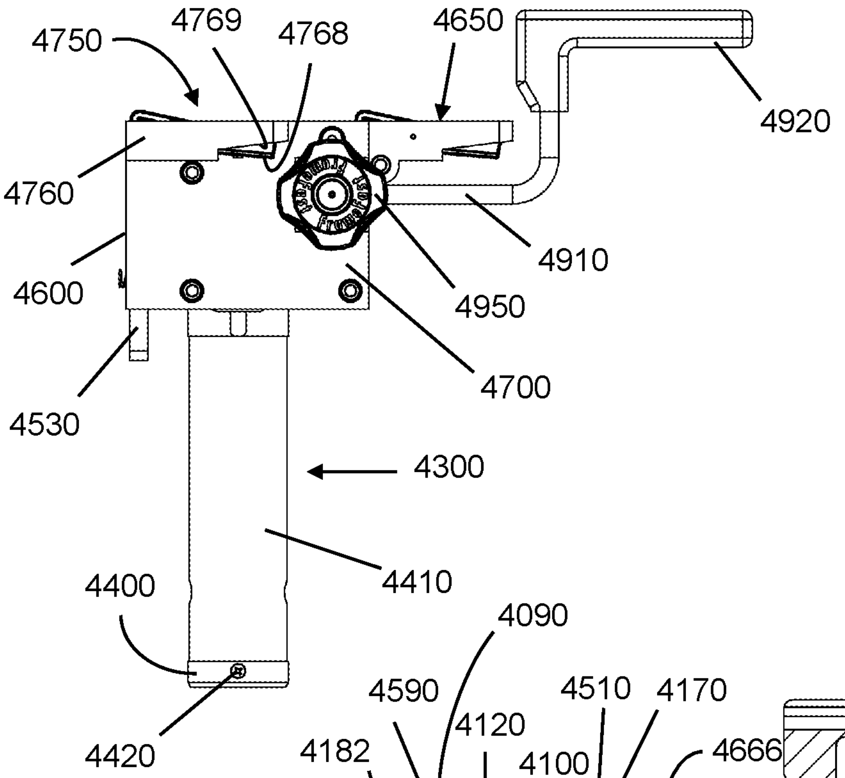
FIG. 92 is a side view, portions removed, of the multiple entry angle adaptor of FIG. 90.
Figure 93:
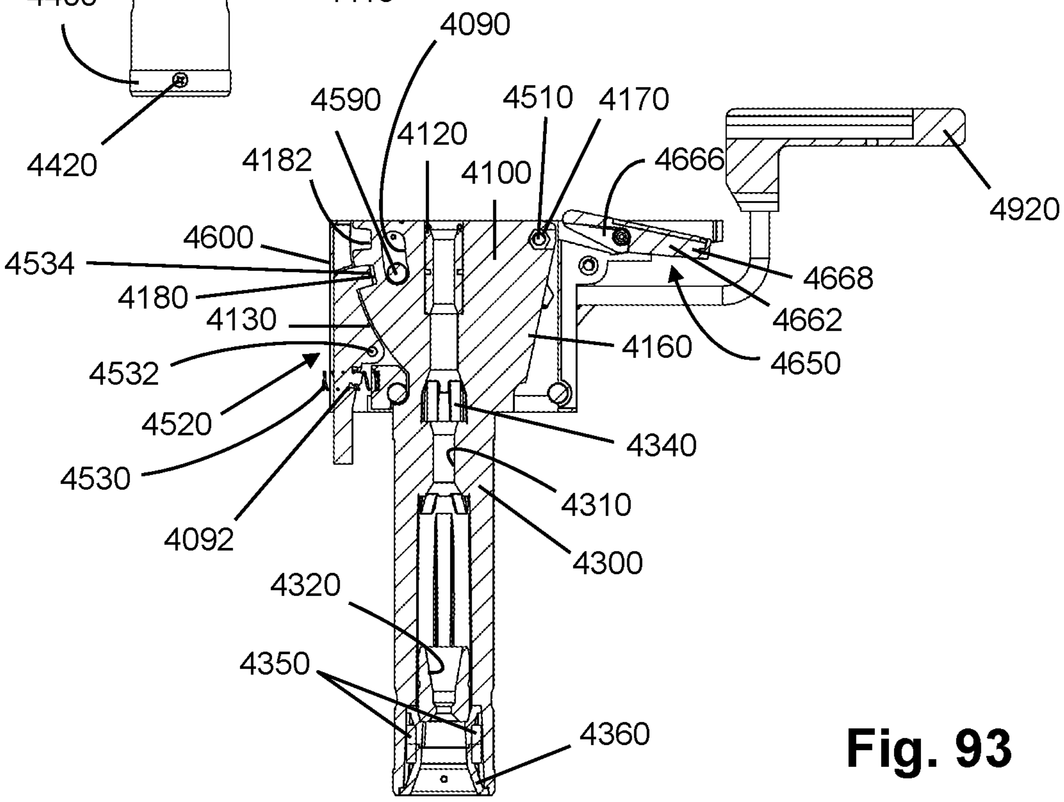
FIG. 93 is a side sectional view of the multiple entry angle adaptor of FIG. 92.
Figure 94:
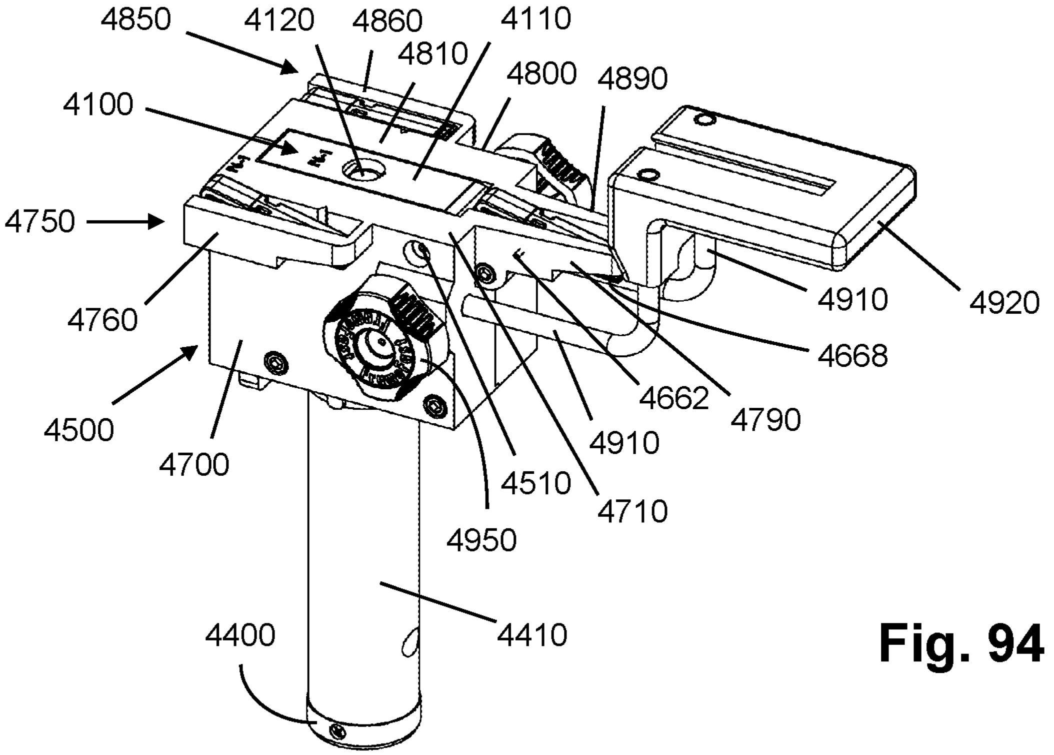
FIG. 94 is a perspective view of the multiple entry angle adaptor of FIG. 90 with a portion of the locator removed.
Figure 95:
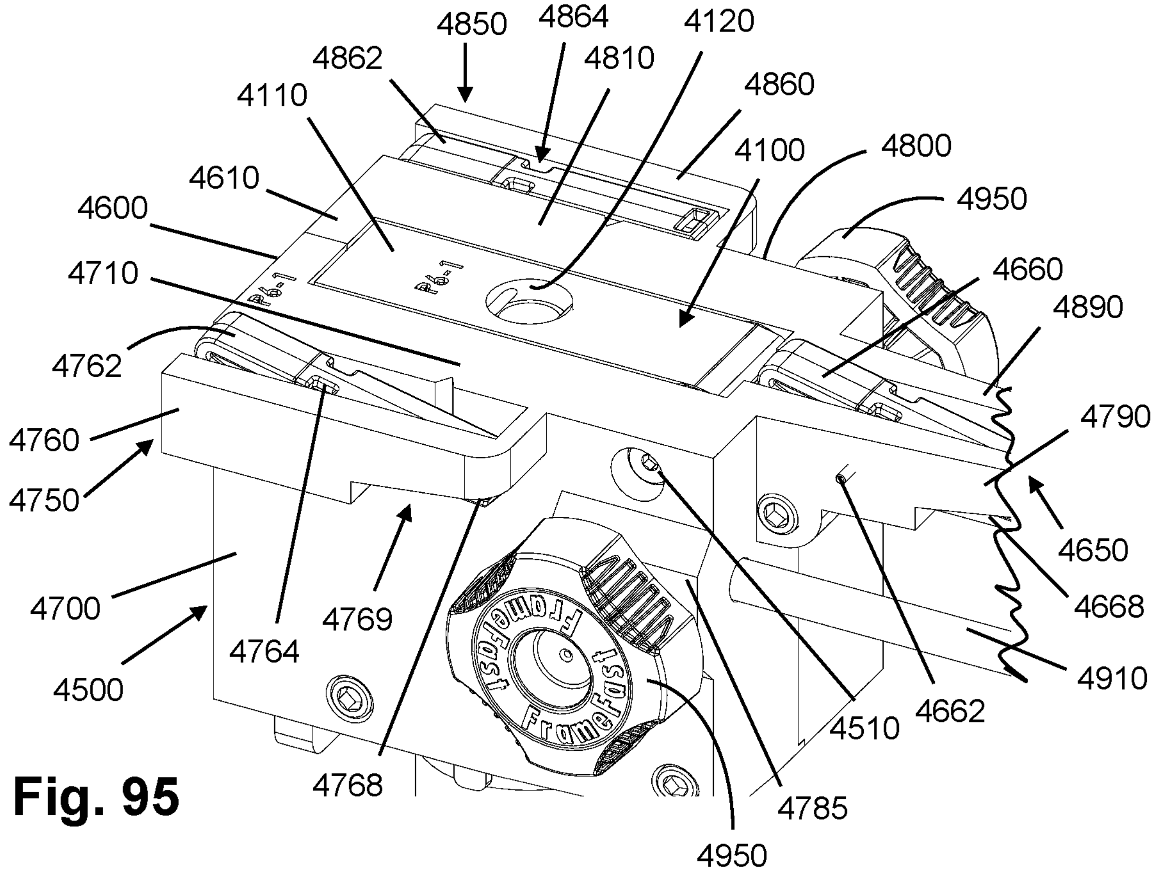
FIG. 95 is an enlarged fragmentary perspective view of the multiple entry angle adaptor of FIG. 94.
Figure 96:
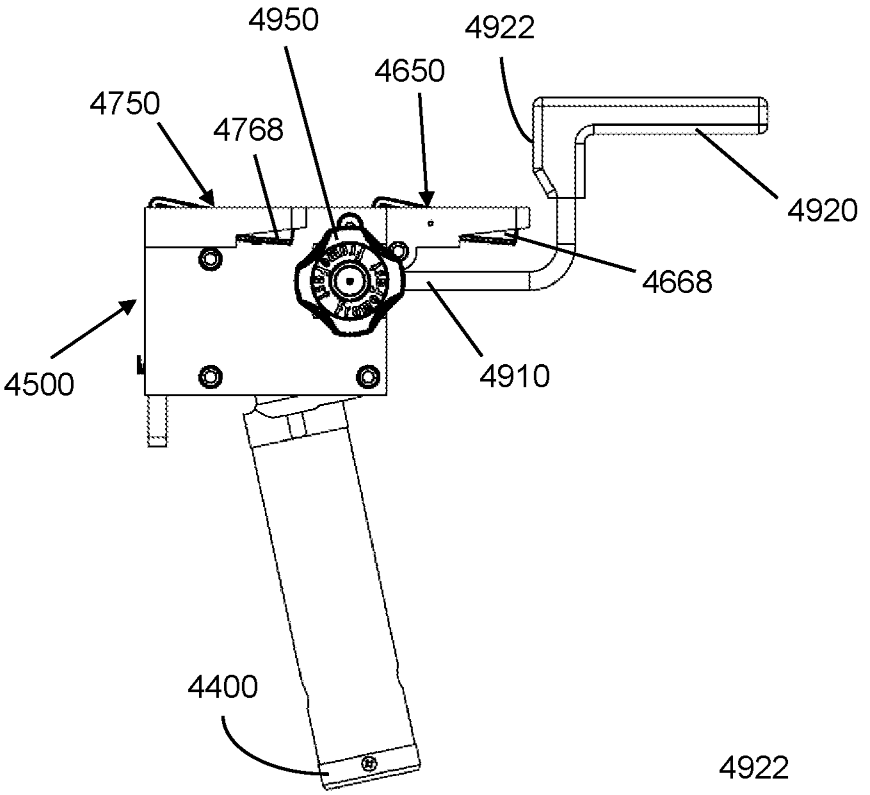
FIG. 96 is a side view, portions removed, of the multiple entry angle adaptor of FIG. 90 with the adaptor being configured in a second entry angle mode.
Figure 97:
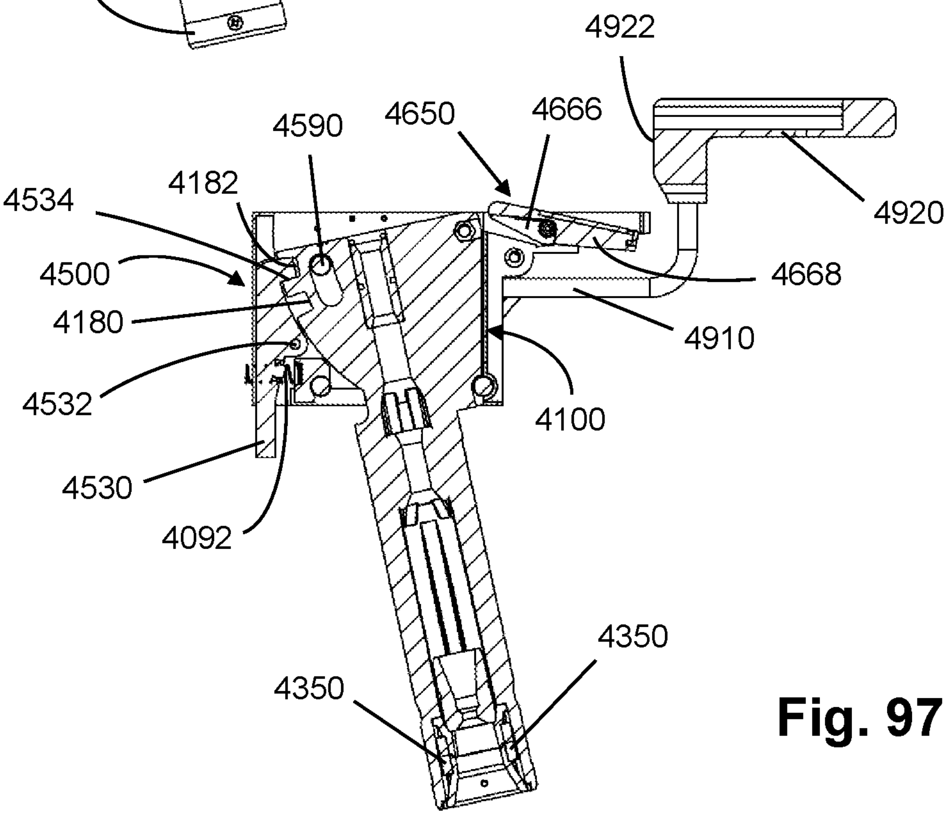
FIG. 97 is a side sectional view of the multiple entry angle adaptor of FIG. 96 at the second entry angle mode thereof.

With additional reference to FIGS. 92 and 93, the head 4100 connects at the bottom with a fastener receiver assembly 4300 that has a segmented tubular structure which at least partially defines a fastener channel 4310 for a received fastener F. The channel 4310 extends to opening 4120 and is disposed orthogonally with respect to reference surface 4110 of the head. A conical or quasi-conical funnel-like guide 4320 is mounted at a lower portion of the receiver assembly to center the received fastener F so that the driver bit or coupler from the driver tool properly engages the fastener head H. The upper portion of the tube assembly also includes a segmented guide sleeve 4340 so that the fastener will be uni-directionally driven without wobble into the member or members.

A pair of wraparound magnets 4350 is secured by cooperative engaged prong plugs 4360 at the driver coupling end of the tube. The magnets 4350 function so that a received fastener is initially retained within the adaptor 4000 and does not slide out through the opening 4120 prior to being driven by the driver.

A connector assembly 4400 extends from a tubular portion to receive and/or connect with the distal end of the telescopic tube assembly of the installation tool. The connector assembly preferably employs the tube 4410 which encloses a portion of the receiver assembly 4300 and extends coaxially with the channel 4310, and one or more screws and/or a circumferential clamp. In the illustrated connector, a connector screw 4420 extends through the connector portion to connect the adaptor at a fixed angular position relative to the end of the telescopic tube assembly. Other connection configurations are possible.

An angle guide module 4500, which ultimately defines the fastener entry angle, is pivotally mounted to the head by a pivot pin 4510. Pin 4510 extends through a lateral opening 4170 of the head at opposed sides of the angle guide 4500. The guide generally has a three-sided rectilinear form, including a rear end reference panel 4600 and perpendicular laterally opposed panels 4700 and 4800. The three panels may be formed from two opposed sections each partially forming panel 4600. The panels 4600, 4700 and 4800 form a pivotal shield-like enclosure which surrounds the head in a quasi-complementary fashion, but allows for pivoting relative to the head and specifically reference surface 4110, as will be described below. The outer and inner surfaces of panels 4700 and 4800 are configured to facilitate pivoting relative to the head 4100 and selective positioning of the locator 4900, as described below. The outer surfaces of panels 4700 and 4800 form opposed substantially identical outer protrusions 4785.

The respective edges 4610, 4710 and 4810 (upper edges in the orientation of FIGS. 94 and 95) of the panels form coplanar surfaces for the adaptor which together constitutes an entry angle reference structure. For some embodiments, the entry angle reference is formed by coplanar edges 4710 and 4810 only. The top of the head 4110, which surrounds the opening 4120, is generally planar, and in one pivotal position mode (which defines a 0° or normal entry angle), is preferably substantially coplanar with the edges 4710 and 4810.

The pivotal position of the guide module 4500 relative to the head 4100 about the pivot pin 4510 is fixed at one of two pivot positions, e.g., normal or 0° (FIG. 93) and 12° (FIG. 99), by a depressible interlock assembly carried by the angle guide module 4500 and designated generally by the numeral 4520. The interlock assembly 4520 includes an elongated lever 4530 depressible at an accessible location which protrudes below the guide module/head assembly. The lever 4530 is mounted at an intermediate location via a pivot pin 4532 fixed to the angle guide module 4500.

The lever 4530 includes a protruding pawl 4534. The pawl 4534 is receivable in one of two detents 4180 and 4182 of the head. The detents are angularly spaced about the pivot axis of pivot pin 4510 so that the upper surface of the head are disposed at either 0° (normal) (FIG. 93) or 12° (FIG. 95) relative to the edges 4610, 4710 and 4810. A guide pin 4590 extends between the panels 4700 and 4800 through an arcuate slot 4090 of the head to limit the angular pivoting of the head relative to the guide module 4500.

The lever 4530 is spring loaded by a spring 4092 so that the pawl 4534 is urged to engage in either detent 4180 or 4182 at the angular positions generally limited by the guide pin 4590. When it is desired to change the angular position of the angle guide 4500, the lever 4530 is depressed toward the tube 4410 of the connector assembly 4400, which extends from the head. The angle guide module 4500 is then pivoted relative to the pivot pin 4510 for securing the angle guide at the proper angular position of either 0° (FIG. 93) or 12° (FIG. 97) relative the head 4100.

With reference to FIGS. 90 to 97, the side panels 4700 and 4800 each have opposed substantially identical flush indicators 4750 and 4850, respectively. The flush indicators are configured to indicate that the reference surfaces 4610, 4710 and 4810 are flush against a member through which a fastener is to be initially driven. The flush position is illustrated in FIGS. 98 and 99.

A skirt 4760 and 4860 integrally projects outwardly (laterally) from the upper side of the panels. Each skirt respectively mounts a pivotal lever indicator 4762 and 4862 mounted at an intermediate location to a pivot pin 4764 and 4864. A torsion spring 4666 (see FIGS. 93 and 97) biases each lever indicator so that one end projects above the reference surface 4710 and 4810 and an indicator flag 4768 and 4868 at each opposite end is respectively pivoted downwardly. The flag indicator 4768 and 4868 of each indicator lever projects downwardly through an opening or window 4769 of the skirt to indicate that the reference surfaces 4710 and 4810 are not flush against a structure to be connected. When the reference surfaces 4710 and 4810 are flush against a planar surface, the flush indicators pivot so that the indicator flags 4768 are upwardly withdrawn into the skirt to indicate that the proper flush position has been obtained by the angle guide module 4500, as illustrated in FIGS. 98 and 99.

In addition, the panels 4700 and 4800 forwardly extend to cooperatively form a nose-like skirt defined by extensions 4790 and 4890. A flush indicator assembly 4650 includes an indicator lever 4660 which is mounted at an intermediate position to a pivot pin 4662 and biased by a torsion spring 4666 (FIG. 93) to pivot upwardly. When the flush position of the reference surfaces 4710 or 4810 is obtained, the lever pivots, and the indicator flag 4668 is upwardly withdrawn into the skirt and enclosure to further indicate that the proper flush position of the angle guide module 4500 has been obtained, as illustrated in FIGS. 98 and 99.

The indicator flags 4668 and 4768 preferably have a luminescent surface or a strikingly visible surface such as yellow, orange or red in contrast to the tints of the other adaptor components so that they are readily visible.

A locator assembly 4900 is employable to accurately position the adaptor 4000 and specifically the fastener opening 4120 along a horizontal beam or member to selectively implement an optimum positioning for driving the fastener into an adjacent rim board or structure. The panels 4700 and 4800 have axial bores which extend parallel to the reference edges 4710 and 4810 and open frontally at the end of the panels. A pair of laterally spaced arms 4910 have a generally L-shape and upwardly mount a receiving platform 4920. The platform 4920 has a front reference surface 4922 perpendicular to edges 4710 and 4810. The reference surface 4922 is engageable against a side edge of a horizontal beam as illustrated in FIG. 98.

The arms 4910 are slidably receivable in the bores and are secured by knobs 4950 tightenable to secure the arms at fixed positions relative to the panels. In some embodiments, the arms 4910 are manufactured from stamped sheet metal. The knobs 4950 preferably contain recesses and serrations to facilitate tightening the knob. The arms 4910 are positionably adjustable at various selected distances from the front end of the angle guide module 4500. See, for example, the contrast in spacing of FIGS. 98 and 99.

Figure 90:
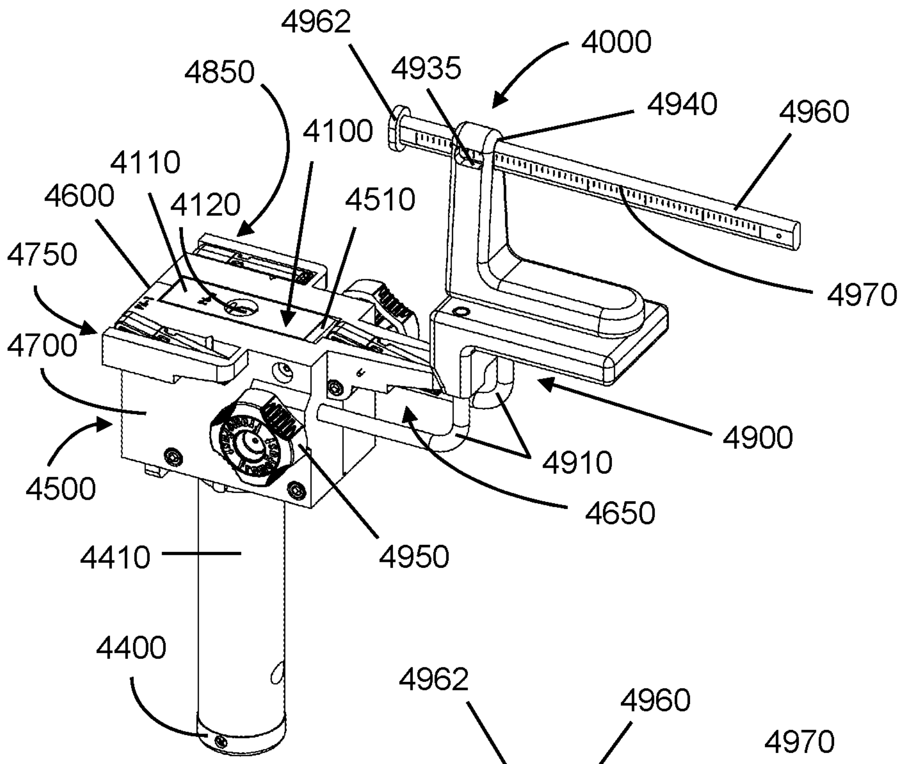
FIG. 90 is a perspective view of a multiple entry angle adaptor with a locator.
Figure 91:
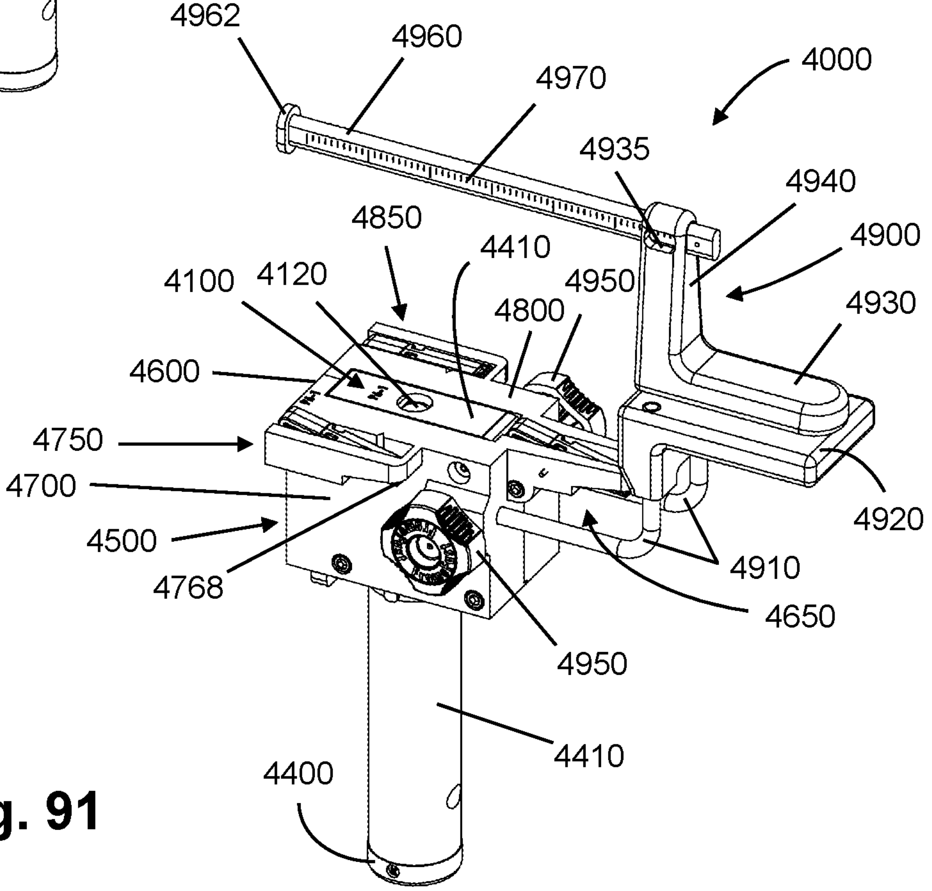
FIG. 91 is a perspective view of the multiple entry angle adaptor of FIG. 90 with the locator in a second position.

The platform 4920 mounts an L-shaped bracket 4930 which has a slot 4940. The slot receives an elongated locator guide 4960 (FIGS. 90 and 91). The locator guide 4960 is variably slidably longitudinally positionable in the slot 4940. The bracket 4930 has at least one window 4935 in alignment with the slot. The locator guide 4960 has an abutment end 4962 engageable against a potentially blindly locatable structural member, such as a rim board disposed above a horizontal beam. The locator guide 4960 also preferably has a linear measurement scale 4970 to precisely indicate a spacing measurement in the window 4935 of a structural member from an underside reference edge of a beam. The locator guide 4960 may be manually pushed forwardly so that the abutment end 4962 engages the side of a rim board which ultimately receives a driven fastener. The scale indicates the measured location of the rim board so that the opening (fastener entry) may be accurately positioned relative to the rim board. The locator assembly 4900 may be fully or partially removed from the angle guide module so that the fastener F may be driven at the appropriate location and angle.

With reference to FIGS. 98 and 99, the adaptor 4000 may be configured and positioned to drive a fastener F at a proper entry angle and location for various representative structural configurations.

In FIGS. 98, the angle guide 4500 is in the first angular mode (FIGS. 92-93) which essentially functions to define an acute entry angle of 0° to the normal for the preferred embodiment. The locator 4900, with the locator guide 4960 removed, is at a first position for connecting with an overhead medially positioned rim board. The beam edge reference 4922 engages the edge of the beam to secure the adaptor at the proper fastening location for the rim board R1 connection. The reference 4922 also stabilizes the adaptor/installation tool. The flush indicator 4750 and 4950 indicate that the reference edge 4710 and 4810 are flush against the underside surface of the beam.

For the installation illustrated in FIG. 99, the angle guide is at a second pivotal position so that the reference edges 4710, 4810 are at approximately 12° with the top surface 4110 of the head. In this configuration, a connection is provided with the proper entry angle and location for an external rim board R2. The latter entry angle is at 12°±2° relative to a vertical line. For the overhead installation, the platform 4910 of the locator 4900 has been repositioned the front panel surface 4960 engages a vertical stud to provide the proper location and also to stabilize the fastener/driver assembly. It should be noted that the angle surfaces 4710 and 4810 function as a guide reference surface for the connection of FIG. 99. The flush indicator 4650, 4750 and 4850 indicate the adaptor flush position in FIG. 99.

The adaptor 4000 may be employed at the first and second pivotal positions of the angle guide 4500 to implement numerous board connections. For example, at the second pivotal position, the adaptor 4000 may be employed to connect through headboards into a third board of a tall wall configuration (not illustrated) as well as to implement other board and structural connections.

The locator 4900 is transformable from the position or mode illustrated in FIGS. 90 and 91 for providing the proper entry angle location for rim board which by engaging the side so that the distance of the board to the reference 4720 can be measured on the scale 4970.

While preferred embodiments of the foregoing have been set for purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A fastener installation assembly, comprising:

a head having an entry surface and defining a fastener opening in said entry surface;

a connector configured to mount said head to a fastener driving tool at a fixed angular position thereto in a position such that a fastener is drivable through said opening by the driving tool;

a guide assembly pivotally mounted to said head and having a guide surface; and a locator removably mounted to said guide assembly and having first locator surface, the locator surface being movable relative to the guide surface; and a locator guide with an abutment end attached to the locator, wherein the locator guide is movable relative to the locator such that a position of the abutment end relative to the first locator surface is adjustable.

2. The fastener installation assembly of claim 1, wherein the first locator surface is flat and lies at a non-parallel angle relative to the guide surface.

3. The fastener installation assembly of claim 1, wherein when said guide assembly is at a first angular position relative to said head and said entry surface abuts a first surface of a building member, and said first locator surface abuts a second surface of the building member, a fastener is drivable through said fastener opening into said building member at a first entry angle, and when said guide assembly is pivoted to a second angular position relative to said head and said entry surface abuts the first surface of the building member, and the first locator surface abuts the second surface of the building member, a fastener is drivable through said fastener opening at a second entry angle into said horizontal member.

4. The fastener installation assembly of claim 1, wherein the locator includes at least one arm that is slidably engaged with the head to adjust a relative position between the locator surface and the fastener opening.

5. The fastener installation assembly of claim 4, wherein the at least one arm comprises two arms laterally spaced apart from one another to define a viewing window therebetween, further comprising an indicator lever positioned laterally between the respective arms such that the indicator lever is visible through the viewing window.

6. The fastener installation assembly of claim 1, further comprising an interlock assembly for fixing the guide assembly relative to the head at at least two different angular positions relative to one another.

7. The fastener installation assembly of claim 6, wherein interlock assembly comprises a lever with a protruding pawl receivable in one of a plurality of detents within the head to lock the head relative to the guide assembly in the at least two different angular positions relative to one another.

8. The fastener installation assembly of claim 1, further comprising an indicator assembly with an indicator lever positioned between the fastener opening and the locator surface, wherein when the guide surface is positioned flush against a building member surface, the indicator lever pivots from an initial position to a notification position to notify an installer.

9. The fastener installation assembly of claim 1, wherein the locator guide includes measurement markings on at least one surface thereof to indicate a spacing measurement relative between the abutment surface and the first locator surface.

10. A fastener installation assembly, comprising:

a head having an entry surface and defining a fastener opening in said entry surface;

a connector configured to mount said head to a fastener driving tool at a fixed angular position thereto in a position such that a fastener is drivable through said opening by the driving tool;

a guide assembly pivotally mounted to said head and having a planar guide surface extending from a front end to a rear end such that the guide surface and entry surface can be shifted between a first angle and a second angle relative to each other, the first angle being substantially coplanar and the second angle being oblique; and a locator mounted to said guide assembly and having first locator surface substantially perpendicular to the guide surface, the locator surface being movable in a front-to-rear direction relative to the guide assembly and positioned rear of the front end of the guide assembly; and a locator guide with an abutment end attached to the locator, wherein the locator guide is movable in the front-to-rear direction relative to the locator such that a position of the abutment end relative to the first locator surface is adjustable.

11. The fastener installation assembly of claim 10, wherein the locator is removable from the guide assembly.

12. The fastener installation assembly of claim 10, wherein the locator is slidably mounted to the guide assembly, whereby sliding movement varies a position of the first surface.

13. The fastener installation assembly of claim 12, further comprising knobs that are loosenable to allow sliding movement of the locator relative to the guide assembly, and tightenable to lock the locator in a position relative to the guide assembly.

14. The fastener installation assembly of claim 10, further comprising an interlock assembly for fixing the guide assembly relative to the head at at least two different angular positions relative to one another.

15. The fastener installation assembly of claim 14, wherein the locator guide includes measurement markings on at least one surface thereof to indicate a spacing measurement relative between the abutment surface and the first locator surface.

16. The fastener installation assembly of claim 14, wherein the locator is removable from and re-attachable to the guide assembly.

17. The fastener installation assembly of claim 14, wherein the guide assembly is pivotally attached to the head and pivotable between a first position with the guide surface and entry surface substantially coplanar and a second position with the guide surface and entry surface non-coplanar and non-parallel relative to each other.

18. The fastener installation assembly of claim 17, wherein an angular position of the guide surface relative to the entry surface differs by between 10° and 15° in the second position.

19. The fastener installation assembly of claim 14, wherein the locator guide extends in a front-to-rear direction substantially perpendicular to the first locator surface.

20. A fastener installation assembly, comprising:

a head having an entry surface and defining a fastener opening in said entry surface and being connectable to a fastener driving tool to initiate driving of a fastener through the fastener opening;

a guide assembly pivotally mounted to said head and defining a guide surface; and a locator mounted to said guide assembly via at least one arm and having first locator surface extending at a non-parallel angle relative to the guide surface, a locator guide engaged with the locator and including a front abutment end, wherein the at least one arm is reciprocable relative to the guide assembly in a front-to-rear direction to adjust a positioning of the locator surface relative to the front end, and the locator guide is reciprocable in a front-to-rear direction relative to the locator and independently from the at least one arm to adjust a positioning of the abutment end relative to the first locator surface.

* * * * *